US009160854B1

(12) United States Patent
Daddi et al.

(10) Patent No.: US 9,160,854 B1
(45) Date of Patent: Oct. 13, 2015

(54) REVIEWING CALL CHECKPOINTS IN AGENT CALL RECORDINGS IN A CONTACT CENTER

(71) Applicant: Noble Systems Corporation, Atlanta, GA (US)

(72) Inventors: Rajesh S. Daddi, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 14/632,450

(22) Filed: Feb. 26, 2015

Related U.S. Application Data

(63) Continuation-in-part of application No. 14/621,999, filed on Feb. 13, 2015, which is a continuation-in-part of application No. 14/572,957, filed on Dec. 17, 2014.

(51) Int. Cl.
*H04M 3/00* (2006.01)
*H04M 3/51* (2006.01)

(52) U.S. Cl.
CPC ...... *H04M 3/5175* (2013.01); *H04M 2203/402* (2013.01)

(58) Field of Classification Search
CPC .......... H04M 3/1566–3/5238; H04M 7/0012–7/0057; H04M 2201/38–2201/60; H04M 2203/25–2203/258; H04M 2203/40–2203/408; H04M 2203/50–2203/509; H04M 2203/65–2203/658
USPC ............ 348/14.01–14.16; 370/259–271, 370/351–357; 379/201.01, 202.01–207.01, 379/265.01–266.1; 709/201–207, 217–248
See application file for complete search history.

(56) References Cited

U.S. PATENT DOCUMENTS

| | | |
|---|---|---|
| 6,370,574 B1 | 4/2002 | House et al. |
| 7,076,427 B2 | 7/2006 | Scarano et al. |
| 7,457,404 B1 | 11/2008 | Hession et al. |
| 7,599,475 B2 | 10/2009 | Eilam et al. |
| 7,860,722 B1 | 12/2010 | Chow |
| 8,059,790 B1 | 11/2011 | Paterik et al. |
| 8,094,790 B2 | 1/2012 | Conway et al. |
| 8,103,722 B2 | 1/2012 | Lee |
| 8,279,779 B2 | 10/2012 | Singh et al. |

(Continued)

OTHER PUBLICATIONS

Noble Systems Corporation, Harmony Version 3.1 User Manual, May 9, 2013, 236 pages, Noble Systems Corporation, Atlanta, GA. Screenshot of Interactive Demo of jQuery plugin to add notification bubbles, found at http://www.codebasehero.com/files/notification-menu/demo/, obtained on Dec. 16, 2014, 1 page.

(Continued)

*Primary Examiner* — Hemant Patel

(57) ABSTRACT

A real-time speech analytics system ("RSTA system") detects speech during a call involving a contact center agent and a remote party. Upon detecting the speech, an event message is generated by the RTSA system and transmitted to a checkpoint and alert reporting module, which is configured to generate and update a checkpoint widget displayed to the agent. The checkpoint widget provides visual information regarding the status of the checkpoints encountered during the call. Checkpoint widgets may be stored for each call handled by an agent, and subsequently may be requested for display to a supervisor for reviewing of the agent's performance. Upon providing appropriate filter information, the selected widgets associated with the agent are displayed. By selecting a particular checkpoint indicator on a widget, audio from the call associated with that checkpoint is retrieved and streamed to the supervisor, thus allowing auditory review of that portion of the call.

19 Claims, 31 Drawing Sheets

(56) References Cited

U.S. PATENT DOCUMENTS

| | | |
|---|---|---|
| 8,326,643 B1 | 12/2012 | Eshkenazi et al. |
| 8,396,205 B1 * | 3/2013 | Lowry et al. .............. 379/265.12 |
| 8,537,983 B1 | 9/2013 | Haggerty et al. |
| 2014/0140496 A1 * | 5/2014 | Ripa et al. ................ 379/265.06 |
| 2014/0140497 A1 | 5/2014 | Ripa et al. |
| 2014/0181676 A1 | 6/2014 | Samborskyy et al. |

OTHER PUBLICATIONS

Noble Systems Corporation, Noble Web Reports version 2.3 User Manual, May 13, 2013, 222 pages, Atlanta, GA.

Office Action Received for U.S. Appl. No. 14/572,957 dated Feb. 11, 2015.

UPSTO, Office Action dated Apr. 28, 2015 for U.S. Appl. No. 14/572,957.

* cited by examiner

FIG. 8C

| Station Number | Agent ID | Group Number | Agent Name | Campaign | Agent State | Call Duration | Current RTSA Alerts | Cumulative RTSA Alerts |
|---|---|---|---|---|---|---|---|---|
| 32 | 930 | 2 | Thompson, Mary | Cust Svc | Conn. | 2:34 | 2 ⚠ | 16 |
| 12 | 628 | 1 | Hardy, Dawn | Tech Support | Paused | N.A. | N.A. | 8 |
| 33 | 906 | 2 | Smith, Joe | Cust Svc | Conn. | 3:23 | 0 | 3 |

FIG. 11A

| Station Number | Agent ID | Group Number | Agent Name | Campaign | Agent State | Call Duration | Current RTSA Alerts | Cummulative RTSA Alerts |
|---|---|---|---|---|---|---|---|---|
| 32 | 930 | 2 | Thompson, Mary | Cust Svc | Conn. | 2:34 | 2 | 16 |
| 12 | 628 | 1 | Hardy, Dawn | | | | | |
| 33 | 906 | 2 | Smith, Joe | | | | | |

Thompson, Mary
Positivity Score: 100   Compliance Score: -5

2014-07-11:14:02:56.4446624
Time: 4:32
Topic: Thank you closing detected Positivity Score:100

2014-07-11:14:22:46.4446632
Time: 0:34
Topic: No Inquiry of Legal Name  Compliance Score: -5
Status: Escalation Initiated

| RTSA Topic | Color | Icon | Send Alert to | Text to Include in Alert | Positivity Score Points | Compliance Score Points | Defined as Checkpoint? |
|---|---|---|---|---|---|---|---|
| Welcome Greeting | Green |  | Supervisor | Greeting Detected | +50 | +5 | No |
| Wrap up | Green |  | Supervisor | Wrap Up Detected | +50 | 0 | Yes |
| Curseword | Red |  | Supervisor Agent | Curseword Detected | -10 | 0 | No |
| Lawyer Retained | Red |  | Supervisor Team Leader | Stop Collection Attempt | 0 | -20 | No |
| "Mini Miranda" | Red |  | Supervisor Team Leader | No Mini-Miranda Detected | 0 | -100 | Yes |

ALERT MAPPING TABLE

FIG. 12

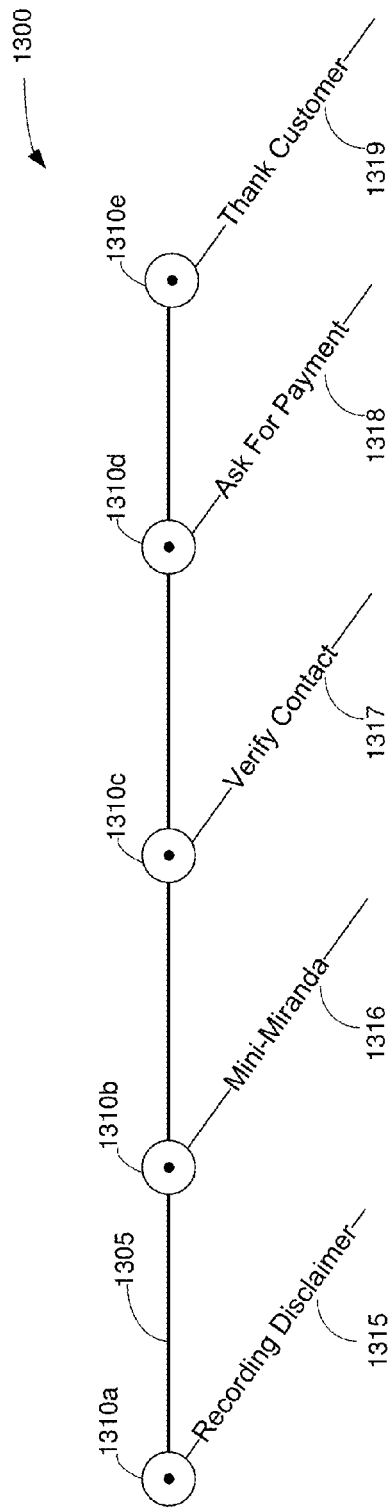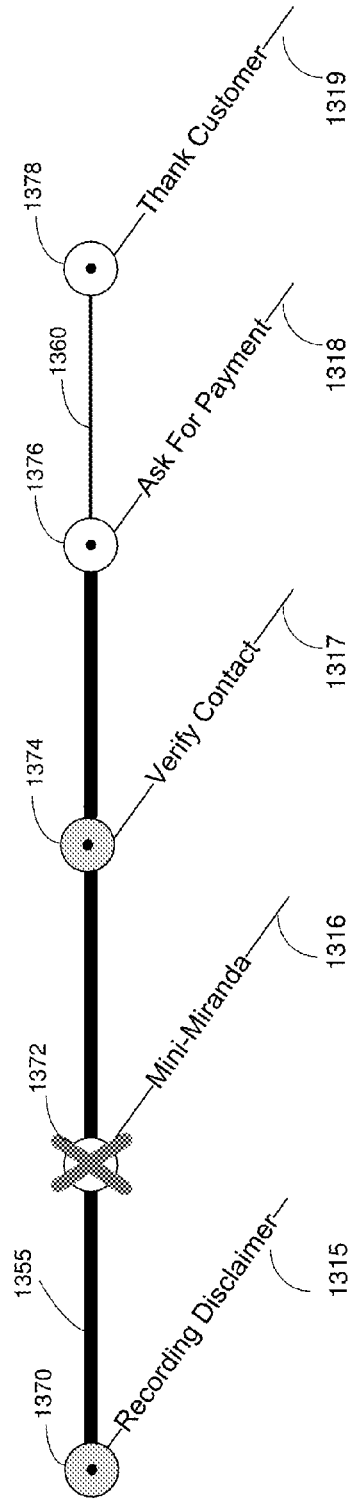
FIG. 13A
FIG. 13B

Event Table

1805 — Agent: Jane Smith
Campaign: Debt Collection 1
Date: 2/5/2015
Time of Call: 10:32.5

1800

| 1810 Event | 1815 Time(sec) | 1820 Compliance Score |
|---|---|---|
| 1830 First Event | 2.8 | 10 |
| 1832 Second Event | 12.5 | 0 |
| 1834 Third Event | 45.1 | 20 |
| 1836 Fourth Event | 1:32.3 | 15 |
| 1838 Fifth Event | 3:23.6 | 5 |

REVIEWING CALL CHECKPOINTS IN AGENT CALL RECORDINGS IN A CONTACT CENTER

RELATED APPLICATIONS

This application is a continuation-in-part of U.S. patent application Ser. No. 14/621,999, filed on Feb. 13, 2015, entitled "Checkpoint Widget For Indicating Checkpoint Status Information To An Agent In A Contact Center," which in turn is a continuation-in-part of U.S. patent application Ser. No. 14/572,957 filed on Dec. 17, 2014, entitled "Dynamic Display of Real Time Speech Analytics Agent Alert Indications In A Contact Center."

FIELD OF INVENTION

The field of the invention generally pertains to contact centers, and specifically, how a call recording that is associated with various checkpoints as reflected on a checkpoint widget can be visually and aurally reviewed.

BACKGROUND

Contact centers employ agents to interact with called parties for a variety of purposes, such as debt collection, telemarketing, soliciting donations, or providing customer service. For a variety of applications, there may be various state or federal regulations governing how the interaction may occur. In addition, the contact center may have various policies that govern how the agent is to conduct the call. The agent is expected to comply with the appropriate regulations and policies, but in fact, this may be difficult depending on the particular circumstances. This is because the agent may be involved in various campaigns governed by different regulations and policies. The agent may be temporarily distracted during a call and may not recall all the applicable regulations.

For example, depending on the particular circumstances, the agent may be required to ensure that the certain information is provided to the remote party or respond in a certain way when provided with information by the remote party. In the past, one way of ensuring that the agent complied with the applicable regulations or policies was to record the call involving the agent. The call would then be reviewed by an experienced agent who would identify or rank the agent's performance. It is not uncommon for a very small sample of such calls involving an agent to be reviewed, i.e., perhaps a fraction of 1% of the calls. Further, such a review may occur days or weeks after the call was initially recorded. This approach could only identify a deficiency in an agent's performance long after the call was completed. There may have been hundreds of calls made by the agent before any feedback is provided to the agent. Thus, any errors in the agent's call handling practice may go uncorrected for some time.

Agents may have a genuine desire to improve their performance, but they may not be aware that they have made a mistake. They may be distracted, nervous, or simply unaware that they overlooked an opportunity to improve their performance or were non-compliant in a particular circumstance. Real-time feedback is typically more effective in modifying human behavior, and delayed review of the agent's performance may serve to entrench undesirable agent habits.

One technology that can be applied to monitor and identify an agent's non-compliance involves the use of real-time speech analytics. This technology can monitor and "understand" the speech and the context of the speech as it occurs in conversation between the agent and remote party. Unlike speech recognition, the speech is analyzed for a particular conversation relative to a particular framework or context. In other words, in order for the speech analysis to detect a non-compliance condition, there must be first a framework defined to compare the speech against. This may be complicated in that the particular framework to use may depend on various factors, and may not be deduced from the speech itself. For example, an agent providing customer service may respond to a called party by saying "I cannot tell you that." This may be an appropriate answer if the called party inquires about the agent's email address for personal correspondence, but the same response may not be an appropriate answer if the called party seeks the email address for directing a customer complaint. Thus, analyzing the speech during a call is highly dependent on the context in which the speech occurs. That is, merely recognizing a word(s) may not be sufficient.

Once an agent's performance is determined for a call, it may be desirable to quickly review the agent's performance for a number of calls during a time period. In different contexts, this review may occur in different formats. One such format could be visually and another format could be aurally. Further, mechanisms need to be defined to allow easily and quickly switching from one format to another.

Thus, systems and methods required to be defined to effectively and quickly review whether an agent is compliance with various regulations and contact center policies. A flexible approach for providing both visual and aural review methods is needed. It is with respect to these and other considerations that the disclosure herein is presented.

BRIEF SUMMARY

Technologies are generally presented herein pertaining to systems, methods, and non-transitory computer readable media for presenting the checkpoint status during a voice call handled by an agent in a contact center. This information may be displayed by a checkpoint widget that comprises various checkpoint status indicators, each corresponding to a checkpoint during the call. A plurality of checkpoint widgets for a particular agent can be logged, and subsequently retrieved for review. Review of the checkpoint widgets may occur visually or aurally. Aural review may occur by the user selecting a checkpoint widget or a checkpoint indicator thereon, allowing the user to aurally review a particular portion of the call recording associated with a checkpoint.

BRIEF DESCRIPTION OF THE DRAWINGS

Reference will now be made to the accompanying drawings, which are not necessarily drawn to scale, and wherein:

FIGS. 8A-8C illustrates embodiments of a user interacting with a real-time speech analytics alert overlaid on an agent icon on a display.

FIGS. 11A-11B illustrate an embodiment of a tabular real-time speech analytics display with a real-time speech analytics alert overlaid thereupon.

FIG. 12 is an embodiment of one embodiment of an alert and checkpoint mapping data structure used in generating an alert or processing event messages for updating a checkpoint status indicator.

FIGS. 13A, 13B, 14A, 14B, and 14C illustrate various embodiments of checkpoint widgets capable of indicating the status of checkpoints during a call.

DETAILED DESCRIPTION

Figure 1:
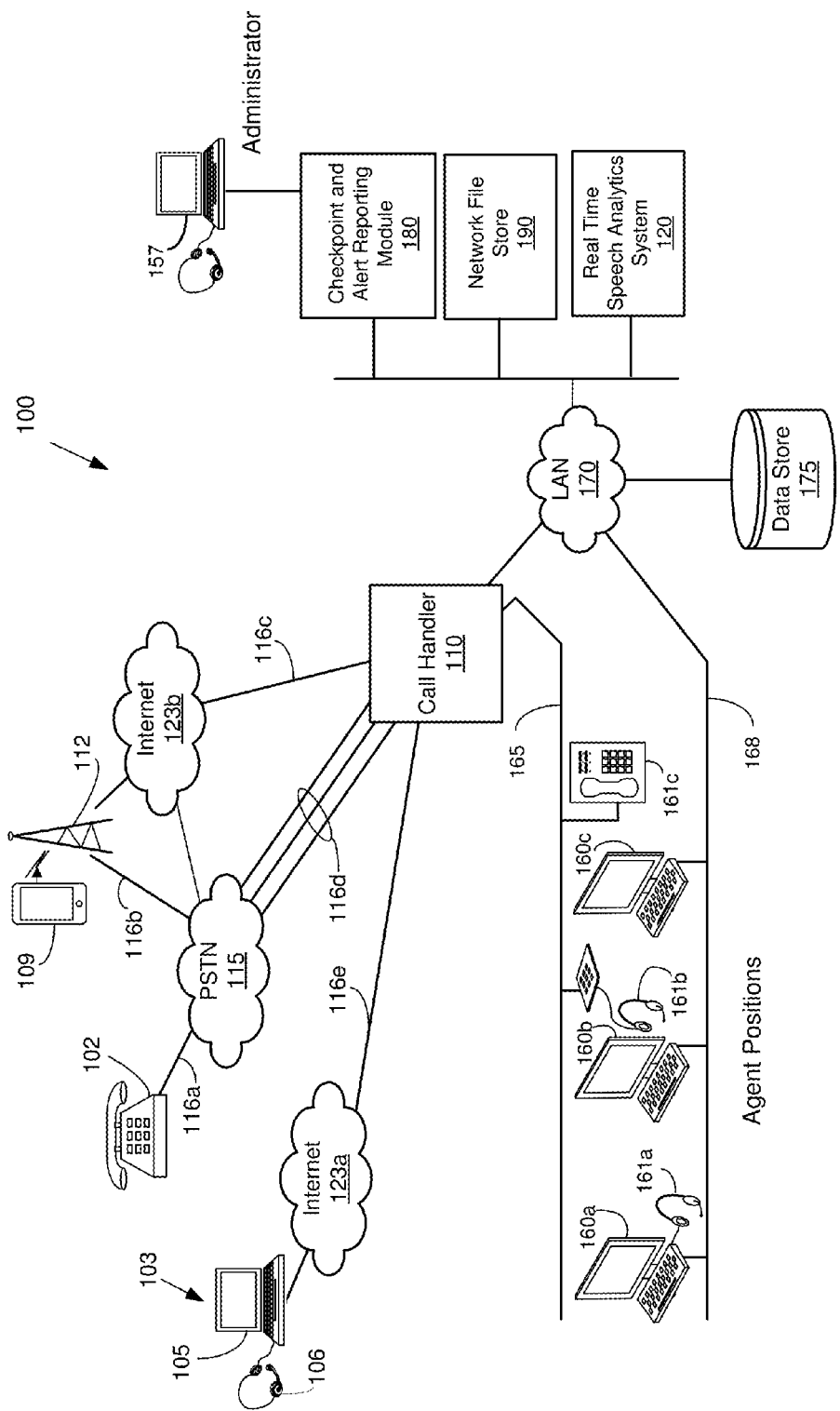
FIG. 1 shows one embodiment of a contact center used in conjunction with the concepts and technologies presented herein.

Various embodiments for practicing the technologies disclosed herein are described more fully hereinafter with reference to the accompanying drawings, in which some, but not all embodiments of the technologies are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals. Like numbers in the drawings refer to like elements throughout.

GLOSSARY

The following terms are to be given the following meanings in this specification, when used in the appropriate context. Further, the terms defined herein are not necessarily applicable to any parent patent application(s) from which priority is claimed or which are incorporated by reference. Any examples included in a definition are not intended to be exclusive or limiting, but merely illustrative.

Alert (a.k.a. "alert indication")—information related to a condition detected during a call between an agent and remote party. In most contexts herein, reference to an "alert" involves a "RTSA alert" which is a particular form of an alert that reports information in real-time related to a speech condition occurring during the call. An RTSA alert is typically related to detecting unexpected speech or failing to detect expected speech. If reference is made to an "alert" that is not an RTSA alert, then this will be clear from the context.

Alert Bubble—an icon displaying a numerical value representing the number of alerts reported during a current call for a particular agent. Typically, the alert bubble icon is displayed once an alert is reported and remains displayed for the duration of the call. The numerical value indicated by an alert bubble may be incremented during the call if another alert is reported.

Alert Details—information that provides additional details about one or more alerts. This may be displayed in a message box ("alert details box"), usually comprising only text, but which may incorporate icons and/or colors. The Alert Details are usually displayed in response to a user selecting a particular Alert Bubble. In such cases, the Alert Details may be displayed until explicitly closed, or may be displayed for a set time.

Alert Overlay—a message box, which may incorporate various icons and different colors that indicate information about a currently reported alert. The icons and/or colors may be used to report a type or severity of the alert. The alert overlay typically is displayed in a transient manner, e.g., for a few seconds before disappearing.

Agent Icon—an icon used on a graphical user interface comprising text information identifying an agent and possibly their status, typically along with an image of that agent. The image may be a picture, drawing, or other symbol of that agent.

Call Handler System ("CHS" or simply "Call Handler")—one or more components in a contact center that processes communications. The communications may include communications that are inbound or outbound (relative to the contact center) and may encompass a variety of communication technologies. A call handler system frequently handles voice oriented calls, but may handle other types of communications in addition.

Call Leg—a portion of a call, typically between two pieces of equipment. Call legs may be concatenated or joined to form an end-to-end call between two or more individuals. Call legs are typically bi-directional in their capability to convey voice, but not necessarily, as a call leg may convey voice in a unidirectional manner from one party to another, but not in the reverse direction.

Campaign—a set of calls processed in a contact center by a call handler in a common manner or for a common purpose.

Checkpoint—a point during a voice call that is associated with the expected or possible occurrence of a speech event.

Checkpoint and Alert Reporting Module ("CARM")—code executing on a processor that receives event messages and processes the event related data for various purposes, including, such as, to cause alerts to be generated or updating the status of checkpoint indicators. The CARM may only provide checkpoint related processing functions, alert related processing functions, or both. In addition, other functions related to checkpoint widgets may be performed. The CARM may also refer to the code and the processor executing the code.

Checkpoint Occurrence—the occurrence of an expected or possible speech event that is identified as corresponding to a checkpoint. Not all occurring speech events are necessarily checkpoints.

Checkpoint Indicator (a.k.a. "checkpoint status indicator")—one or more visual elements of a checkpoint widget representing a checkpoint of a voice call.

Checkpoint Indicator Text—text associated with a checkpoint indicator on a checkpoint widget that informs the reader of the nature of the checkpoint.

Checkpoint Indicator Status—a particular state of a checkpoint indicator, which typically reflects whether or not the checkpoint has been detected or occurred.

Checkpoint Chronological Order—the relative order in time when checkpoints are expected to occur during a call. This is not necessarily the same as when the checkpoints actually occur, since not all checkpoints may actually occur during a call, may occur in an unexpected order, or may occur in an order which cannot be accurately predicted. A checkpoint widget may illustrate checkpoints in an explicit or implied chronological order. Other widgets may not have an explicit or implied chronological order of checkpoints.

Compliance Score—a numerical score allocated in conjunction with one or more detected speech conditions that is associated with a compliance requirement. This could be allocated on a per-instance basis or on a cumulative basis for a particular agent.

Event (a.k.a. "speech event")—detection by an RTSA system of a keyword uttered in the speech, typically involving one of an agent or remote party in a voice call. Events are typically reported, and hence reporting an event is indicating the occurrence of the event as detected by the RTSA system.

Event Configuration—providing information necessary for the RTSA system to detect an event—e.g., the context for detecting the keyword. This would include, e.g., indicating the keywords that the RTSA is to detect and report-out as an event message along with other configuration data. Various labels could be defined and associated with reporting an event, and defining such labels could be part of the event configuration process.

Event Message—the message sent by the RTSA system reporting detection of an event. This may also called an "alert message" when referring to reporting a speech condition associated with an alert. Event messages also report out occurrence of a speech condition associated with a checkpoint.

Filter Information—information used to potentially exclude or limit some information from a larger set of information. For example, filter information may be used to limit selection of some checkpoint widget from a larger set, allowing a user to, e.g., see only some of the checkpoint widgets associated with a number of calls.

File Store—components or systems for storing records or files. This could be a file server, network file storage, database, redundant array of interchangeable disk systems, shared disk systems, virtual file system, etc.

Keyword—a word, set of words, or phrase and its associated context, in which the detection thereof is reported as an event by an RTSA system. Also called a "topic."

NPA-NXX—A portion of a telephone number, where the NPA represents the numbering plan area, commonly called the area code, and the NXX represents the central office code. The NPX-NXX was historically associated with a geographic location, but since the NPA NXX may be associated with a wireless number or may have been ported, the geographical location of a particular NPA-NXX may not be readily ascertained without requiring additional information.

Positivity Score—a numerical score allocated in conjunction with a detected speech condition where the score reflects the extent of an agent's favorable or desirable behavior (or potentially undesirable behavior). This could be allocated on a per-instance basis or on a cumulative basis for a particular agent.

Real-Time Speech Analytics ("RTSA")—the processing of speech, in real time, to determine a context and the words spoken. RTSA is distinguished from speech recognition, which only recognizes a spoken word, and does not determine a context in which the word occurs.

Real Time Speech Analytics System ("RTSA System")—a speech analytics system capable of providing real-time analysis of speech in a defined context. This may be employed in a contact center to detect and report on various speech conditions between an agent and a remote party that may occur during a call.

Score—points associated with an event. The score may be categorized for a certain type of events (e.g., positivity or compliance related). The score may be positive or negative. A score may be defined for events that are checkpoints separate from events that are alerts.

Speech Condition—a condition involving the occurrence of speech on a call between two parties pertaining to either 1) the detected presence of specific speech or 2) the absence of specific speech. Typically, though not always, this involves speech spoken by the agent. Typically, this is also associated with a particular context, e.g., other information associated with the speech.

Transient Alert Indication—an alert indication that is provided in a transient manner, wherein information is displayed and then removed after a time period without any user interaction. The time period typically is configurable, and may range from less than a second to the duration of the call. Typically, the duration is set to be less than 10-30 seconds.

Tabular Manner—having a characteristic of a table format comprising rows and columns, with each cell formed thereby comprising text, and which may also incorporate different colors and/or icons.

Topic—a particular instance of a speech condition that a RTSA system is configured to detect and report. This is reported by the RTSA system to the checkpoint and alert reporting module via an alert message. The topic may be identified by a name, for ease of human reference. Thus, e.g., "welcome greeting detected" may be the name of a topic associated with detecting a word or phrase identified as a welcome greeting. Also referred to as a "keyword."

Time-line (in conjunction with a checkpoint widget)—a visual element indicating the passage of time in a widget. A time-line may have checkpoint indicators shown thereon.

Widget (also called "Checkpoint Widget")—a collection of visual elements displayed on a computer screen, which may comprise text, icons, and symbols representing one or more checkpoints that are indicated by corresponding checkpoint indications (also called "checkpoint status indicators") that reflect whether the checkpoint occurred. The widget is configurable so as to be capable of indicating which checkpoints have occurred and thus may change over time.

Widget Instance—a depiction of a widget at a particular time. The widget has the ability to indicate whether checkpoints have been detected during a call and thus can change over time. Thus representation of a widget by a diagram or figure inherently depicts a static representation of the widget at a specific point in time.

Workstation—a computer configured to handle agent-related contact center functions in contact center. In one embodiment, this may be a specialized computer based component configured to handle voice calls or process information related to such voice calls. The workstation comprises a display, often a computer display, and may, but not always, comprise a telephone device.

Voice Call—communications involving human recognizable speech, which may involve various forms of technologies, including conventional telephony, digitized voice, ISDN, VoIP, etc.

Service Concepts

Contact centers must comply with various federal and state regulations that govern how certain types of calls may be conducted. These regulations may provide a spectrum of guidelines as to how certain types of calls are to be conducted. For example, broad guidelines may prohibit an agent involved in a debt collection call from making intimidating statements to the debtor. On the other hand, other guidelines may be very specific in that they require the agent involved in a debt collection call provide certain information (e.g., make certain statements) to the debtor, such as indicating at the beginning of the call that the purpose of the call is to collect a debt. Further, many contact centers have other policies, such as prohibiting agents from using curse words, mandating a welcome greeting, or requiring the agent to ask the party at the end of the call whether there are any outstanding questions or issues that need to be addressed.

Compliance with these regulations may require the agent to convey certain information, or to refrain from making certain statements. Usually, compliance with the regulations requires the agent to behave in a certain manner. In various circumstances, the agent's behavior may depend on what the remote party says. Obviously, a contact center cannot control what the remote party does or does not say on a call with the agent, and thus focuses on the agent's conduct. Thus, depending on the context, including based on what the remote party says, the agent is expected to provide certain information or refrain from using certain speech. These may be broadly referred to as "speech conditions."

In the past, detection of undesirable speech conditions was largely performed by humans. This may have been performed by reviewing call recordings and manually evaluating whether the agent complied with certain regulations. In addition, such evaluation may have been performed in real-time by a supervisor, by using a "barge-in" or other conferencing capability whereby the supervisor could listen to or monitor the conversation. Regardless of whether the activity was done in real-time or in non-real-time, the process was labor intensive in that it required a knowledgeable and experienced person to perform the evaluations. However, some of the activity is, by its nature, menial. For example, monitoring the speech for a curse word uttered by the agent does not require any particular experience and can be a tedious exercise. Further, it could be often overlooked, since not all calls were recorded and reviewed.

Speech analytics systems ("SAS") are now able to detect programmed speech conditions, and more recently, can perform this in real-time. Thus, a real-time speech analytics system ("RTSA system") is an effective labor-saving technology that can provide real-time analysis of many conversations of agents in a contact center on a non-stop basis. RTSA is more sophisticated than mere speech recognition, in that it allows more sophisticated contexts to be defined. For example, it can detect when an agent responds inappropriately to a certain question posed by the remote party, as opposed to merely recognizing a particular word or phrase.

For example, it may be possible to detect using speech recognition when the agent states the words "I can't tell you." However, detecting this speech by itself may not be very useful. This may be a valid answer if the agent is asked by the remote party for confidential information, e.g., his annual salary or home address. On the other hand, if the party is asking the agent for the party's current balance or due date for the next payment, such an answer is inappropriate. Speech analytics can detect the context of the speech and apply rules for generating an alert, which mere speech recognition systems cannot.

Thus, SAS (e.g., an RTSA system which is a system that can perform real time speech analytics) can alleviate the need for a supervisor or similar person to analyze each call serially. Obviously, requiring a supervisor to monitor each call limits the number of calls from agents that can be monitored. Thus, using an RTSA system makes it now possible for all calls of all agents to be continuously monitored for compliance and other aspects.

This raises an issue of how a supervisor is expected to analyze the results from a RTSA system. There are a number of speech conditions that may be detected during a call, and it may be quite burdensome and overwhelming for a supervisor to be able to review the results from all calls, especially if the results are provided non-stop in real-time. For example, a contact center may have dozens or hundreds of agents that are making a number of calls. Providing real-time results of each speech condition detected could easily overwhelm a supervisor.

The results from the RTSA system that are provided to a supervisor may be referred to as "alerts" or more specifically, "RTSA alerts." RTSA alerts report detection of a particular speech condition. Usually, the alert relates to speech from the agent, not from the remote party. However, the speech condition reported with respect to the agent may be based on a context that takes into account speech from the remote party. For example, once an agent engaged in a debt collection call is informed by the debtor that they are represented by a lawyer, any further attempts by the agent to collect the debt should cease. Thus, detecting an attempt to collect a debt is a concern only if the party has informed the agent that they have retained a lawyer. Consequently, reporting this speech condition relates to the agent, but the context involves speech from both the remote party and the agent.

The alert may report a negative or undesirable speech condition, which may be a violation of a policy or regulation. In addition, the alert may report a positive or desirable speech condition, which may reflect that the agent is in conformance with a policy or regulation. Thus, the supervisor reviewing alerts may receive either positive or negative alerts. These may be used in evaluating the performance of an agent. Typically, these are compiled into a numerical value, called a "score" of some type (e.g., a "compliance score").

Supervisors reviewing such alerts may require various types of information in order to quickly assess a RTSA alert. For example, since supervisors may be receiving or reviewing alerts in real-time, they may find it beneficial that the alerts are formatted so they can quickly evaluate whether a particular alert is a positive or negative alert. A negative alert may represent a compliance violation and depending on the context, may require immediate intervention by the supervisor. A quick and easy method of distinguishing between a positive and negative alert is by color code on the alert indication. An alert indication may be associated with one color for positive alerts, such as green, and another color for negative alerts, such as red. Other colors may be used to reflect other categories. Ascertaining the color of a visual indication can be done very quickly and easily, and much quicker than having to read, e.g., text.

Further, a visual indication of the severity of the alert is useful. This allows the supervisor to focus their attention on the severe versus minor violations. Again, this can be reflected by different color shades or hues used on the alert indication. Thus, a dark red could be interpreted as more severe than a light red. In another embodiment, an icon may be included in the alert to indicate a severity. This may involve various levels of colors, line thicknesses, shapes, or sizes. Thus, a small exclamation point ("!") may represent one level of severity, and a greater severity level may be reflected by e.g., a larger font, different color, or by concatenating two such marks (e.g., "!!"). In addition, in other embodiments, a sound level may optionally be used to indicate a severity. This may involve different sounds or different levels of the same sound. Sounds may be defined to merely attract attention (e.g., a whistle or chirp), convey urgency or a warning (e.g., a claxon sound), or some other characteristic.

The alert itself may also include text-based information to provide additional details. Text-based information obviously requires the intended recipient (usually the contact center supervisor or manager) to read and understand the information in order to evaluate its significance. Thus, text-based information may be used by a supervisor to augment the color/icon information if they so desire. In other words, the supervisor may select a particular alert based on the color or severity and then further click on an icon to be presented with the associated text.

In addition, the supervisor needs to be able to quickly review current alert information, past (historical) alert information, as well as trends. This allows the supervisor to quickly evaluate whether a problem is transient, ongoing, or developing into a worse situation. This must be provided with minimal interaction and distraction with the supervisor, given the potentially large number of alerts that may be received.

While alerts provide particular information related to a call to a supervisor or agent, the depiction of events that have occurred may also be presented to a supervisor or agent via a checkpoint widget (or simply "widget"). The widget depicts the occurrence of certain events that have been designated as "checkpoints". A checkpoint reflects is an event (e.g., the detection of a potential particular speech related occurrence) that has been labeled as a checkpoint, typically reflecting its importance in some way. By defining certain keywords as checkpoints, this allows a filter to be defined that can distinguish some events from others (e.g., non-checkpoint events from event checkpoints). As checkpoints are detected during a call, checkpoint indicators on the widget that is displayed are modified to reflect the occurrence of the corresponding keyword. The checkpoint widget provides a very easy-to-understand indication of the status of a call with respect to which checkpoints have occurred. The call status may thus be ascertained faster and easier than reviewing the alert history for a given agent.

In one respect, one difference between alerts and checkpoints is that both may be reported via an event message, but one is designated as a checkpoint. In another respect, an alert is geared more towards providing an instantaneous indication of a condition of a call, whereas checkpoints provide more of an overall call-related indication. However, it is possible to see a number of alerts that have occurred on a call, but the checkpoint widget usually shows the checkpoints for the duration of the call. The checkpoint widget is frequently less obtrusive, as it may have a dedicated portion in the screen where it is presented. Frequently, though not necessarily, the alert is overlaid on another visual element. Finally, alerts frequently are used to report undesirable events, where checkpoints are typically used to report positive, expected events during a call. Thus, the presence of an alert is often viewed as negative, whereas the presence of a checkpoint is often viewed as positive. Further, checkpoints, because they reflect the expected occurrence of events, may have an expected chronological order. In contrast, alerts may not have an expected chronological order. It should noted that in various embodiments, not all of these generalizations will always be present. For example, it is possible that failure to detect an event will cause both an alert to be generated and cause a change in a checkpoint status indicator to occur.

Merely indicating when a certain event occurred during a call does not reflect a checkpoint. This is because, in part, knowing whether an event occurs during a call cannot be ascertained until after that particular checkpoint has occurred. Thus, indicating when a certain event has occurred is different from indicating events that are expected or may occur during a call. In the latter case, these can defined before a call occurs, whereas indicating events that have occurred cannot be indicated before the call occurs. Thus, checkpoints should not be confused with technologies that merely visually indicate what speech has been detected during a call as opposed to indicating speech that is expected or which may occur.

Associating an Alert With An Agent

Associating a given alert to a given agent is necessary for various reasons. If there is a negative speech condition detected and reported, the supervisor requires knowledge of which agent was involved, not that there simply was a negative alert reported from among a set of agents. There may be, e.g., a hundred agents and providing corrective action for an agent obviously requires knowing which agent was involved. The indication to a user of the association of an agent with an alert can occur in various ways. Two main ways include: tabular and graphical.

First, it is important to distinguish that the tabular format for reporting alerts is not the same as table-based reports. Reports are well known in contact centers and provide tables of various statistics for agents, which can be organized in different ways. However, the information is presented as a static summary. Frequently, such reports convey information in a non-interactive, non-real time format, which requires presenting all available information on the table, and if not presented, the information is not readily available. Thus, a conventional report format makes it difficult to provide the various levels of detail which may or may not be required depending on the circumstances.

In contrast, alert indications are dynamically presented in real-time according to the concepts and technologies presented herein. Thus, the tabular format is not the same as a table—based report. In the tabular format, each alert is indicated in a column on a table with the name of the agent (or functional equivalent identifier) indicated in a corresponding column. Thus, one format may list the alert in a row in the table along with the agent's name in another column in that row. The use of such tabular reports is well known in contact centers, but such information is typically not real-time summaries of information. The tabular format, as with the graphical format, may provide real-time information, and may allow the ability to "drill-down" and obtain further detailed information. Thus, the tabular format is more like an interactive dashboard. This is not possible in a static report.

A graphical form is well suited for quick association of an alert to an agent by the supervisor. Thus, the graphical form is well adapted to real-time indications and evaluations. This can be done by associating an alert to a map of a particular work location of the agent and/or including a pictorial image or icon of the agent. One embodiment involves a work location map, typically referred to as a "floor plan map." This may represent a floor diagram of the contact center. The floor plan map is typically applicable to contact centers that maintain a physical presence (as opposed to contact centers that support work-at-home or virtual agents). In a floor plan map, a layout of the various agent positions is shown, and a particular agent may be identified by highlighting or otherwise identifying a particular location on the floor plan map. Typically, the location is associated with their workspace or cubicle location.

The other graphical approach involves a series of agent icons, which represent an agent. Each agent may have a picture or other icon associated with their image, along with their name, for quick identification. A series of agent icons may be presented in a grid or a matrix of rows and columns, which allows easy identification of a particular agent. These can be grouped in various ways, including: alphabetically by name, by workgroup, location, experience, skill set, experience, etc.

The alert may contain the appropriate text and icon information such that the supervisor can identify the nature of the alert quickly and identify the agent that the alert is associated with by the relative positioning of the alert indication. In either the tabular or graphical form, the RTSA alert may be overlaid on the tabular icon, floor plan map, or over the appropriate agent icon or position to identify the agent involved. The alert is positioned to be approximate to the appropriate graphical image associated with the agent. This may be accomplished by overlaying the alert on a portion of the graphical image or the surrounding space associated that graphical image. Other embodiments may use a pointer or other graphical indicator to link the alert to the appropriate agent. In various embodiments, the name and/or image of the corresponding agent may be shown.

Typically, the alert indication is displayed in a transient manner. That is, the alert indication is displayed for a limited amount of time. If the alert indication was permanently displayed, there would eventually be a number of alert indications that would cover the display screen and could interfere with reviewing the information. This would make it very difficult to ascertain which alert indications were current, recent, or important. In other embodiments, the alerts could be configured to be placed on top of one another, with a slight offset. While this minimizes the space taken up, it eventually does increase the area of the displayed consumed.

In various embodiments, an alert count is maintained on the tabular, floor plan or agent icon showing a cumulative number of alerts received. This allows the supervisor to review which agents are incurring alerts, which allows the supervisor to evaluate conditions even if they do not witness the transient alert indication.

Figure 2:
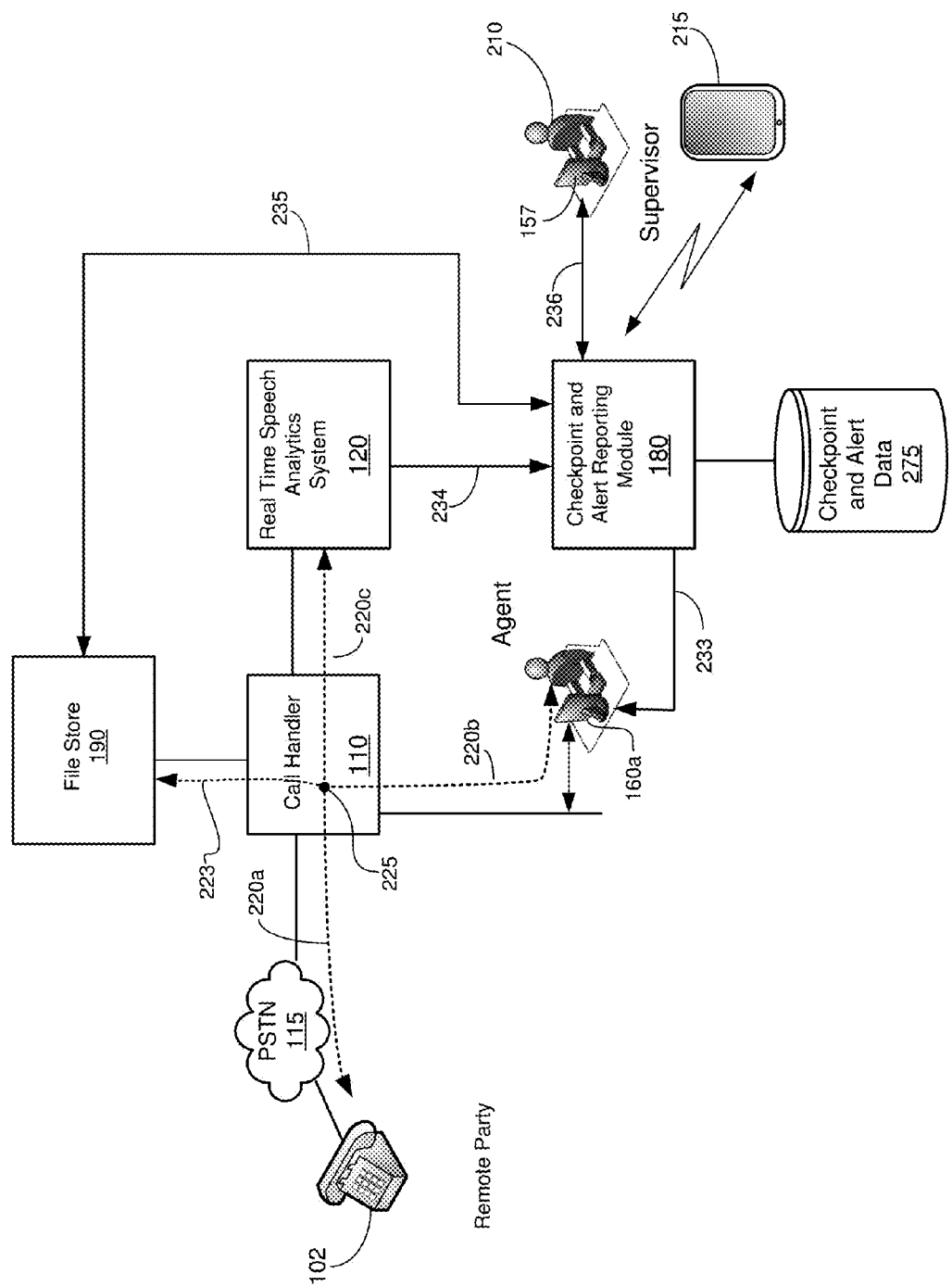
FIG. 2 illustrates one embodiment of a call involving a real time speech analytics system capable of generating real-time alerts that are processed by a checkpoint and alert reporting module and stored for either real-time or subsequently display to a contact center supervisor.

Contact Center Overview—FIGS. 1 & 2

Exemplary Call Center Architecture

FIG. 1 illustrates one embodiment of a call center architecture 100 that may be used in accordance with the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. Thus, although a contact center has been referenced above, for the purposes of the remainder of this disclosure, the term "call center" is used throughout, although it is understood that the two are synonymous to the extent that they both handle voice calls.

Since the call center may handle calls originating from a calling party, or initiated to a called party, the term "party," without any further qualification, refers to a person associated with a call processed by the call center, where the call is either received from or placed to the party. The term "calling party," if used, will generally refer to a party communicating with the call center, but in many cases this usage is exemplary. Thus, use of the term "calling party" is not intended to limit the concepts to only inbound calls or voice calls, unless the context dictates such. Reference to the term "remote party" encompasses either a calling or called party.

Depending on the embodiment, inbound voice calls may originate from calling parties using a variety of different phone types. For instance, a calling party may originate a call from a conventional analog telephone 102 connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 109, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 103. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 103, a conventional telephone 102, a mobile phone 109, or other device known in the art. The term "call" as used herein may encompass an active instance of two-way communication, an attempt to establish two-way communication, or a portion of the two-way communication. For example, a user at a conventional telephone 102 can dial a telephone call in an attempt to establish two-way communication, and a call can be said to exist even prior to establishment of a two-way connection.

In another example, a call may be put on hold, and a portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. In certain contexts, which will be made explicit, the call may encompass communications other than voice, for example, text, email, video chat, facsimile, etc. Unless stated otherwise, a call is a voice call.

In various embodiments, inbound calls from calling parties to the call center may be received at a call handler 110, which could be, in one embodiment, an automatic call distributor ("ACD"). In particular embodiments, the call handler 110 may be a specialized switch for receiving and routing inbound calls under various conditions. Further, the call handler 110 may be embodied as a dedicated form of equipment readily available from various manufacturers, or the call handler 110 may be a so-called "soft switch" comprising a suitable programming module executed by a processing device to perform the necessary functions. The call handler 110 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 110.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 160a-160c, such as a computer, and a voice device 161a-161c that is adapted for various contact center functions associated with processing communications. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, which may be provided via a computer display. This is used to convey information to the agent about the calls, and the agent may interact with the call handler using a mouse or other pointing device with the display.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. The workstation may also communicate this to the call handler. This allows the call center (including the call handler) to know which agents are available for handling calls. In particular embodiments, the call handler 110 may also maintain data of an agent's skill level that may be used to route a specific call to the agent or group of agents having the same skill level. In particular instances, if a suitable agent is not available to handle a call, the call handler 110 may queue the call for the next available agent. As can be expected, various algorithms may be employed to process calls in an efficient manner.

In various embodiments, two types of signaling information may be provided with an inbound call that may be used by the call handler 110 in processing the call. The first type of signaling information indicates the telephone number dialed by the calling party, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the call handler 110 may use the DNIS to determine the purpose of the call, and potentially identify a group of agents having the appropriate skill level to handle the call. Thus, in various embodiments, the call handler 110 may prioritize and route calls to an agent based on the required skill level. Skills-based routing may be a rule-based set of instructions that the call handler 110 uses to handle calls. Depending on the embodiment, skills-based routing may be implemented by the call handler 110, or by the call handler 110 interacting with a computer-telephone integrated ("CTI") server (not shown).

The second type of signaling information that may be provided with an inbound call is the calling telephone number, often referred to as automatic number identification or "ANI." In particular embodiments, the call handler 110 and/or CTI server may use the ANI of an incoming call to retrieve caller information from a data store 175 and provide the data to an agent's workstation computer 160a-160c over facilities 168 along with routing the call to the agent's workstation phone 161a-161c. Further, in particular embodiments, the ANI may also be used to ascertain a party's status (e.g., a "Gold Level" customer warranting premium service), determine whether consent has been received by a party for particular services or actions, and/or to facilitate the call handler 110 routing the call to a select group of agents. Depending on the embodiment, the data store 175 may include one or more databases storing different information such as, for example, records of caller information. Further, the data store 175 may be integrated with the call handler 110 or segregated as a standalone medium or media.

In various embodiments, the call handler 110 may place a call (either an inbound or outbound call) in a queue if there are no suitable agents available, and/or it may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components, such as the CTI server or the data store 175, to retrieve or provide information for processing the call. In other configurations, the IVR may be used to only provide announcements.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In particular embodiments, when an agent is interacting with a called or calling party, the agent may use his workstation computer 160a-160c to further interact with other enterprise computing systems, such as, for example, a customer relationship management ("CRM") server (not shown). A CRM server may be used to integrate information from various enterprise business systems to facilitate the agent servicing the call. In addition, the CRM server may provide a variety of applications.

In addition to receiving inbound communications, including, for example, voice calls, emails, text messages, and facsimiles, the call center may also originate communications to a called party, referred to herein as "outbound" communications. In some embodiments, the call handler 110 may be a dialer, such as a predictive dialer, that originates outbound calls at a rate designed to meet various criteria. The predictive dialer may then connect an agent at a workstation with the outbound call via a call leg after the remote party answers. Similar to the other components within the call center architecture 100, depending on the embodiment, the dialer may comprise one or more software modules executing on a processing device hardware platform.

In various embodiments, the call handler 110 is typically configured to dial a list of telephone numbers to initiate outbound calls. Thus, in some embodiments, the call handler 110 may include functionality for originating calls, and if so, this functionality may be embodied as a private automatic branch exchange ("PBX" or "PABX"). Further, in other embodiments, the call handler 110 may directly interface with voice trunks using facilities 116c, 116d, 116e to the PSTN 115 and/or Internet providers 123a, 123b for originating calls. After the calls are originated, a transfer operation by the call handler 110 may connect the call with an agent or a queue, or in some instances the IVR. In various embodiments, the call handler 110 may make use of one or more algorithms to determine how and when to dial a list of numbers so as to minimize the likelihood of a called party being placed in a queue while maintaining target agent utilization.

Also shown is a Speech Analytics System ("SAS") which may be a real-time speech analytics ("RTSA") system 120. This typically monitors the speech during a call, and is able to monitor both the agent's and the remote party's speech. This is typically accomplished by using a conference bridge or similar function in the call handler 110, with a conference call leg to the RTSA system 120, although the RTSA system only listens to the speech, and does not interject any speech into the conference bridge. The conference call leg to the RTSA system may be unidirectional. The RTSA system typically interfaces with the LAN 170 to communicate with other components, including the call handler 110 and a checkpoint and alert reporting module 180.

The RTSA system is configured to detect certain speech conditions in certain contexts. These speech conditions detected are also known as "topics" or "keywords" since it refers to speech in a particular context. Thus, the RTSA system can be configured to detect an agent's response to a particular question asked by the remote party, or ensure that the agent properly introduced themselves at the beginning of the call. The RTSA system can be configured to detect each speech condition and report its detection The messages generated by the RTSA system may be referred to as "event messages" and may convey information for an alert or a checkpoint, or both. The event messages are received by the checkpoint and alert reporting module, which in turn may be configured to generate other messages for causing alerts or checkpoint widgets to be displayed. The event messages may also be referred to as an "alert message" when the context refers to an event message that conveys information corresponding to an alert. The event message may also convey information that corresponds to a checkpoint status update. This type of event message could also be referred to as a "checkpoint message", but in most cases hereafter it will simply be referred to as an event message. Thus, without further qualification, an "event message" may refer to conveying information associated with either a checkpoint widget or alert, whereas an "alert message" is used to refer to a particular form of event message associated with an alert. Note that this distinction may not be absolute, since some event messages can convey information for an alert that is also defined as a checkpoint.

The topics detected by the RTSA system are typically associated with a name for administrative convenience. As noted earlier, the RTSA system can be configured to detect the agent providing a greeting at the beginning of a call. This topic could be given the name of "welcome." Thus, the "welcome topic" relates to detecting the agent's greeting. Similarly, a "closing topic" could detect a particular closing speech condition. Thus, the names provide an easy reference to a particular speech condition that the RTSA is configured to detect. In situations where the topic or keyword detected is associated with a checkpoint, the name may also correlate to text that is displayed with the checkpoint. However, it is possible the name and the text may be slightly different.

The RTSA system 120 reports each detected topic to the checkpoint and alert reporting module 180 ("CARM"). In one embodiment, the CARM may comprise a processor and associated computer instructions, and may reside in the call handler, the RTSA system, or a separate dedicated processing system. The CARM, in turn, is configured to inform an agent and/or administrator, often at a supervisor's computer 157 or an agent's computer 160, although other processing devices may be involved (e.g., tablets, smart phones 215, etc.). In one embodiment, the CARM processes the alert and/or event message from the RTSA system and generates the appropriate indication to the administrator. As will be seen, the CARM may map an alert message to a variety of alert indication formats, depending on various criteria. Further, the CARM may also process an event message that results in presenting and updating a checkpoint widget to the agent and/or supervisor.

Although a number of the above components may be referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the call handler 110 or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the call center.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

Turning next to FIG. 2, additional detail is provided regarding how a particular call is analyzed by the RTSA system and interacts with the other components. In this illustration, a three-way call is established and shown as a dotted line. One call leg 220*a* of the three-way call involves the telephone 102 of the remote party, which is connected through the PSTN 115 to the call handler 110. The call handler 110 effectively provides a conference capability, illustrated as a three-way bridge 225, although a variety of technologies can be used to provide such functionality, or similar capability of joining call legs together. Another call leg 220*b* is established to the computer 160*a* of an agent, so that the agent and remote party can converse. Finally, the call handler 110 also establishes a third call leg 220*c* to the RTSA 120. This allows the RTSA to listen and monitor the speech between the agent and remote party. Unlike a conventional three-way call, the RTSA may not be able to interject speech into the conference, or if the bridge does allow it, the RTSA typically does not provide speech into the conference. Consequently, the call leg 220*c* to the RTSA may be either bi-directional or unidirectional.

Additionally, there may be a fourth call leg 223 from the call handler 120 to the file store 190. The file store may take a variety of forms, such as a file server, network file store, virtual file store, database, redundant array of interchangeable disks, archival storage, etc. The file store maintains storage of the speech of the call. As will be discussed later, the file store may store this information for a variety of formats, and allows selective retrieval of audio from an indicated call.

The RTSA system 120 is configured to recognize the presence or absence of certain keywords, which may be individual words or sets of words, including phrases. Thus, the RTSA may send an event message based on the real-time detected speech (or lack thereof) detected in a certain context. This event message is received by the CARM 180, which may process the message into an alert or potentially as an update to a checkpoint widget. In the context used herein, an "alert" (by itself, without qualifying the word "message") is information designed to ultimately inform a person with minimal processing, whereas an "alert message" refers to an event message conveying information designed to be further processed by a module for an alert. Thus, the RTSA system 120 provides event messages, typically in a particular format, to the CARM 180, which then may provide suitable alerts in a desirable form effective for human processing or may provide updates to the checkpoint widget. The CARM 180 may also store alert or checkpoint information as a form of meta-data in a checkpoint and alert data database 275.

The CARM may also provide the meta-data related to the call to the file store 190 via signaling 235. For example, for each call stored in the file store 190, the CARM may provide meta-data relating to timing information of checkpoints that occurred during the call. The timing information, as will be seen, may be defined in various formats. One format may be an offset time from the beginning of each call for each checkpoint. For example, the meta-data may have an offset time #1 for the first checkpoint, an offset time #2 for the second checkpoint, etc. The file store 190 may store this information in association with the call recording, so that the call recording and the meta-data can be retrieved at a later time for reviewing the checkpoint widget.

The CARM processes the event message received from the RTSA system via signaling link 234 in order to provide a more useful and effective form of the information via an alert notification or checkpoint widget to the appropriate personnel, such as to the supervisor via signaling link 236 or to the agent via signaling link 233. To accomplish this, the CARM may interface with a LAN 170 for sending particular information to display devices over these signaling links. For example, the CARM 180 may send RTSA alerts or update a checkpoint widget for display on a supervisor's workstation 157, which the supervisor 210 views. In other embodiments, the CARM may send the RTSA alerts or checkpoint widgets to a mobile device, such as to a tablet which may have a Wi-Fi interface. Other devices, such as smart phone 215 may be used by the supervisor. In other embodiments, the CARM may send the checkpoint widget to the agent's computer 160*a* via link 233 and/or to the supervisor's computer 157 via link 236.

Some of the functions performed by the CARM include:

Authorization and Security: administrators may log into the CARM to configure how the alerts and checkpoint widget updates are sent, to whom they are sent, how certain conditions are manifested in the alerts, etc. The authorization and security may be based on conventional user identification and password credentials.

Mapping of event messages. The event message received from the RTSA system needs to be mapped to an alert or checkpoint widget, or both. As will be seen, various conditions may be reported in a RTSA event message and each can be mapped to particular graphical elements, such as icons, images, colors, and even sounds. This mapping may be defined or modified by editing various settings, which provide flexibility as to how RTSA alerts/checkpoint widget updates may be defined. In one embodiment, a mapping table may be used to define the mapping of an RTSA message to an alert indication for a user or for updating a checkpoint status indicator on a widget.

Individuals Receiving Notifications. The CARM is configured to provide alerts/checkup widget updates to certain devices/individuals. These may be based on the type of alert of widget update. For example, all alerts/widget updates may be provided to one device, agent, or supervisor, whereas other select alerts may also be provided to another device, agent, or supervisor. This allows more serious speech conditions to be detected and reported as desired within the contact center. For example, certain RTSA messages may be sent as SMS texts to a smart phone of a team leader as well as the contact center supervisor.

Device Configuration Information. The CARM may also have configuration information as to how information is to be presented on different devices or individuals. For example, information may be configured for display on a computer using a conventional web browser or display on a smart phone using a mobile browser. A supervisor may desire to receive certain types of alerts/widget updates as SMS texts messages, but this requires structuring the text for 160 characters (the size of the SMS text). In other embodiments, alerts/widget updates may be sent to a paging system, voice announcement system, etc.

Checkpoint and Alert Reporting Module Process Flow

Various embodiments of the concepts are reflected in the process flows contained in the figures. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The following discussion (e.g., for FIGS. 3A-12) largely focuses on the processing of alerts, though many of the concepts may be applicable to the processing of checkpoint widgets. The discussion thereafter (e.g., for FIGS. 13-21) largely focuses on the processing of checkpoint widgets, though many of the concepts may be applicable to the processing of alerts. The discussion for FIG. 22 applies to both alerts and checkpoint widgets.

Figure 3A:
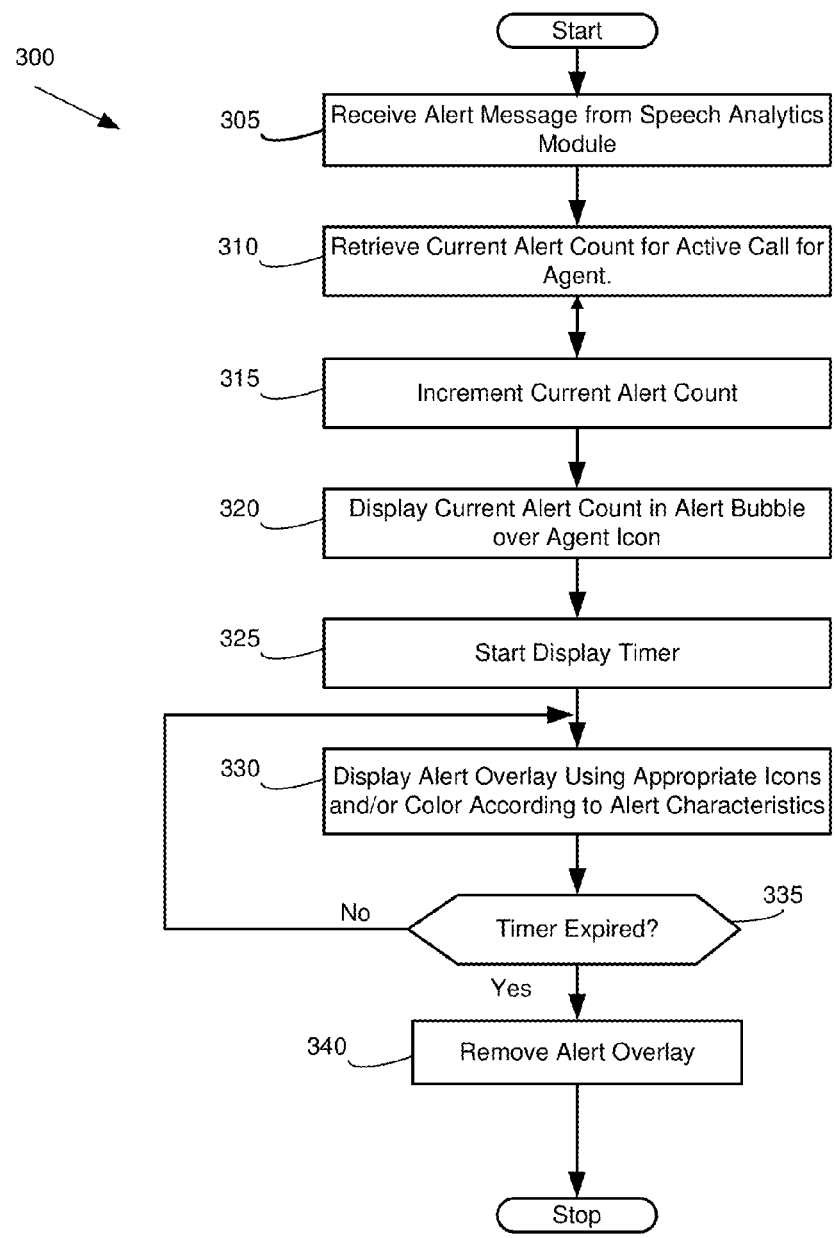
FIGS. 3A-3B illustrate embodiments of process flows of the checkpoint and alert reporting module to display real-time speech analytics alerts.

The CARM receives the RTSA system alert messages from the RTSA system and processes this information in order to generate the alerts intended for human consumption. A high level process flow 300 is shown in FIG. 3A. The process flow 300 begins with receiving the alert message (i.e., event message) from the RTSA system in operation 305. This could be conveyed on a direct link, or by using a LAN as shown in FIG. 1. The message can be provided using a variety of formats, and the content is processed by the CARM. Typically the message provides information about the RTSA topic or keyword that was detected, also referred to as the "speech condition." This typically includes context information such as the time of the detection of the speech condition, an identifier of the particular call, and in some embodiments, information identifying whether it was the agent or remote party. Depending on how the RTSA topic is defined, additional information may also reflect whether a topic (e.g., keyword) was detected during a call or its absence was noted during a call. In various embodiments, the event message may not convey information as to the severity, impact, or individuals to be notified, though it could be indicated in the event message. As can be appreciated, the exact information conveyed in the event message conveying alert information may vary in different embodiments. Typically, the information at least identifies the speech condition detected on a specific call.

Next, the CARM retrieves a current alert counter for that active call for that agent in operation 310. This counter reflects the current cumulative number of alerts received for that call and the counter is incremented in operation 315. This count may be also stored in the agent's alert count in a database previously identified, so that cumulative statistics may be maintained for the agent. In some embodiments, cumulative counts for the number of alerts received during a call for an agent are maintained, and may also be cumulatively maintained for the shift of the agent and/or for an extended time period (e.g., two weeks, quarterly, annually). This allows easy reference by a supervisor to evaluate the progress (or trending pattern) of the agent over time or view a snapshot of the agent's performance during the call or during their shift.

The current alert counter is then displayed in operation 320 over an agent icon in an "Alert Bubble" which may be in one embodiment a circle encasing the numerical value. This is a static indication, since it always appears in conjunction with the agent icon. The agent icon is a graphical representation of an agent. As will be seen, there are other graphical user information element formats which can be used in lieu of agent icons, but the illustration herein is based on using agent icons.

The next steps are focused on displaying a dynamic alert indication. This may be displayed in a transient manner, typically over, or adjacent to, the agent icon. First, a display timer is started in operation 325. This timer defines how long the RTSA alert is displayed over the agent icon. This value is typically set between 1 and 15 seconds, which is long enough to capture the attention of an individual looking at the agent icons and perhaps allows them to read the text provided with it, but not too long that the cumulative display of RTSA alerts begins to "clutter" the display of agent icons. Other timer values may be used, and the range of 1-15 seconds reflects a typical range, and not any sort of limit. Shorter or longer range values may be used.

Next, the RTSA alert is displayed in operation 330. The particular format of the RTSA alert may depend on the content of the RTSA message received from the RTSA. The format may reflect different colors, icons, fonts, and text, which may be based on the type and severity of the alert message. The CARM may use an alert mapping table (discussed below) to map alert information in the event message to various colors, fonts, icons, and text that is to be displayed. Reference to an alert mapping table is intended to encompass other types of data structures or mechanisms that may be used to perform the mapping function. Thus, reference to the "alert mapping table" should not be interpreted as requiring a table structure in all embodiments. Further, as will be seen, the alert mapping table may also contain information related to checkpoint widgets.

The RTSA alert is usually displayed until the display timer expires. Hence, in operation 335 a decision reflects whether the timer has expired. If not, the process loops back to operation 330 which has the effect of maintaining the display. Once the timer expires in operation 335, the process continues by removing the alert overlay from the display in operation 340. The process is completed at that point.

The steps occurring in operation 330 that map the alert message into the RTSA alert for human review may greatly vary from embodiment to embodiment. The procedures defined herein reflect one approach, which allows certain alert information to be quickly conveyed and subsequently reviewed in greater depth by a supervisor in a contact center. The potential for a large number of RTSA alerts, which depends on the number of agents involved in simultaneous calls and the number of speech conditions detected, can greatly vary. Thus, the need to provide an effective synopsis of the relevant information depends on each embodiment. For example, some RTSA alerts may inform the viewer of compliance violations that could result in legal liability to a contact center operator. Such violations need to be easily distinguished by the supervisor from other, less critical, RTSA alerts.

The user viewing the agent icon may choose to view additional information about the alert, or other historical alerts associated with that particular agent. This may be accomplished by the user selecting the alert bubble or agent icon using a pointing device (e.g., mouse, joystick, cursor control, touch-screen, stylus, etc.) In one embodiment, the user may select the alert bubble or the agent icon at any time, including during the transient display of the alert indication over the agent icon. In another embodiment, the user may select the agent icon after the display of the transient alert indication ceases. In this case, the alert count shown in the alert bubble is displayed and informs the user that there was a prior alert indication received and that further information is available. This process flow is shown in FIG. 3B.

Figure 3B:
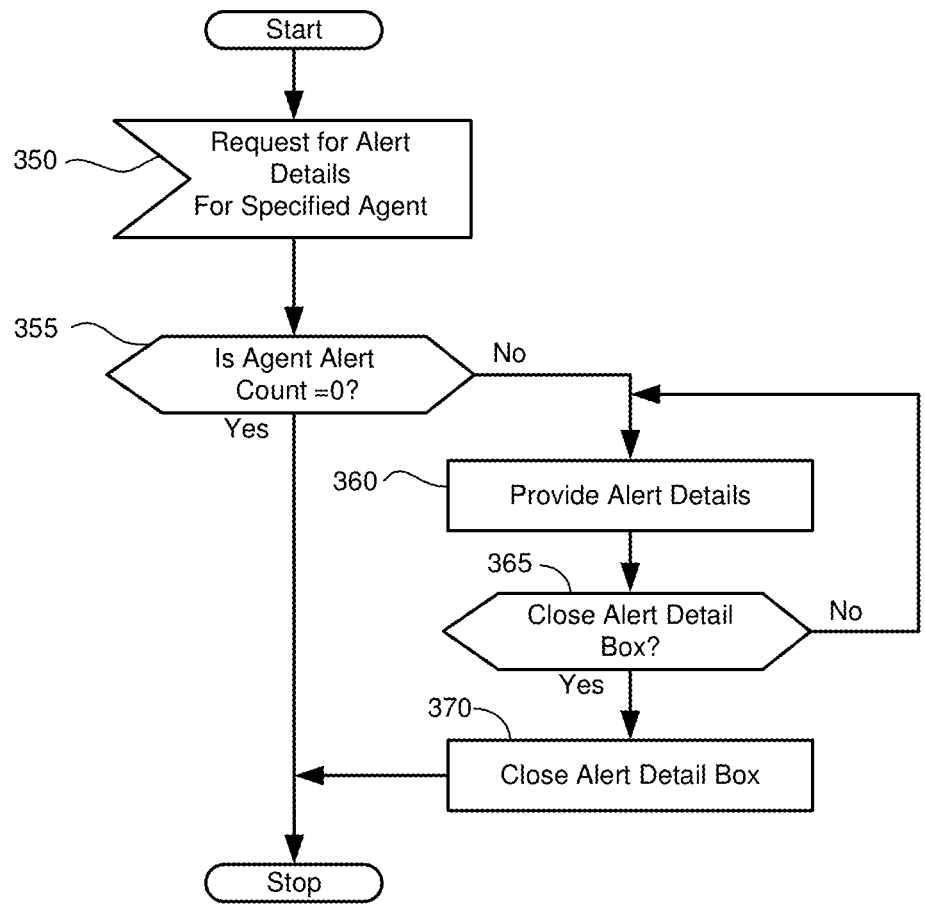

Turning to FIG. 3B, the process flow begins with receiving an input from the user requesting additional alert details in operation 350. A determination is made for the selected agent whether there are, in fact, any reported alert indications for that specific agent. If the alert count is zero (indication there are no prior alert indications), then the process terminates as there is no further information to display. If, however, the alert count is non-zero (e.g., a positive number), then there is additional alert information to be displayed. The appropriate information may be retrieved from a database, an alert log, or from memory. The alert details are provided in operation 360 to the user. This may be displayed using a variety of formats. The information may be displayed until an input is received closing the alert detail box in operation 365. Thus, if no such input is received, the process loops back to display the alert detailed in operation 360. Once the input is received to close the alert detail box, then the alert detail box is closed in operation 370. At that point, the process is completed.

Figure 4:
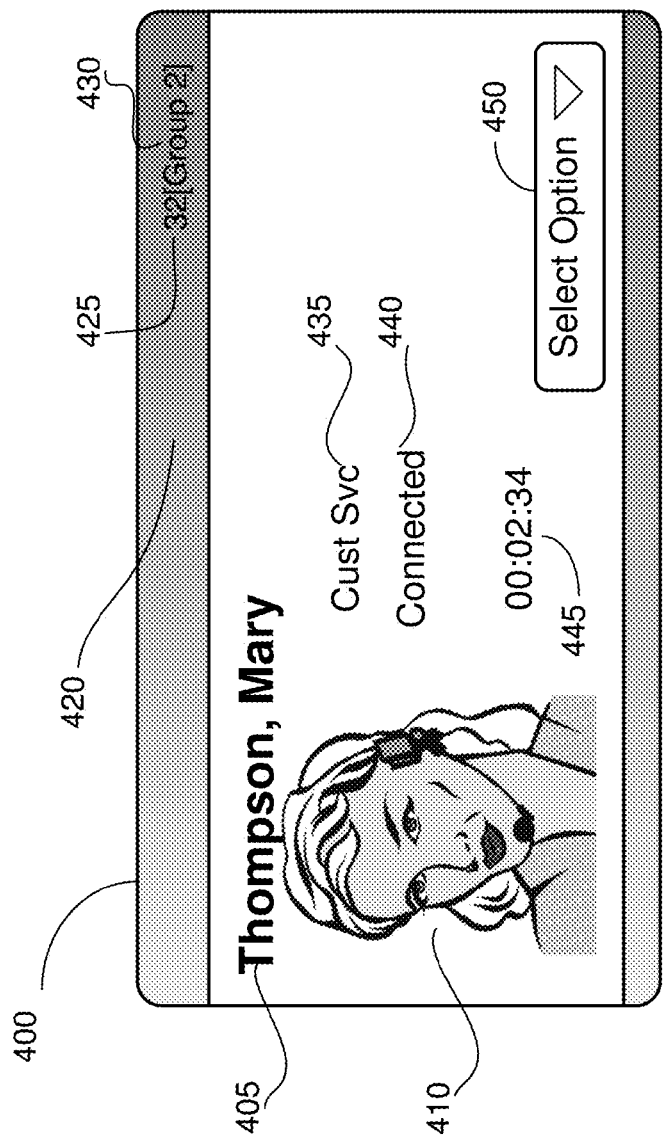
FIG. 4 illustrates one embodiment of an agent icon that may be displayed on a workstation.
Figure 5:
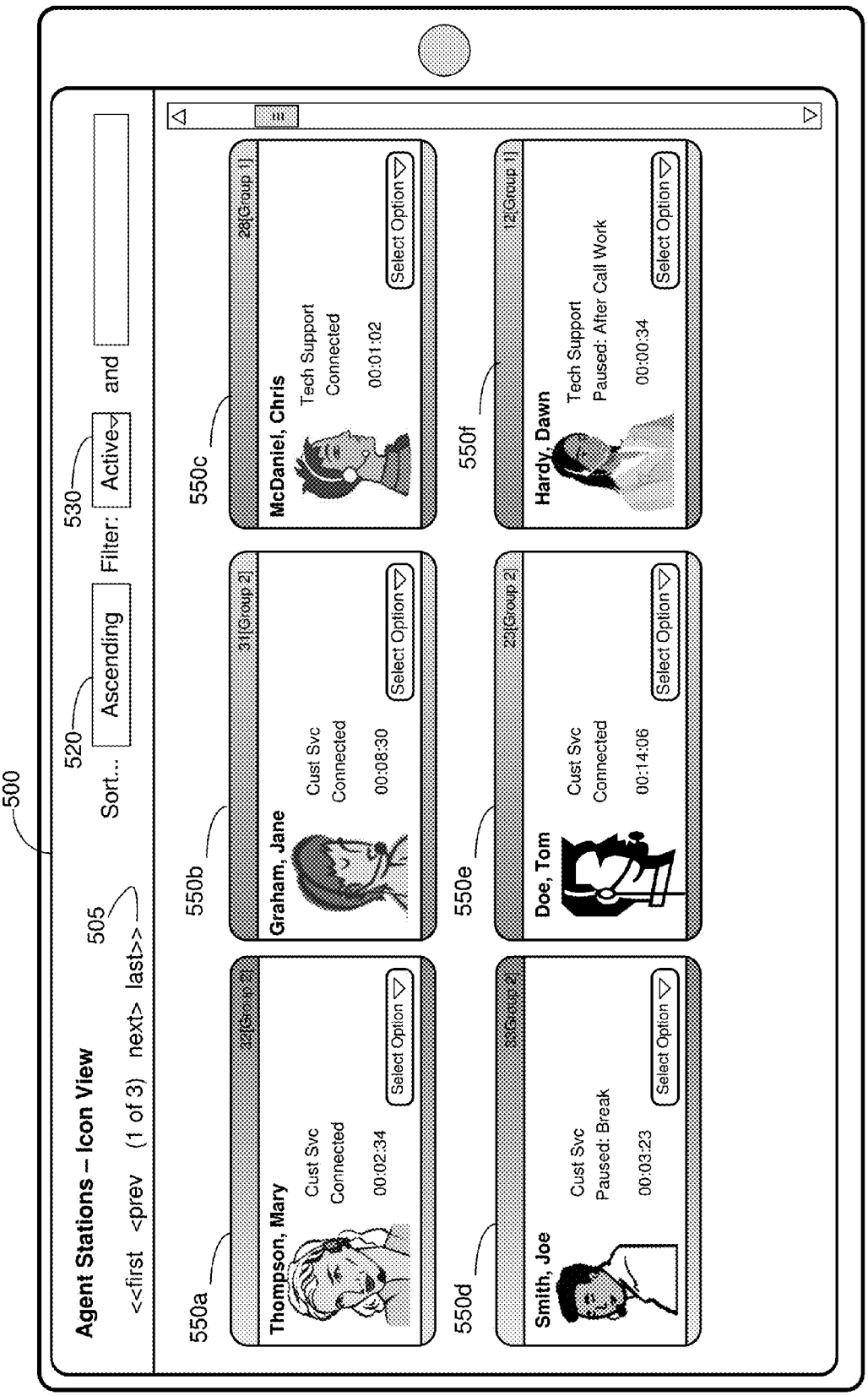
FIG. 5 illustrates one embodiment of a display on a workstation showing a plurality of agent icons.

Agent Icons Associated with Alerts—FIGS. 4-5

One format for displaying RTSA alerts involves overlaying a RTSA alert on an agent icon. Typically a grid of agent icons are viewed or presented at any given time. Before this aspect is reviewed further, it is appropriate to illustrate one embodiment of an agent icon.

Turning to FIG. 4, a representative agent icon 400 is shown. This is a box containing information that is designed to identify an agent and provide high level status information. For the purpose of identifying the relevant agent, each agent icon may include an image 410 of the agent, which may be a picture, icon, or caricature of the agent. If an image is not available, a generic "outline profile" may be used. In addition, a name 405 of the agent is provided. This allows the viewer to quickly associate the face and name of the agent for identification purposes.

A variety of status indicators may be provided. In this embodiment, an indication of the call campaign 435 is indicated. In this example, the agent is fielding customer service calls. The agent state 440 is reflected, which may be: connected, paused, waiting, or logged off. Other states may be defined. Briefly, "connected" means the agent is connected on a call; "pause" means the agent is not on a call, nor available to receive a call; "waiting" means the agent is ready to receive another call; and "logged-off" means the agent has logged off of the call handler. A timer 445 reflects how long that agent has been in that state. (For logged off, this value may be set to zero or null.) Thus, in FIG. 4, agent Mary Thompson is currently engaged in a customer service call and has been doing so for the last two minutes and thirty-four seconds.

Other information shown may include an agent station number 425, which may reflect a particular workspace location, physical telephone, or logical phone being used by the agent. In addition, a group indicator 430 may be used to indicate what group the agent is assigned to. It is possible, for example, that there may be multiple groups assigned to the same campaign.

The "select option" 450 icon allows a supervisor to select various functions that can be performed for that agent. These include: barge-in (joining the call), monitor (to listen to the call), or log-off the agent (to make the agent unavailable for further calls). Other functions may be defined.

Finally, the agent icon may include a color portion 420, shown in the figure as a shade of gray, although in practice, various colors may be used. The color may reflect the state of the agent, which can provide an easier means of identifying an agent's state as opposed to reading text 440. Further, the colors can also reflect other states, such as being monitored or a specific activity while in the paused state. Other embodiments may use different shadings, hatching patterns, etc.

A collection of agent icons may be assembled on a screen of a workstation or tablet. One embodiment is shown in FIG. 5. In this figure, the screen 500 is referred to as having a "grid" layout of agent icons 550a-550f, because the agent icons are typically arranged in rows and columns (e.g., a grid). Typically, a subset of all the available agent icons are shown on a single screen, which necessitates navigation controls 505 for selecting an appropriate page. Further, tools may be provided such as a sorting icon 520 or a filter 530 icon for searching and/or sorting through the agent icons.

RTSA Alerts—FIGS. 6-9

Figure 6:
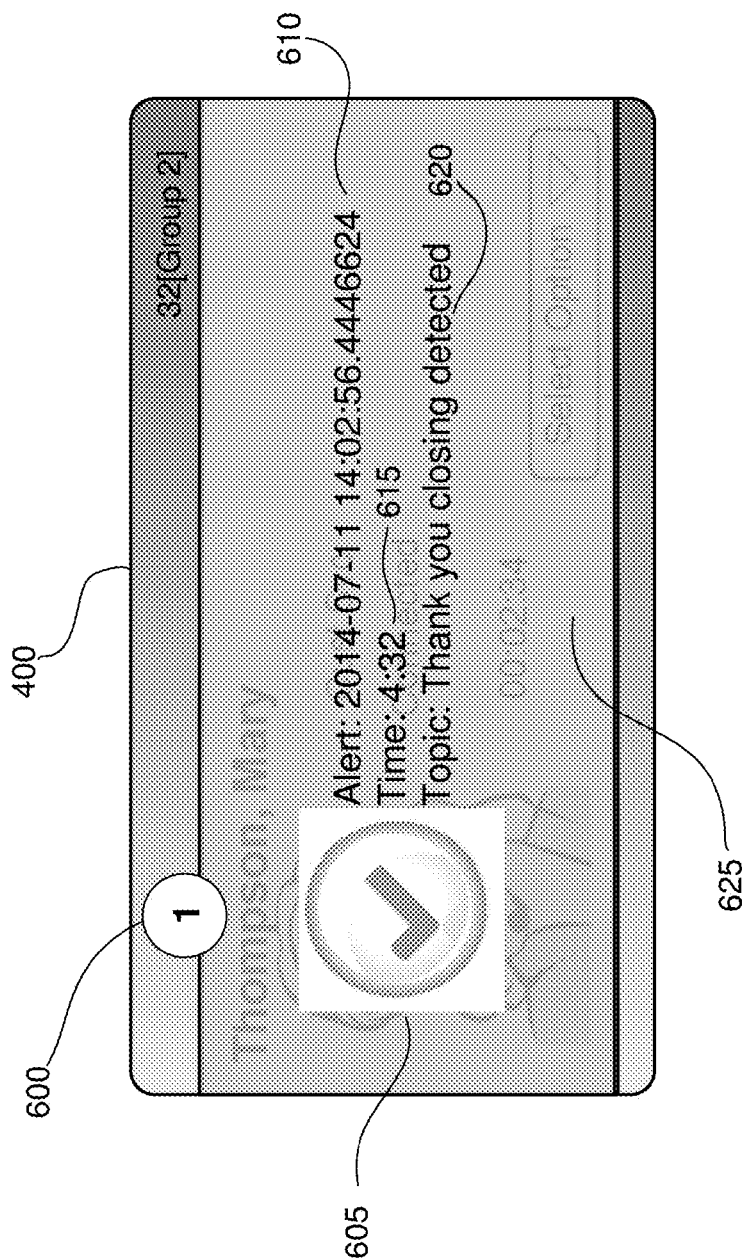
FIGS. 6-7 illustrate embodiments of real-time speech analytics alerts overlaid on an agent icon.

In one embodiment, the RSTA alerts are dynamically overlaid on the grid of agent icons. Specifically, a RTSA alert for a particular agent is overlaid on the corresponding agent icon. One embodiment of a RSTA alert is shown in FIG. 6. In FIG. 6, the agent icon 400 for Mary Thompson is shown. However, overlaid is the RTSA alert 625. In this embodiment, the RTSA alert 625 is partially transparent so that portions of the underlying image may still be seen. In other embodiments, as will be seen, the RTSA alert may be opaque so that the underlying image is not seen.

Each RTSA alert will cause an alert bubble 600 to appear. In this embodiment, the alert bubble is a circle, although in other embodiments other shapes may be used. In some embodiments, just a number may be present. The number in the alert bubble (a.k.a. the "count") represents the cumulative number of alerts for that agent during the current call. In other embodiments, the number may be defined with respect to the current shift, in the last hour, the past week, etc. In this embodiment, it is assumed that the number is based on the current call. Thus, in FIG. 6, this is the first alert reported for the current call involving this agent.

An alert icon 605 is provided, which provides a ready indication of whether the alert reflects a positive or negative condition. Recall that alerts may reflect the detection of a speech condition or the absence of a speech condition. Depending on how the speech condition is identified, the reporting of the condition could be a positive occurrence. For example, agents may be trained to thank the caller at the end of a call, and consequently detecting this speech condition would be viewed as a positive occurrence. In this example, the agent has done so, and consequently a positive icon 605 is shown.

The RTSA alert may also include text that informs the reader on the specifics of the alert. For example, text 610 may be provided that reflects a date, time, and call identifier for the speech condition that was detected. A time 615 into the current call may be indicated. This allows identification of the speech should verification be desired. Further, text 620 may reflect the particular RTSA topic that was detected. Finally, a color background may be used to indicate the particular type of alert, severity of alert, etc. For example, a positive condition may include a green background whereas a negative condition may incorporate a red background. Other colors or visual patterns may be used.

The RTSA alert may appear by fading in over the agent icon for the duration of a display timer, and then may fade out upon the expiration of the timer. The use of a background color and an icon allows the viewer to readily ascertain the relative importance of the alert, even if the supervisor does not read the text and only sees the RTSA alert for a fraction of a second. Further, the alert bubble 600 provides a simple means to review which agents are encountering a large number of alerts. This provides an easy to use mechanism allowing the supervisor to evaluate an alert.

Figure 7:
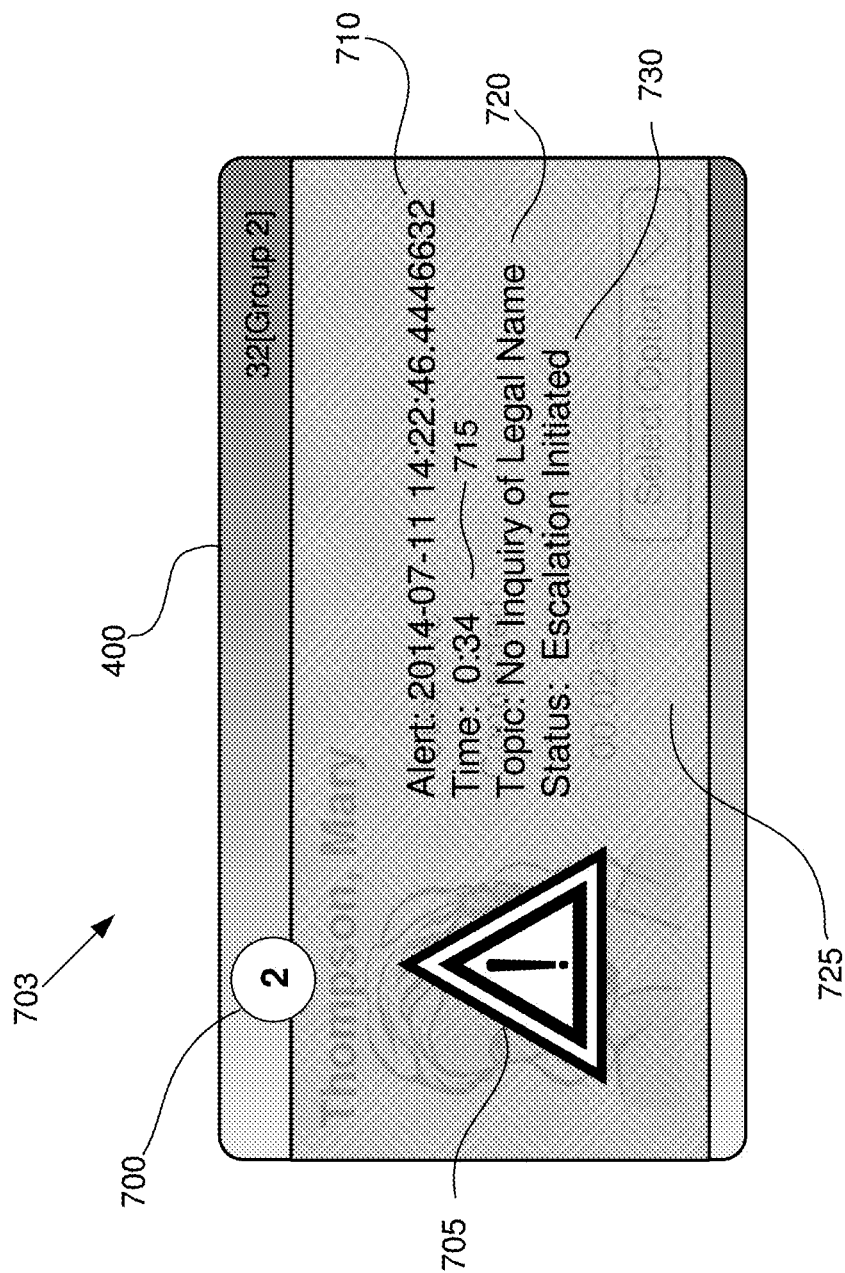

FIG. 7 illustrates another embodiment of a RTSA alert 703. In this example, the same agent icon 400 is involved, though most of it is obscured by the alert. It is assumed that this is the second alert received during this call for the agent. Thus, the alert bubble 700 reflects a "2".

The alert icon 705 in this embodiment is a warning icon, reflecting that a negative speech condition was detected. This may be accompanied by a red background color 725. The alert also includes text that reflects the date, time, and call 710, the time into the call 715, the topic detected 720, and in this case, additional information related to additional actions, namely that an escalation has been initiated 730. This may reflect a notification was sent to another individual regarding the presence of the alert.

Figure 8A:
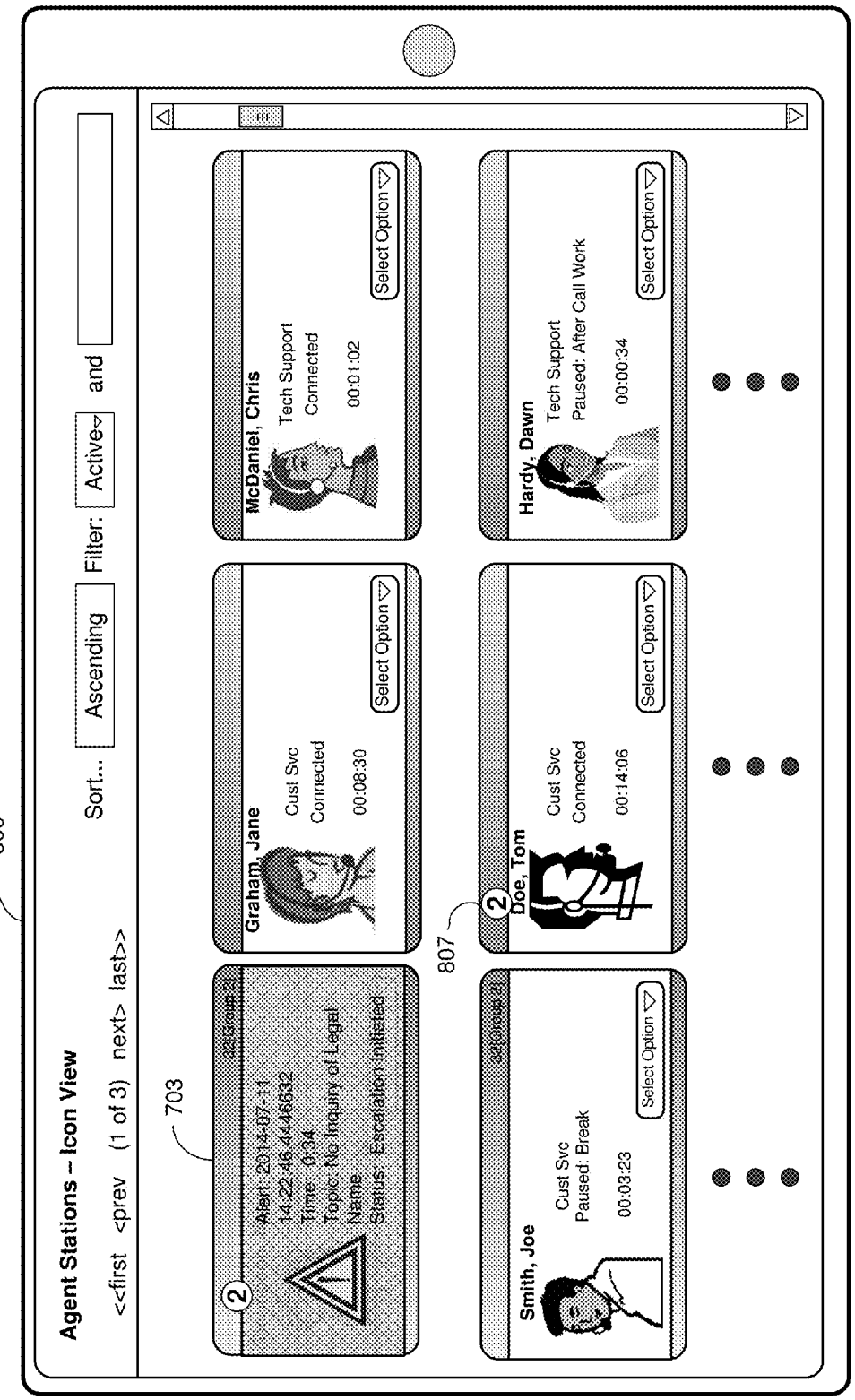

FIG. 8A shows how the RTSA alert 703 from FIG. 7 would appear when presented on a screen comprising a grid of agent icons. In FIG. 8, the screen 800 shows the grid of agent icons, and the RTSA alert 703 is shown overlaid thereon. This would be shown for the duration of the display timer, and then fade away so that the original agent icon would be shown. However, after fading away, the alert bubble would remain indicating the number of alerts having been received for that current call. For example, another agent is shown with another alert bubble 807. If this is defined to reflect the number of alerts during a particular call, then the value is reset (or the alert bubble removed) after the call terminates.

Figure 8B:
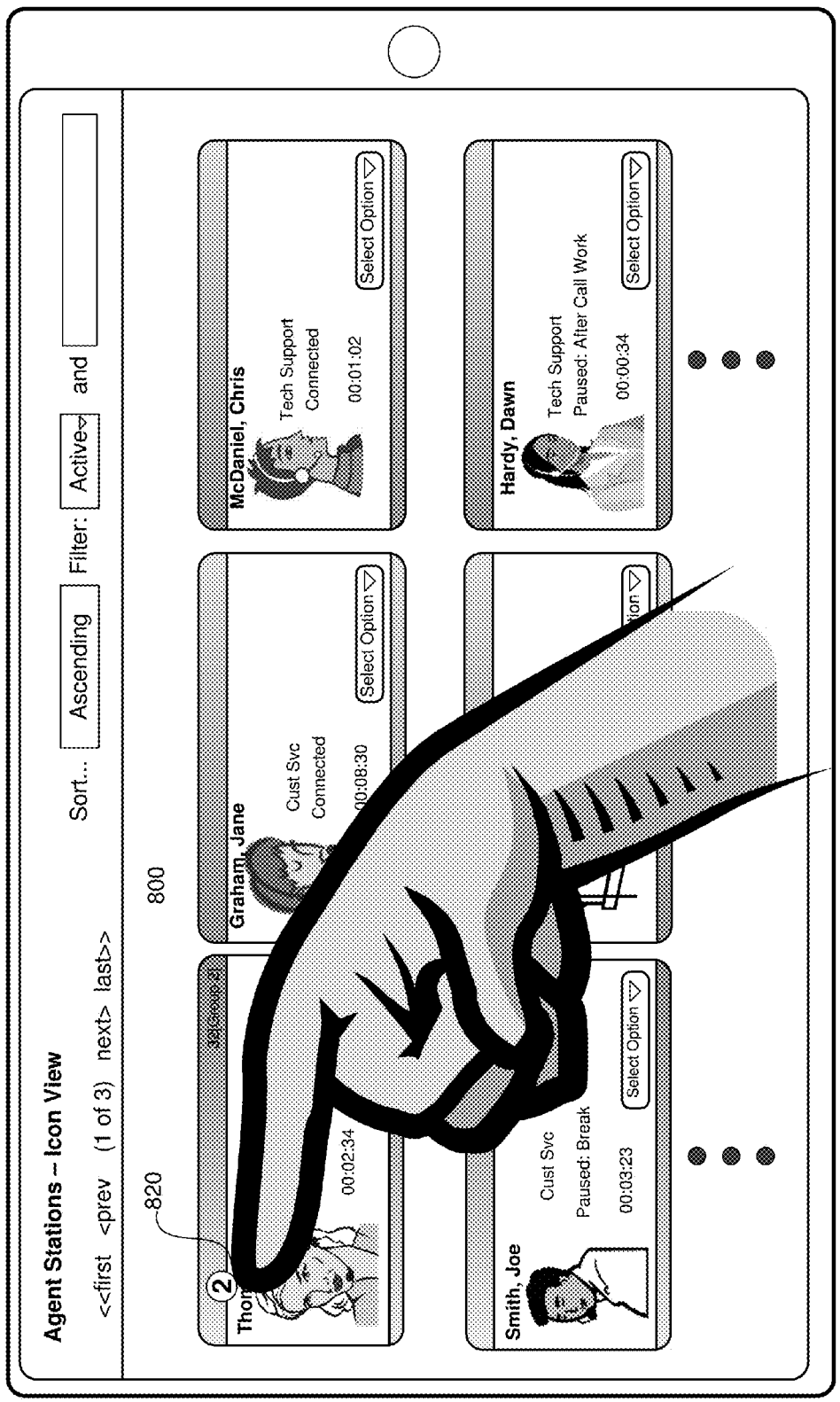
Figure 8C:
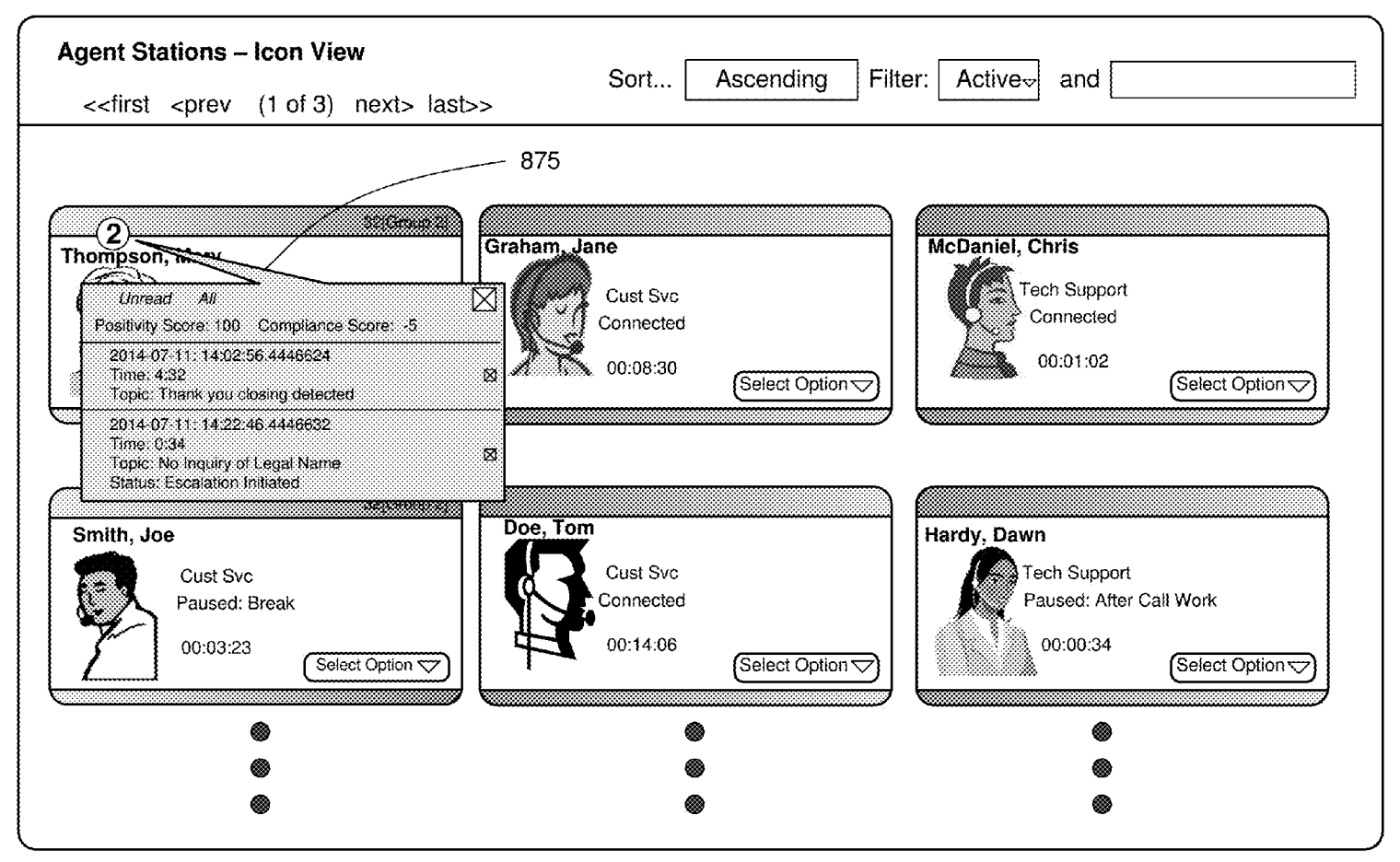

In various embodiments, the viewer may select the alert bubble by selecting the alert bubble icon. Depending on the technology involved, this may involve the user using a mouse to position a cursor over the alert bubble or using some other pointing device. In FIG. 8B, it is assumed that a touch-screen is being used on a tablet, and the user may select the bubble alert by touching it with his finger 820. Selecting the alert bubble will cause a pop-up window 875 to appear as shown in FIG. 8C. This pop-up window 875 includes text associated with the prior alerts. A more detailed view of the pop-up window 875 is shown in FIG. 9

Figure 9:
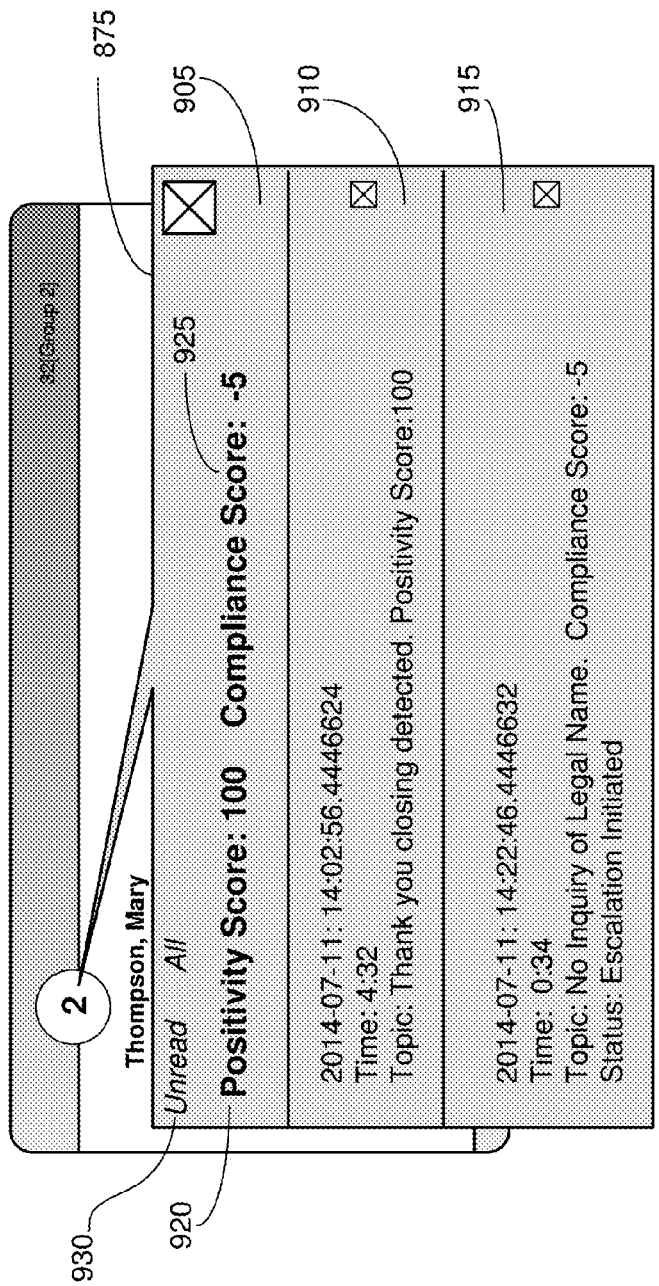
FIG. 9 illustrates an embodiment of further information associated with a real-time speech analytics alert.

Turning to FIG. 9, the pop-up window 875 may include text portions 910, 915 that reflect the text with prior alerts. The agent may chose to read and mark these as having been reviewed. Separate controls may be presented 930 allowing the agent to review all of the alerts for the agent or only those unread. In addition, another portion 905 of the pop-up window includes a positivity score 920 and a compliance score 925. These scores provide a summary of the current standing on the agent's performance relative to customer service (e.g., "positivity") and compliance. These scores are assigned to each detected RTSA topic and allow a weighting of the relative importance of the detected speech conditions. In other embodiments, the scores may be defined for a different category or purpose.

Figure 10A:
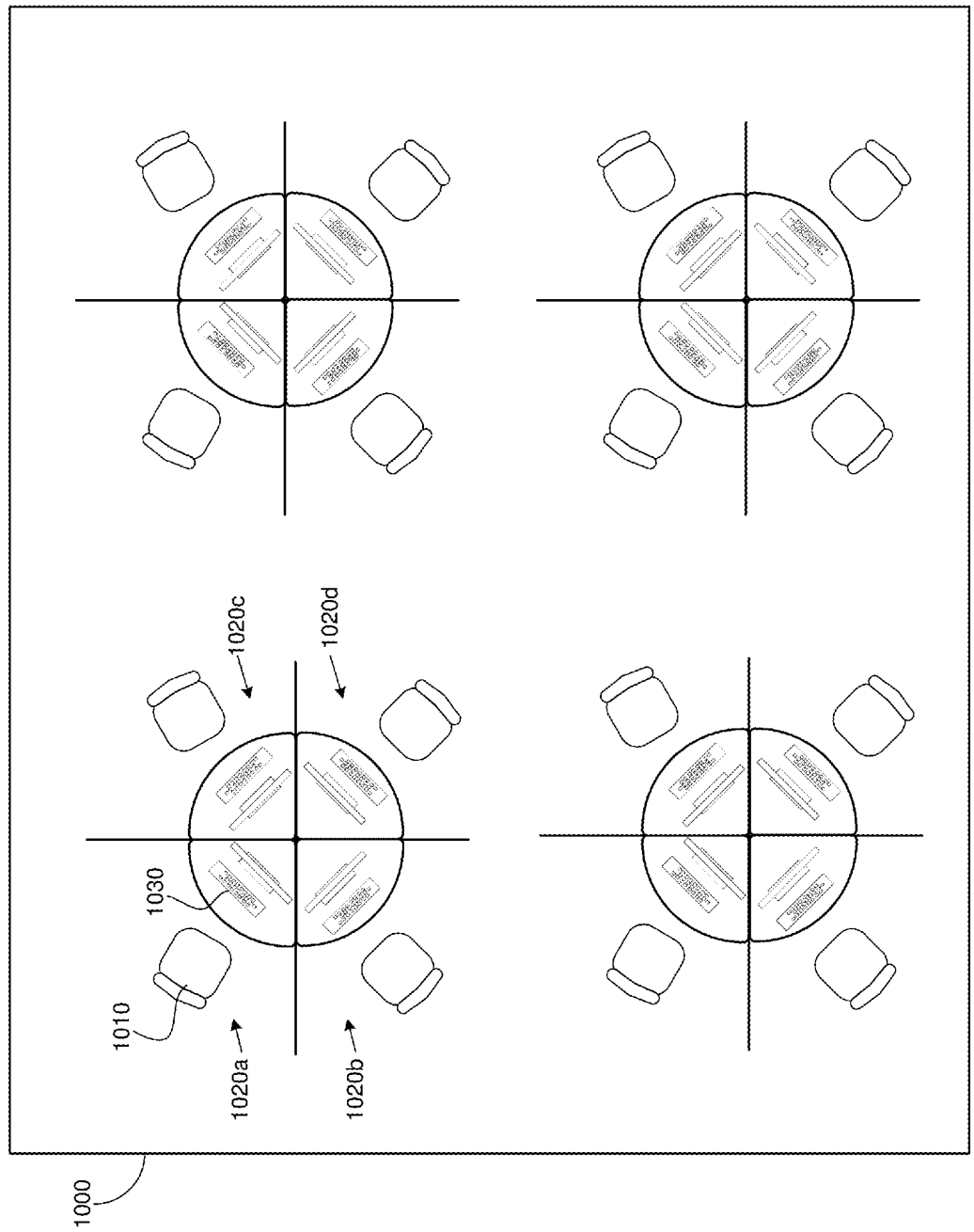
FIGS. 10A-10C illustrate an embodiment of a floor plan map and a real-time speech analytics alert overlaid thereupon.
Figure 10B:
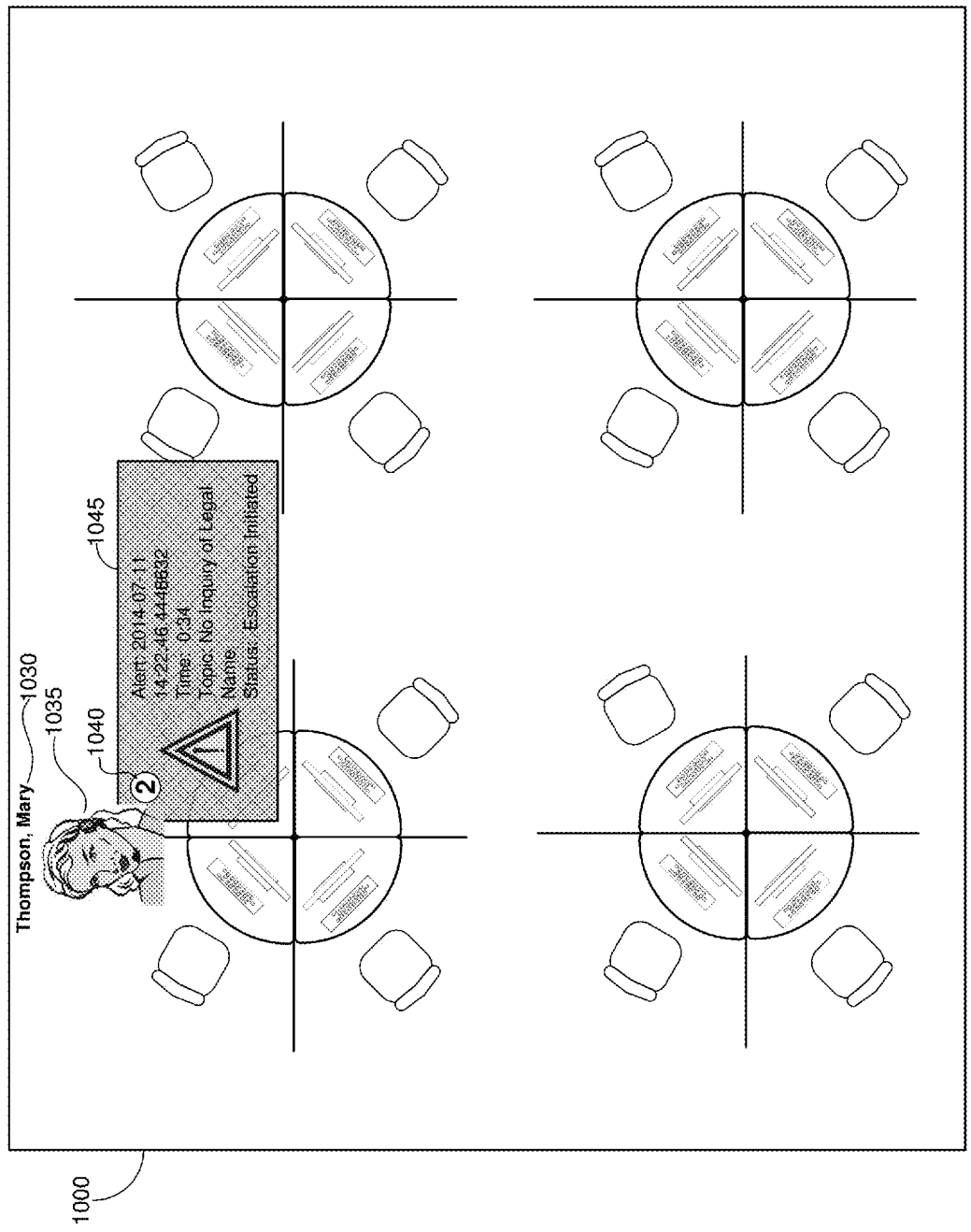
Figure 10C:
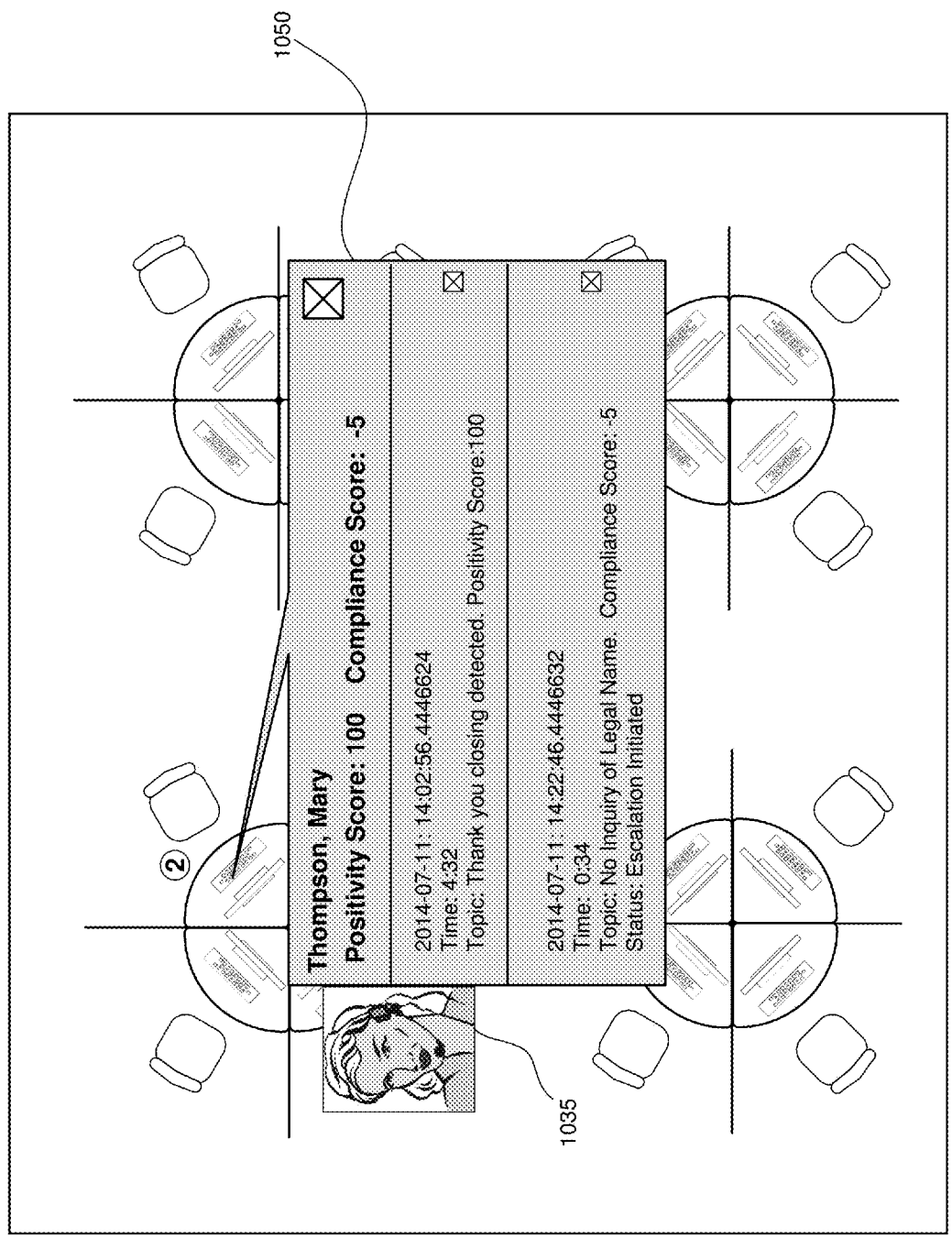

Other Graphical Formats for Alerts—FIGS. 10A-10C

Other graphical formats may be used for displaying a RTSA alert. One such format involves a graphical depiction of an office layout or floor plan. The floor plan represents the locations of the workspaces of the various agents. One such representation is shown in FIG. 10A. In the floor plan layout 1000, a quadrant of workspaces 1020a, 1020b, 1020c, and 1020d are defined. Each workspace has e.g., a chair 1010 and a workstation 1030 used by an agent. The quadrant of workspaces may be in turn replicated as needed. In the floor plan 1000 shown, a total of sixteen agent workspaces are shown.

Each agent may be assigned a workspace location and the supervisor may associate a workspace location on the floor plan with a particular agent. Thus, when a RTSA alert is displayed over a work location, the supervisor can then associate the alert with the agent. One embodiment of a dynamically displayed RTSA alert is shown in FIG. 10B. In this figure, the RTSA alert 1045 is overlaid at the workspace of the agent. The alert bubble 1040 is displayed as well, along with the agent's name 1030 and picture 1035. The positioning of the agent's name and picture facilitates identification of the agent by the supervisor, in addition to placing the RTSA alert over that agent's workspace. This may be useful for some embodiments where agents may share a workspace for different shifts or days during the week. The RTSA alert is temporarily displayed, and will fade out after the display timer expires.

The supervisor can select the workspace to review additional information regarding the alert. This can be accomplished by using a pointing device, as disclosed before. Once the workspace is selected, the alert text box 1050 shown in FIG. 10C may be displayed. This allows the supervisor to read additional details of the latest or other previous alerts. The supervisor can close the alert text box when completed. This allows the supervisor to then view other RTSA alerts or select other workspace locations for investigation.

Tabular Formats for Alerts—FIGS. 11A-11B

The prior embodiments illustrate application of various graphical formats for displaying the overlaid RTSA alerts. It is also possible to use a tabular format for displaying overlaid RTSA alerts. The use of a tabular format operates in concept similar to the graphical format, except that a spreadsheet-like format may be employed. One embodiment is shown in FIG. 11A. In FIG. 11A, the table 1100 comprises various columns with various identifiers. Included is a column 1105 for the agent's name and a column 1110 for the number of current RTSA alerts. This represents the number of current alerts for the call that the agent is currently connected to. In addition, another column 1120 for the number of cumulative RTSA alerts is shown. This represents the number of alerts associated with that agent since the beginning of a time period, such as in the past hour, since the start of their shift, for the week, etc.

In this embodiment, the dynamically displayed RTSA alert comprises an icon 1130 which may be temporarily displayed. This draws attention to the supervisor viewing the table that a RTSA alert has been reported. In other embodiments, additional information may be presented regarding the alert, its severity, etc.

If the supervisor desires to view further information, the supervisor may again use a pointing device, such as a mouse, joystick, or stylus, to select the cell of that agent for which additional information is desired. A touch screen could also be used. Once selected, additional alert information may be presented as shown in FIG. 11B. In FIG. 11B, the alert text window 1160 is presented, which provides the additional information. The supervisor can then close the alert text window 1160 when viewing is completed.

No doubt that one skilled in the art may be able to devise variations on the concepts and technologies disclosed above in light of the present disclosure. There are a variety of graphical formats that can be used for defining the contents of agent icons, how they are arranged, and how RTSA alerts are defined and displayed. For example, other floor plan configurations are readily possible that could be used, including using rows and other workspace cluster formations. With respect to using a tabular-based presentation interface, the tabular arrangement can be displayed as a real-time dashboard and may incorporate or display other information in real-time.

Alert Mapping Table—FIG. 12

FIG. 12 shows one embodiment of an alert mapping table. This data structure may be accessed by the CARM and used to process an event message from the RTSA system in order to generate the appropriate RTSA alert in a human readable form, or update a checkpoint widget. The event message from the RTSA system typically reports the speech conditions, called "topics" in a specific call, involving a particular agent. In various embodiments, it is the CARM that then uses this information to generate the appropriate alert or update the checkpoint widget. Although referenced as a table, other types of data structures are intended to be covered.

Turning to the table 1200 in FIG. 12, a number of columns are presented. The first column is the RTSA Topic column 1205, which functions as an index. Although represented as text, it usually is a numerical value corresponding to a particular speech condition. For example, the "Welcome Greeting" topic (or keyword) refers to the RTSA system detecting the presence of an appropriate greeting by the agent upon answering the call. Upon detecting this RTSA topic, an alert is formatted as defined by the various other characteristics.

The second column 1210 defines a color to be used when displaying the RTSA alert. In the case of the Welcome Greeting 1250 topic, it is a green color. Further, the next column 1215 indicates the appropriate icon to use, which is illustrated as a checkmark. In practice, again, the value in the table would be a numerical value corresponding to that icon by indicating a stored image. There may be a correlation between the icon used and the level of severity associated with the event. There may be a number of different types of alerts which correlated to a "warning" severity level, each of which may have a different number of points associated therewith. Thus, different actions could be defined to occur at different severity levels. Thus, a "warning" severity may correlate to displaying a certain icon and text to an agent or supervisor, whereas a "severe" severity level may entail a different action. Typically, there are a few number of severity levels defined (e.g., typically 5 or less).

The fourth column 1220 indicates to whom the alert should be sent to. In this case, it is sent to the supervisor, according to the configured manner (e.g., using an agent icon grid, tabular format, etc.). Other alerts may result in another message (e.g., a text message) being sent to a team leader or other individual. The fifth column 1225 defines the text that should be displayed with the particular alert. This is in a human readable form, and in the example shown, the text indicates "Greeting Detected".

The next two columns 1230, 1235 represent "positivity score points" and "compliance score points." These represent mechanisms to allocate a weight to the detected speech condition. This allows the supervisor to review a cumulative score that represents how well the agent is performing. The categories and definition of these scores can vary significantly from embodiment to embodiment, but they represent a numerical value associated with certain speech conditions that reflects a current and/or aggregate performance metric of the agent.

The indication of a severity level may also be included, which may be separate from the number of points provided with a detected speech condition. The number of points may reflect a granularity which is not possible, or appropriate, with defining various severity levels. For example, a scale of 1 to 100 allows various points to be allocated to various conditions, and it would not be practical to define 100 different severity levels. Typically, there are a few levels (e.g., five or less) severity levels, which may correlated to certain colors, icons, etc. The score allows a separate and independent approach for measuring speech conditions separate from defining severity levels.

The positivity score may be allocated to speech conditions which represent good behavior. By allocating a negative score, bad behavior can be represented and measured. In one embodiment, these speech conditions can be linked to customer service goals. For example, the alert mapping table 1200 allocates positivity score points for providing a welcome greeting and providing a proper "wrap up" (e.g., thanking the customer and asking if there are any other questions they may assist with). On the other hand, points may be subtracted if the agent states a curse word during the call. Thus, the cumulative number of positivity points can be used to evaluate how well the agent is performing in these aspects.

Similarly, the compliance score points may be allocated on matters that relate to compliance issues. These may be assigned to detecting compliance related speech conditions. For example, the alert mapping table 1200 allocates negative compliance points for two topics. Specifically, –20 points are allocated whenever the "lawyer retained" topic is detected and the agent continues to collect the debt, and –100 points when the "mini-Miranda" speech condition is not detected. The "lawyer retained" topic may be defined as detecting attempts by the agent to continue collecting a debt when the party has informed the agent that they have retained a lawyer. In this case, the agent should cease any attempts to collect a debt, and attempting to do so may be a violation of a regulation. The "mini-Miranda" speech condition reflects that the agent should inform the party that the purpose of the call is to collect a debt. Thus, the "mini-Miranda" should be stated by the agent shortly after the call is answered. Violation of this condition may be a serious compliance violation, and the allocation of –100 points may signify that it is considered a more serious violation than the "lawyer retained" violation. Consequently, the agent's compliance with various regulations may be gauged by examining their net compliance score.

There may be other score types defined, based on the goals desired by the contact center to monitor and evaluate a particular type of agent behavior. For example, a number of RTSA topics could be defined as "up-selling." These topics could detect speech conditions that reflect when the agent is offering the customer additional items to go with a purchase. For example, points could be allocated to the agent for asking the customer if a matching belt is desired to go along with a purchase of shoes. Points could be allocated for asking if the customer would like another item in a different color, etc. A cumulative "up-selling" score could be maintained for measuring an agent's effectiveness in this category. Thus, there may be a variety of score types that may be maintained for an agent.

The alert mapping table also shows a "Defined as Checkpoint" column 1237 which indicates whether the RTSA topic or keyword is defined as a checkpoint. In one embodiment, a binary flag can indicate whether the keyword is defined as a checkpoint. In the embodiment shown in FIG. 12, the "wrap up" and "Mini-Miranda" topics are defined as checkpoints. In other embodiments, there may be a number of checkpoint categories defined. Thus, there could be a set of checkpoints for compliance purposes, another for positivity purposes, etc. Each of the checkpoints may be displayed to the agent or to a supervisor using a specific graphical user interface element in the form of a checkpoint widget. In such embodiments, the checkpoint column 1237 may have one of several identifiers indicated, as opposed to a binary flag. Or, in other embodiments, there could be different checkpoint column types indicated. Those skilled in the art will recognize that various data structures and methods could be used to indicate whether the keyword correlates to a checkpoint.

Other columns 1240 may be defined in the alert mapping table. These can provide other characteristics associated with how the RTSA alert could be provided. Particularly urgent or significant speech conditions that are detected may be associated with a providing a sound in addition to presenting an icon. Or, the RTSA alert could result in a supplemental message delivered to the agent's workstation, an immediate separate text message sent to a supervisor, etc. Other graphical user interface techniques for drawing attention could be used—for example, an RTSA alert could be mapped to a blinking or flashing icon. In other embodiments, a set of points could be deposited into a virtual account maintained for the agent, which is then used by the contact center management for incentivizing agents. These points could be used to give priority to the agent for future work scheduling decisions, redeeming awards, gifts, time off, etc. For example, the agent with the best compliance score could be given priority for requesting the day off for the next upcoming holiday. Thus, there may be a variety of additional characteristics defined for how a topic is mapped to an alert indication.

Further, other data structures and names than above disclosed table may be used. Thus, the phrase "alert mapping table" refers to any form of a data structure and/or process that maps a RTSA message from a RTSA system into a form designed for human review, whether it may be a list, linked tables, a database, rule process, etc. The "alert mapping table" could also be referred to as a "checkpoint and alert data structure", "checkpoint mapping table", or a similar name, to reflect that the structure may also contain information related to processing events related to checkpoints.

Checkpoint Widgets—FIGS. 13A-13B

As discussed above, an event message received from an RTSA system may be processed so as to result in dynamically displaying an alert on a supervisor's processing device. It is also possible to process event messages from an RTSA system to provide information regarding the progress of the call with respect to a set of checkpoints. A checkpoint is a point during a voice call that is associated with the expected or possible occurrence of a speech event. This could be analogized as indicating the occurrence of certain expected benchmark during a call. Typically, there are a chronological series of checkpoints for a call associated with a particular campaign. Frequently, different campaigns will have different checkpoints, which reflect the expected different flow of the conversations involving the agents. For example, a debt collection campaign call will typically involve a point in the call where the agent asks if the remote party can make a payment. In contrast, a non-profit campaign call soliciting donations will typically involve a point in the call where the agent asks whether the remote party wishes to make a donation. Making a payment is different from making a donation, and these could be defined as different checkpoints for these different campaigns. Thus, the RTSA system would likely be configured to recognize different keywords for these different campaigns.

It is even possible for a given call of a particular campaign to have different types of checkpoints identified. Thus, a series of checkpoints could be defined to ensure that the agent is courteous. There could be a "welcome" and "closing" checkpoint for each call, and then a separately defined set of compliance checkpoints during the call. Thus, there is great flexibility in defining which keywords would be considered to be a checkpoint.

To convey the occurrence of a checkpoint to a person, it is useful to provide a common collection of visual elements displayed on a computer screen, which may comprise text, icons, and symbols that represent the set of chronological checkpoints associated with the call. These elements may indicate whether the checkpoint actually occurred. This collection of visual elements indicating which checkpoints have occurred is referred to herein as a "widget." Specifically, because the widget provides information about checkpoints during a call, it may be referred to more specifically as a "checkpoint widget." For purposes of brevity, it will be simply referred to as a "widget."

The display of a widget may be provided on the workstation of an agent or a supervisor, which provides the viewer with a quick, easy-to-comprehend, indicator of the status of the various checkpoints during a call. Each checkpoint is associated with a checkpoint indicator on the widget, and each checkpoint indicator may also be accompanied by text that informs the reader of the nature of the checkpoint. The checkpoint indicator may also referred to as a "checkpoint status indicator" because the indicator usually indicates a status of the corresponding checkpoint during a particular call. The text associated with the checkpoint indicator may be referred to as the "checkpoint indicator text." Returning to the above example of a debt collection call, there may be a checkpoint indicator reflecting whether the agent has asked for payment. The checkpoint indicator text could be "Ask for Payment." Similarly, for the non-profit solicitation call referred to above, the checkpoint indicator text could be "Ask for Donation." The text of the checkpoint indicator is defined by the contact center administrator prior to processing of calls and can be any text which conveys the purpose of the checkpoint.

One instance of a widget is shown in FIG. 13A. This widget 1300 is associated with a debt-collection call campaign. As evident, unique widgets could be defined for a variety of campaigns, such as solicitation calls, surveys, customer service, etc. The widget 1300 is characterized by a plurality of checkpoint indicators 1310a-1310e. Each checkpoint indicator is associated with a checkpoint, which is a point during a voice call associated with the expected or possible occurrence of a speech event. The checkpoint indicators 1310a-1310e are arranged in a chronological (i.e., the expected order of occurrence) by being overlaid onto time-line 1305. Based on convention, movement from left to right on the time-line 1305 reflects the passage of time. Although the checkpoint indicators 1310a-1310e are shown equidistant on the time line, this does not necessarily mean that the occurrence of the checkpoints themselves are equidistant over time. Typically, the fact that a checkpoint indicator 1310a is positioned to the left of another checkpoint indicator 1310b indicates that it is expected to occur before the other checkpoint indicator 1310b. Thus, the instance of the widget 1300 shown in FIG. 13A has five checkpoint indicators, correlating to five expected instances of speech that are expected to be detected.

Because the widget may be updated over time (e.g., as the call progresses and checkpoints are detected), the depiction of the widget 1300 in FIG. 13A is necessarily a snapshot in time as the widget would be displayed over time. Thus, this depiction is referred to as an instance of the widget. The widget in FIG. 13A is the initial state of the widget, where all the checkpoint indicators are set to their initial state, representing that the checkpoint has not been detected.

In this embodiment, each checkpoint indicator is associated with checkpoint indicator text 1315-1319. The first text 1315 is "Recording Disclaimer." This checkpoint indicator text is typically defined by an administrator prior to processing of calls. The text is merely a short label that reflects the speech expected with the checkpoint in order to inform the user of the nature of the checkpoint represented. In this example involving debt-collection campaign calls, the calls are recorded and the agent is expected to indicate to the remote party that the call is being recorded. This "recording disclaimer" text reflects that the agent is expected to provide some sort of disclaimer of the call recording to the remote party.

Similarly, the "Mini-Miranda" text 1316 associated with the checkpoint indicator 1310b reflects a requirement for debt-collection calls that the agent inform the remote party that this is a debt collection call. This disclaimer is referred to as a "Mini-Miranda" in the debt-collection industry. Thus, the checkpoint indicator 1310b reflects whether the agent has provided an appropriate mini-Miranda statement to the remote party.

Similarly, the "Verify Contact" text 1317 associated with the checkpoint indicator 1310c reflects the requirement for the agent to verify that they are speaking with the debtor, and not with some other member of the household. The "Ask for Payment" text 1318 is associated with a separate checkpoint indicator 1310d, and reflects the requirement that the agent asks the debtor to make a payment. Thus, this checkpoint indicator 1310d is encountered when the agent has asked the debtor for payment. Finally, the "Thank Customer" text 1319 is associated with the last checkpoint indicator 1310e, which reflects that the agent should thank the remote party at the end of the call.

It can be appreciated that the checkpoint indicators are shown in a chronological order that reflects the order typically encountered in most calls. The recording disclaimer must be provided at the beginning of the call, and the mini-Miranda should be provided before any substantive discussion of the debt. Similarly, the remote party should be verified before any substantive discussion of the debt. At some point after these three checkpoint indicators, the agent should ask for payment of the debt, and it is typically at the end of the call that the agent thanks the customer. In other embodiments, it is possible that there are different possibilities as to when the checkpoints occur on a given call. This depends on how the checkpoints are defined, type of call, etc. Whether this is possible may impact the choice of format of the widget, as will be seen.

FIG. 13B shows the same widget, but a different instance in time. This instance of the widget 1350 depicts the status of the checkpoints during the call. In this case, the first checkpoint indicator 1370 may be depicted with a different color (e.g., green) to reflect a different status. In other embodiments, any type of distinguishing visual characteristic could be used to reflect a change in status, including showing a different color, line type or thickness, shading, text font, embedding a different symbol, blinking or flashing a visual element, etc. Whereas in FIG. 13A, checkpoint indicator 1310a is a circle with white filling and a dot in the center, checkpoint indicator 1370 has a circle with a green filling and a dot in the center (though the accompanying figure is in black and white). This reflects that the appropriate speech was detected and reported by the RTSA system. In other embodiments, a small square or other shape in the center of the circle could be used to reflect a change in status.

Further, the thickened portion 1355 reflects that this checkpoint was in the past. Further, the second checkpoint indicator 1372 is overlaid with an "X", perhaps using a red color. This reflects that this checkpoint was not detected. In other words, this widget reflects that the agent did not properly provide the "mini-Miranda" statement to the remote party on this call. The placement of an "X" on the checkpoint indicator may not be determined until the next checkpoint is detected. Next, the third checkpoint indicator 1374 occurs. Based on the text 1317, this checkpoint reflects whether the agent has verified the remote party's name. Since this checkpoint indicator has been modified, the checkpoint has also been detected.

At this point in time, the widget 1350 indicates that the next checkpoint indicator is associated with the agent asking for payment. The thin thickness of line 1360 indicates that the call has not yet progressed to this point of the call. In other embodiments, a marker may be shown associated with the current expected checkpoint or the last detected checkpoint.

It is possible that the agent may first confirm the contact's name and once confirmed, then provide the person with the mini-Miranda statement. If so, then the second checkpoint indicator 1372 may be changed so that the "X" is removed, and instead a green circle indicator may be shown. This widget format is well suited when there is a fixed and certain chronological sequence of checkpoints expected during the call. If the checkpoints occur in a non-predictable order, then other widget formats may be used, or the indicator may not be marked with an "X".

The widget shown in FIG. 13A-13B illustrates that a number of checkpoints can be expected during the call. The widget indicates in real-time which checkpoints have or have not occurred as the call progresses. This provides an easy-to-comprehend status of the call, allowing an agent or supervisor to quickly view and understand how the call is progressing. While in theory this could provide some of the same information as the RTSA alerts previously discussed, the widget provides a quicker and easier to use format indicating how an agent is doing on a call. Specifically, there is no need to select a view of the history of the alerts. Further, the RTSA alerts reflect additional information about keywords which are not necessary defined as checkpoints, which requires the user to manually filter out those RTSA alerts which are not defined as checkpoints. In addition, many RTSA alerts may not be appropriate to define as a checkpoint. Finally, requiring the agent to view RTSA alerts in real time may be distracting to the agent.

Although not shown in FIG. 13A-13B, each checkpoint indicator text could also include, or have displayed adjacent to it, information regarding the corresponding points (e.g., a score) associated with successfully detecting the checkpoint (or which could be deducted if not detected). For example, FIG. 13B could indicate that 10 points are allocated when properly providing the disclaimer, 20 points are provided for properly providing the mini-Miranda statement, etc. A real-time point counter could be also displayed, which provides the agent with a real-time quantitative indication of how well they are conforming to the contact center policies and regulations based on the occurrences of checkpoints. This can serve to motivate the agent to improve their performance.

The determination of whether the status of a particular checkpoint should be marked (e.g., as checkpoint indicator 1372) as to indicate whether the checkpoint has not yet occurred, has occurred, or was skipped, may be associated with further information maintained in conjunction with the checkpoint that is referred to as "checkpoint relativity information" ("CRI"). The CRI provides information that specifies when a first checkpoint should occur (if at all) relative to other checkpoints, in order to determine if that checkpoint was omitted. For example, the agent may be expected to verify the identity of the person answering the call, which is the "Verify Contact" checkpoint, and may also be expected to provide the mini-Miranda statement, which is the "mini-Miranda" checkpoint. In some embodiments the mini-Miranda must occur before verifying the contact, in other embodiments, the order may not matter, as long as both of these occur before the agent discusses the debt or asks for payment. Further, both the "mini-Miranda" checkpoint and "Verifying Contact" checkpoints should occur after the agent provides the recording disclaimer. In order to know whether the agent omitted providing the speech corresponding to a particular checkpoint, it is necessary to know when that checkpoint is expected to occur relative to other checkpoints. In summary, it may not be known that a checkpoint was skipped until a subsequent checkpoint is detected.

In this example, the "Recording Disclaimer" must be the first checkpoint encountered. If it is provided after any other checkpoint, then the disclaimer is not effective. Next, the "mini-Miranda" or "Verify Contact" checkpoint should occur, perhaps in either order, or with a specific order. However, because the fourth checkpoint reflects the agent asking for payment, it should always occur after both the "Verify Contact" and the "mini-Miranda" checkpoints. If the "Ask for Payment" checkpoint occurs before both the "mini-Miranda" or "Verify Contact" checkpoints, then a checkpoint has been skipped. Finally, the "Thank Customer" checkpoint should always be the last checkpoint.

How the CRI is defined for the checkpoints may impact how these checkpoints are indicated on the widget. If the "Recording Disclaimer" is defined to be first checkpoint, then detecting any other checkpoint first means that the "Recording Disclaimer" was not properly provided, and then that checkpoint indicator can then be marked as not occurring or having been skipped.

However, in regard to the "mini-Miranda" and "Verify Contact" checkpoints, these can occur in either order, so that detecting one does not necessarily mean the other has been skipped. However, if the missing checkpoint is not provided by the time before the "Ask for Payment" checkpoint has been detected, then the agent has failed to provide the requisite speech and the checkpoint was skipped. Thus, it is evident that the CRI is necessary in order to know how and when to properly mark the checkpoint indicators on the widget as having not been detected (yet) or not having been provided at all.

The CRI may take various forms, and may indicate for example, whether a checkpoint must be the first, second, third, etc. checkpoint detected. The CRI may indicate whether a first checkpoint must occur before or after another checkpoint or set of checkpoints. The logic and means by which the appropriate relationship among the checkpoints can be defined may vary according to embodiments. Further CRI may be stored in some manner in the alert table of FIG. 12 detailing the CRI for each of the checkpoints or using a separate data structure. However stored, the CRI allows a greater degree of control in determining how to ascertain a missing checkpoint or process an out-of-order checkpoint during a call.

It is possible to further indicate on the widget, or in a separate portion of the window, information about the CRI. This could take the form of a symbol which indicates whether the checkpoint must occur first, or must be preceded by certain other checkpoints. This can be graphically illustrated using various diagrammatic structures that convey a required relative order.

In addition to marking a checkpoint as not being properly detected in the above circumstance, other actions may occur when a checkpoint has been determined to have been skipped. It is possible to display a pop-up window to the agent providing compliance information, generate a report message, transfer a call, join another party to the call, initiate a message over a web-based application programming interface, write data to a log, etc. This allows tracking, reporting, or other actions to occur in response to determining a checkpoint was overlooked by the agent.

Figure 14A:
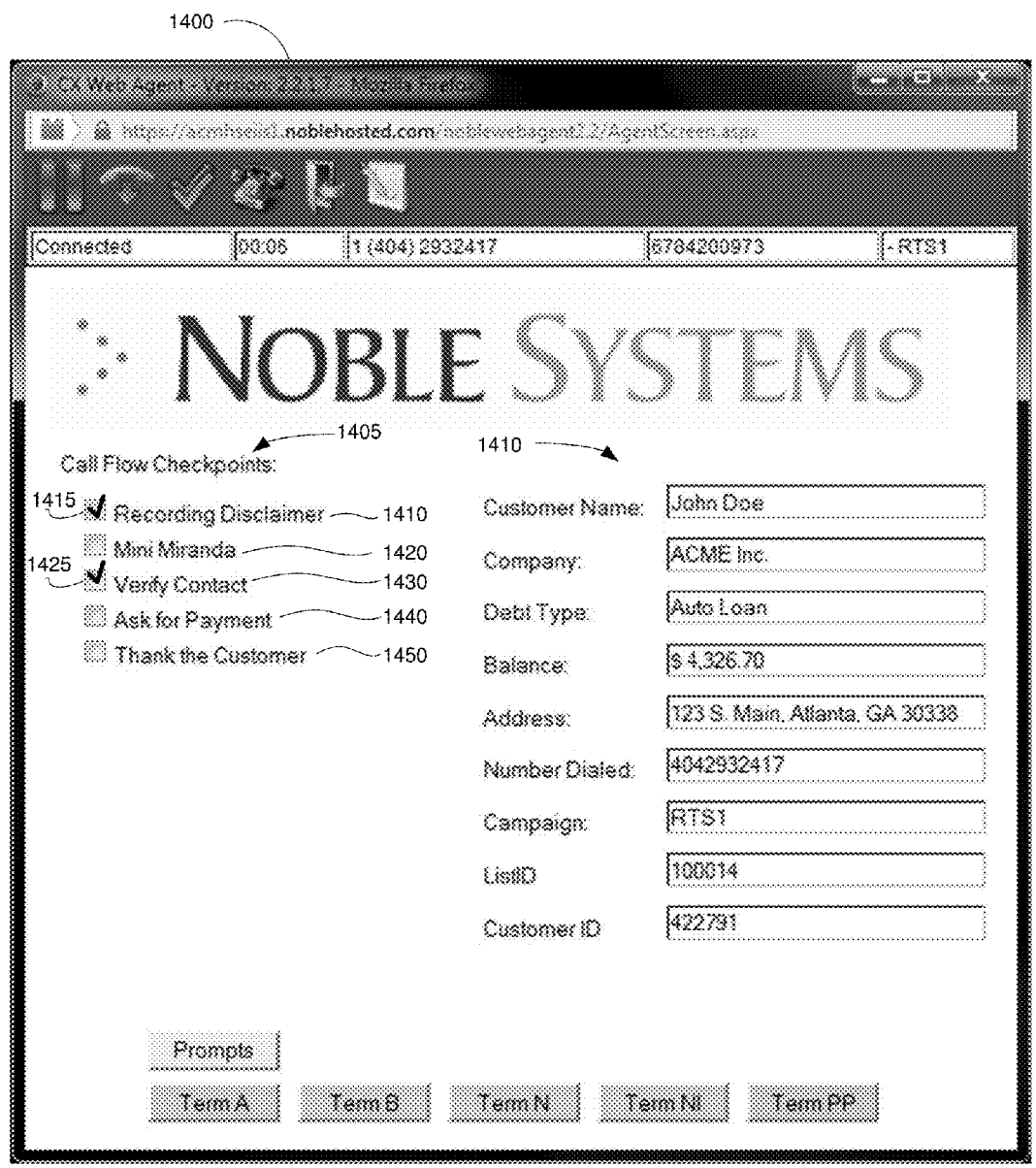
Figure 14B:
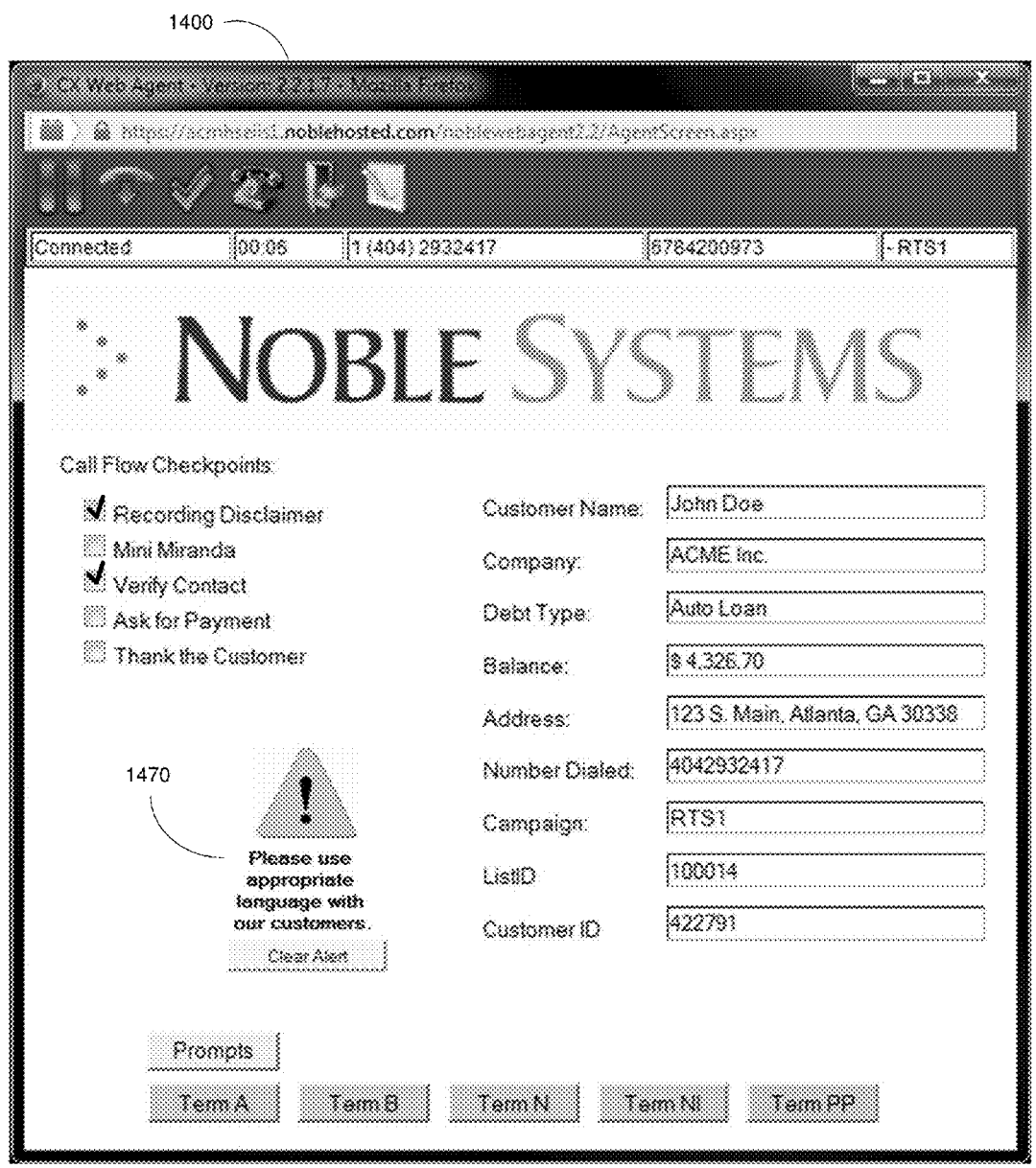

Other Widget Formats—FIGS. 14A-14B

Turing to FIG. 14A, another format of a checkpoint widget is shown. As can be appreciated, one skilled in the art could develop a number of different widget formats in light of the present specification to graphically illustrate the progress and status of various checkpoints during a call. In this embodiment, a screen shot 1400 is shown that may be presented to an agent during a call. The screen shot may be presented to the agent on a workstation comprising a computer, and may involve using a number of various technologies, including as a web page, thin-client application on the workstation, or an application executing on the workstation.

A first section 1410 may include account information of the person the agent is communicating with. This may provide account information, such as the remote party's name, account type, balance due, address, etc. Also shown is another screen section 1405 that comprises the widget with checkpoints. In this embodiment, the checkpoints 1410, 1420, 1430, 1440, 1450 are arranged as a series of checkboxes along with text in a list format. There is an implied time-line reflecting the passage of time in a downward manner (e.g., the first checkpoint associated with the first line is expected to occur before the second checkpoint in the second line, etc.).

The first checkpoint checkbox 1415 is shown as checked, denoting that it has occurred. That is, the recording disclaimer provided by the agent was detected and reported by the RTSA system. The second checkpoint 1420 does not show the checkpoint checked, and this reflects that the mini-Miranda statement was not detected as being provided by the agent. The third checkpoint 1430 has its corresponding checkbox 1425 shown as checked, which reflects that the agent has verified the contact (e.g., verified the name of the person contacted). The fourth checkpoint 1440 and the fifth checkpoint 1450 have not been reported as being detected.

If the agent were to provide the mini-Miranda, then the second checkpoint checkbox may be then checked. This particular widget format may be more suited to calls in which the chronological order of checkpoints is not as predictable as it could be. Furthermore, it is also possible to also indicate for each checkpoint, the number of points each checkpoint may contribute to a total score associated with the call. It is also possible to define the CRI so that it can be easily determined if a checkpoint was skipped during a call, and then somehow signify this on the checkbox (such as displaying an "X").

The widgets illustrated in FIGS. 13A, 13B, and 14A illustrate checkpoints that are normally expected to occur on a call. It is also possible to use a widget to depict the occurrence of a checkpoint that is unexpected during a call. These may include "undesirable" events detected by the RTSA system, which reflect the occurrence of undesirable speech. This may include asking for inappropriate information, providing a discourteous response, or using inappropriate language. It is possible to depict such checkpoints in a transient manner, such as shown in FIG. 14B. In other embodiments, the checkpoint could be added to the widget after it is detected, potentially using a different font, size, or color, to indicate that the checkpoint indicator was added during the call.

Turning to FIG. 14B, the same screen shot 1400 is shown but with an added icon and text 1470. This comprises a warning symbol and text that reflects the speech condition that was detected for this checkpoint. This allows feedback to the agent to reinforce speech that is not desired for whatever reason. In this embodiment, the icon and text 1470 remains displayed until the agent acknowledges the alert. Further, the icon and text 1470 are only displayed once the checkpoint has been detected. In other embodiments, the alert could be displayed for a predefined time period. In other embodiments, the information may be logged into a file recording the agent's checkpoints, or a notification message could be sent to the agent's supervisor or team leader. The functional operation of this type of checkpoint begins to become very similar to the operation of an alert.

Figure 14C:
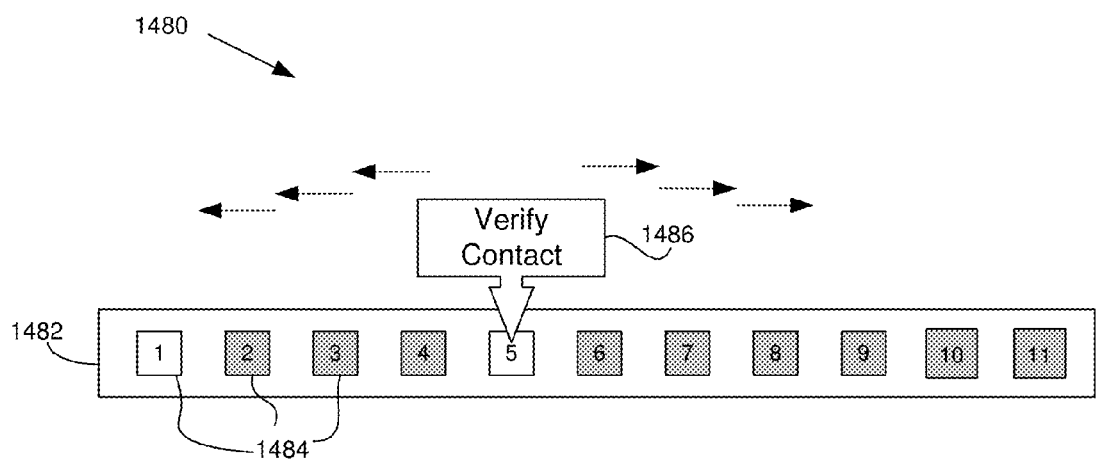

FIG. 14C illustrates another embodiment of a checkpoint widget. This embodiment may be advantageous if there are a number of checkpoints, such that including the checkpoint indicator text for each checkpoint indicator would be impractical. This widget format does not normally display the checkpoint indicator text on each indicator. Rather, a sliding viewing tool can be manipulated by the user to see the text on any one selected checkpoint. Turning to FIG. 14C, this widget 1480 comprises a progress bar 1482 which encloses a series of checkpoint boxes 1484. Each checkpoint box contains a number, and the order represents the typical occurrence of the checkpoints during a call. As a checkpoint is detected, the corresponding numbered checkpoint box is distinguished in some manner. In this embodiment, the checkpoint box is grayed-out or colored if the checkpoint was detected. Thus, it is readily apparent that checkpoint box #1 and checkpoint box #5 have not been grayed-out, indicating that the checkpoints have not been detected.

A sliding viewing tool 1486 (or simply "slider") can be manipulated by the user using a mouse and moved sideways. As the slider moves, it displays the checkpoint indicator text associated with the corresponding checkpoint box. For example, in FIG. 14C the slider 1486 is positioned over checkpoint box #5 and the corresponding checkpoint indicator text is "Verify Contact." If the user desires to see the checkpoint indicator text for checkpoint indicator #1 (or for any other one), then the user can use a pointer, mouse, or other device to select and move the slider to the appropriate contact indicator where the checkpoint indicator text will appear.

Although FIGS. 14A-14C illustrate various types of checkpoint widgets, no doubt other variations can be defined, which indicate which checkpoints have been encountered during a particular call. Thus, the embodiments disclosed herein are not intended to be exhaustive, but merely illustrative of the different types of widgets that can be presented.

Configuring Events as Checkpoints for Widgets

Prior to processing calls and indicating their current status, it is necessary to define the speech events are to be detected and reported by the RTSA system for a given campaign. These events may be then processed by the CARM to generate the appropriate modifications to the widget being displayed. As indicated previously, it is not necessary that every reported speech event corresponds to a checkpoint. Many reported events are used to score the agent's performance, present an alert, or otherwise measure the agent's compliance, but are not necessarily defined as a checkpoint. The definition of which events are defined as checkpoints is based on various business and operational factors. For example, a contact center operator may encourage agents to provide a friendly welcome greeting when the remote party answers the call. This greeting may be, e.g., a phrase "good morning, my name is . . . ." The contact center operator may define "good morning" as a keyword or topic that is to be detected and reported. The agent may even receive points going towards their compliance or performance scores. However, the agent's failure to provide such a greeting may not be deemed a serious violation and this keyword may not be defined as a checkpoint, though it is defined as an alert. Consequently, even though this keyword may be reported as an event and scored, it does not necessarily appear on the widget because it is not defined as a checkpoint.

Figure 15:
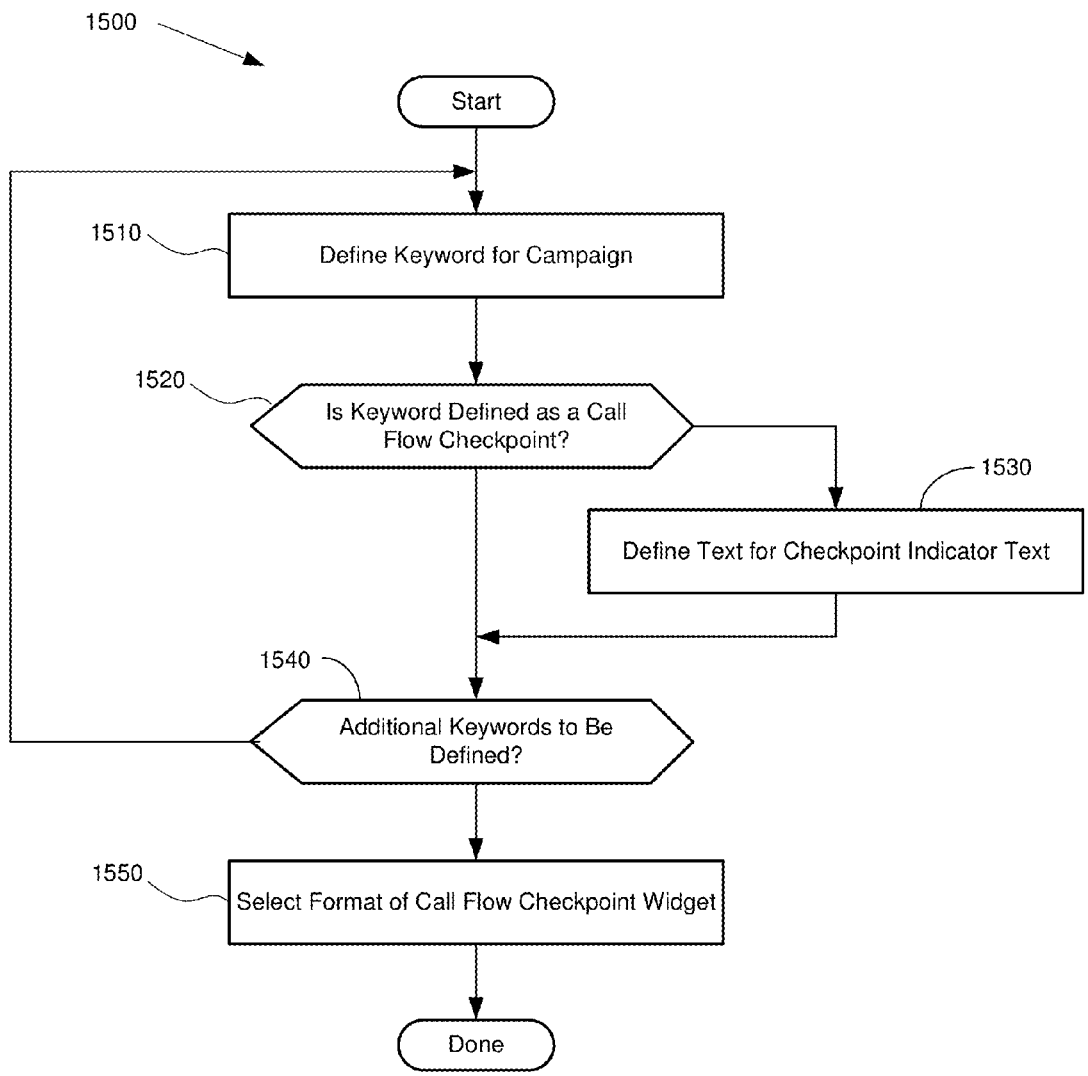
FIG. 15 illustrates one embodiment of a process flow for associated specific keywords as checkpoints.

FIG. 15 illustrates a process flow 1500 that illustrates how checkpoints are defined. The process begins with defining the keywords that are to be reported by the RTSA system in operation 1510. Typically, the keywords include one or more words (e.g., phrases) that are defined in a context, which may include who (e.g., agent or remote party) is expected to speak the keyword, when the keyword is expected to occur (e.g., a time period at the beginning of the call or in conjunction with another keyword), etc. During this process, the user (usually the supervisor or call center administrator) will indicate whether a keyword is to be considered as a checkpoint in operation 1520. It is possible for an event message to generate an alert, alter the checkpoint indicator status, perform both, or do neither. If the keyword is to be defined as a checkpoint, then the user provides the checkpoint indicator text in operation 1530, which is to be included when displaying the widget. If the keyword is not defined as a checkpoint, then the process flow continues where a determination is made whether there are additional keywords to be defined in operation 1540. If so, the process repeats until all the appropriate keywords have been defined.

At some point during the process, the user may also define one of several formats that are to be used for the widget. As one skilled in the art would appreciate in light of the present specification, there are various graphical formats that can be used to construct the widget. A system may provide a single default widget format or may allow the user to select which of several formats to use. The user may select the format in operation 1550, if such an option is provided.

Figure 16:
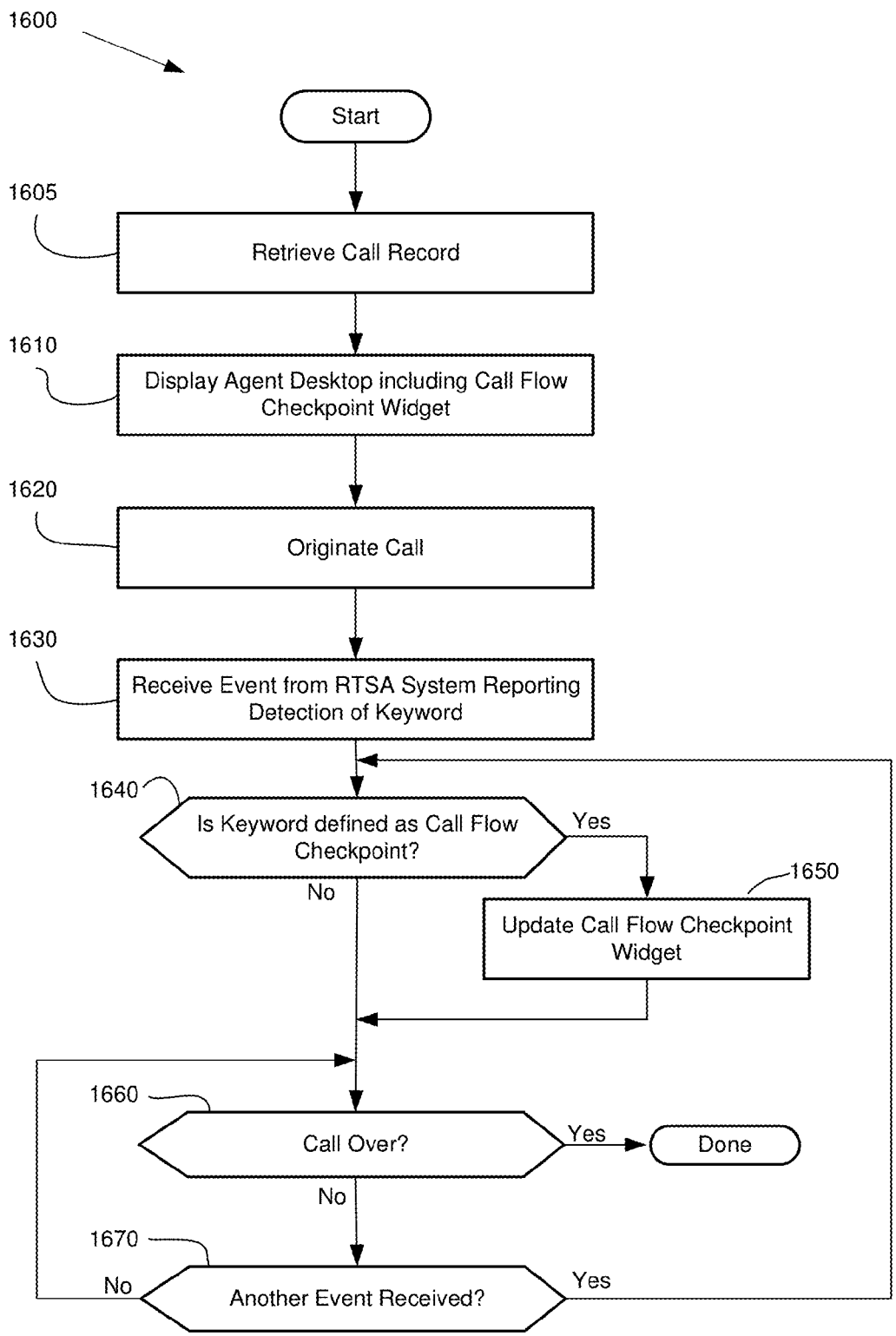
FIG. 16 illustrates one embodiment of a process flow of processing event messages associated with a call for purposes of updating a checkpoint widget.

Operational Flow For Processing Checkpoint Information—FIG. 16

Once the keyword has been identified and indicated as a checkpoint, an embodiment of the process for handling a call is depicted in FIG. 16. In FIG. 16, the flow 1600 begins with retrieving the next call record from a dialing list in operation 1605. The call record typically includes (or allows access to) information such as shown in FIG. 14B, such as the remote party's number and account information.

This information and other information may be used to populate certain portions of the agent's screen as indicated in operation 1610. Part of the populating of the agent's screen includes displaying a checkpoint widget in the selected format. At this stage, the widget will be displayed in an initial state with none of the checkpoints indicated as having occurred (similar to, e.g., FIG. 13A). In many embodiments, this may involve displaying the corresponding text associated with each checkpoint indicator.

Next, the call is originated in operation 1620. Once the call is answered, event messages may be received at the CARM from the RTSA system. The process flow 1600 shown in the FIG. 16 process flow presumes that at least one event is received from the RTSA system in operation 1630 (as will usually be the case). The event message reports the detection of a previously defined keyword in the speech by the agent on the voice call.

Since not all events will necessarily be indicated as checkpoints, a test is made in operation 1640 as to whether this particular event is indicated as a checkpoint. If it is, then an update to the widget being displayed occurs in operation 1650. As explained previously, updating a widget may involve modifying the shading, color, or adding a visual element to the widget. Since the checkpoints on a widget are different, the appropriate checkpoint correlated with the event message must be updated. That is, the second event message reported may not necessarily result in updating the second checkpoint, but rather some other checkpoint.

If the call is over in operation 1660, the process is done. Typically, the widget will be reset to its initial state for the next call. If the call is not over, then a test is made in operation 1670 to determine if another event is received. If so, the process loops back to determining whether the event is indicated as a checkpoint in operation 1640. If no event is received, but the call is still active, then the process loops back to operation 1660 to see if the call is completed.

Figure 17:
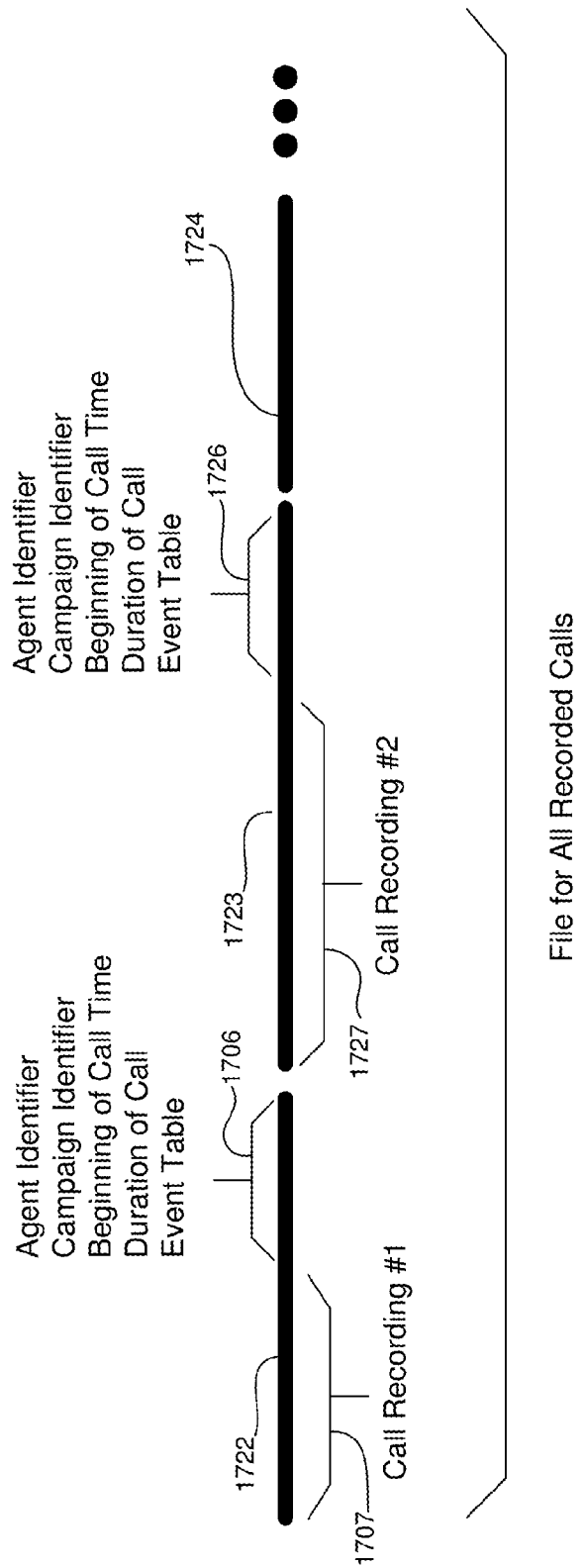
FIG. 17 illustrates one embodiment of call recordings stored in a file.

Audio Recordings—FIG. 17

The audio recordings associated with an agent, specifically those portions associated with a checkpoint on a particular call, can be subsequently aurally reviewed by the agent or a supervisor. This requires that the audio of the calls are recorded and stored in some manner. FIG. 17 illustrates one embodiment of a file structure for recording the audio in conjunction with the checkpoint related information.

Turning to FIG. 17, a linear time-wise depiction is shown of a plurality of call recordings and associated meta-data. In one embodiment, the audio of call may be stored in cache memory, and when the call is completed, the audio data is written to the file along with meta-data appended to it as a call record. Thus, FIG. 17 shows a series of such recordings, including a first call record 1722, a second call record 1723, a third call record 1724, etc. Each call record can be thought of as comprising a call recording portion and a meta-data portion. Thus, the first call record 1722 has a first call recording portion 1707 and a first meta-data portion 1706, the second call record 1723 has its own call recording portion 1727 and corresponding meta-data portion 1726, etc.

The call recording portions 1707, 1727 may be stored in any number of audio formats known to those skilled in the art, including MPEG 4, AAL, WAV, PCM, WMA, MP3, etc. The meta-data portion may be also stored in any number of audio formats, including those associated with the format used to store the recording portion. The meta-data comprises information that directly provides, or either indirectly allows, identification of the agent involved in the recorded call and a campaign identifier (since the agent may be involved in more than one campaign during a shift).

In addition, the meta-data 1706, 1726 includes timing information regarding the call. This may include a start time and an end time. Or, this may include a start time and a duration of the call. Either approach allows determination of the length of the call. Further, timing information is provided regarding the event messages received during that call. This may be stored in a data structure called an "event table," though other structures or data formats may be used. Thus, reference to an "event table" should not presume that any particular structure is required (such as a tabular structure). The information in the event table indicates when, during the call, the event messages were received. Further information may include an indication of the type or contents of the event, a corresponding score, etc. The timing information of the event may be based on an absolute time or a relative offset from the beginning of the call. For example, if the absolute time approach is used, then an event received at a certain time can subtract the starting time of the call to determine the offset from the beginning of the call. Specifically, if a call was received at 09:35.00 (i.e., 9:35 a.m. and 0 seconds), then an event recorded at 9:35.43.50 (i.e., 9:35 a.m. and 43.5 seconds) means that the event occurred 43.5 seconds into the call. That is, the offset time of the event is 43.5 seconds. Alternatively, each event could be defined as the offset from the beginning of the call where the call is assumed to begin at time=0.

Regardless of the format used, the event offsets indicate how far into the call each event occurred. Typically, these are indicated in chronological order, so that the first event offset represents the first event message received, the second event offset represents the second event message received, etc. In this manner, the meta-data provides information about when the event messages occurred during the call recording. In this embodiment, each event entry in the event table corresponds to a checkpoint during the call. It is possible to record event messages received during a call that are not defined as corresponding to checkpoints, but this example is simplified to illustrate the concepts of how audio data correlated to a checkpoint can be reviewed.

Figure 18:
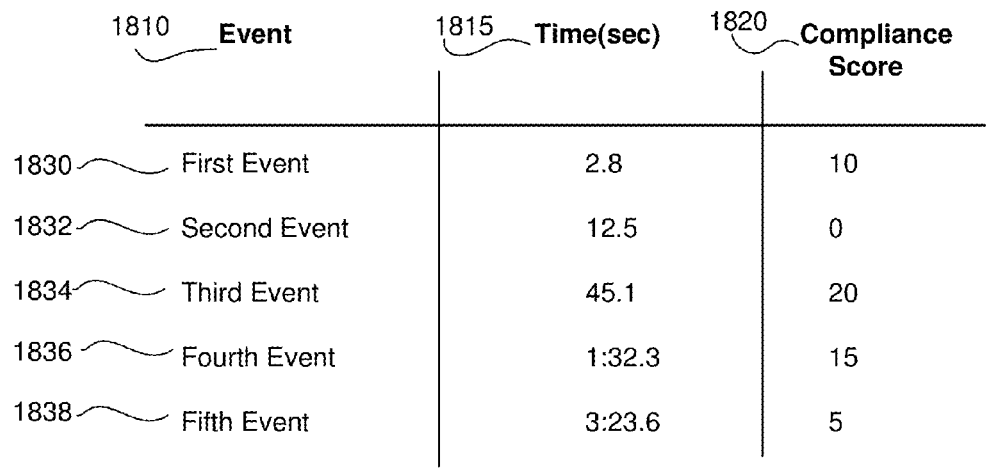
FIG. 18 illustrates one embodiment of an event table.

Event Table—FIG. 18

FIG. 18 illustrates one embodiment of an event table. The event table 1800 is shown along with other meta-data 1805 to provide useful contextual information about the call it pertains to. Thus, this event table 1800 pertains to events corresponding to checkpoints for a call handled by Jane Smith, which was for a "Debt Collection 1" campaign, on Feb. 5, 2015, where the call started at 5 seconds after 10:32 a.m.

In this embodiment, the event table 1800 comprises three columns. The first column 1810 is the event identifier. In this example, these event identifiers are simply identified with generic names, although other embodiments may provide information about the event message type or contents. The second column 1815 is the time when the event occurred, which in this embodiment represents an offset time from when the call began. Finally, the third column 1820 is a compliance score associated with the occurrence of the event.

Thus, for this particular call, there are five rows 1830-1838 which represent five events. The first event 1830 occurred at 2.8 seconds after the call started and its occurrence contributed to 10 points to the compliance score. The second event 1832 occurred at 12.5 seconds into the call, and it was worth zero compliance points. The reason this event is worth zero points is that no points were defined for the occurrence of this event, or that the contents of the event message was such that zero points were allocated. Specifically, the event could report that the agent said "you are welcome" and the event may be defined as accumulating zero points. Alternatively, there may be points awarded for saying the phrase, but the event message reports that this was not detected, in which no points are awarded. The third row 1834, fourth row 1836, and fifth row 1838 also reflect events that occurred at their respective times.

Thus, the event table 1800 provides information as to where the relevant speech can be found in the call recording that correlates with the reported event. Typically, the events correlate to speech that is detected, but it is possible for the events to report speech which is not detected. In this case, the time may simply correlate to when the event message was sent by the RTSA system that reported when the RTSA system finally concluded the speech condition was not detected.

Reviewing Agent Checkpoint Widgets

Once call recordings and the associated meta-data for an agent are stored, this information can be subsequently reviewed. The review can be performed either visually or aurally. Frequently, review occurs visually, followed by an aural review. In both cases, a common user interface is initially accessed, which may then be augmented with an audio player-like user interface for aural review. This scheme provides a logical and easy to user interface for selecting and reviewing specific portions of a telephone call recording.

A typical use case involves a supervisor (or agent), reviewing an agent's performance, which may involve identifying calls that reflected poor agent performance. This may involve identifying a threshold score of some form, which is then used to retrieve or identify specific calls. The checkpoint widgets for such calls may be displayed, and the user may review the checkpoint widgets for an agent, determining which checkpoint widgets reflect a low score warranting further investigation, and then selecting a particular call to further focus on. This may further entail selecting a checkpoint on a checkpoint widget, and then requesting audio associated with that checkpoint for aural review.

Figure 19A:
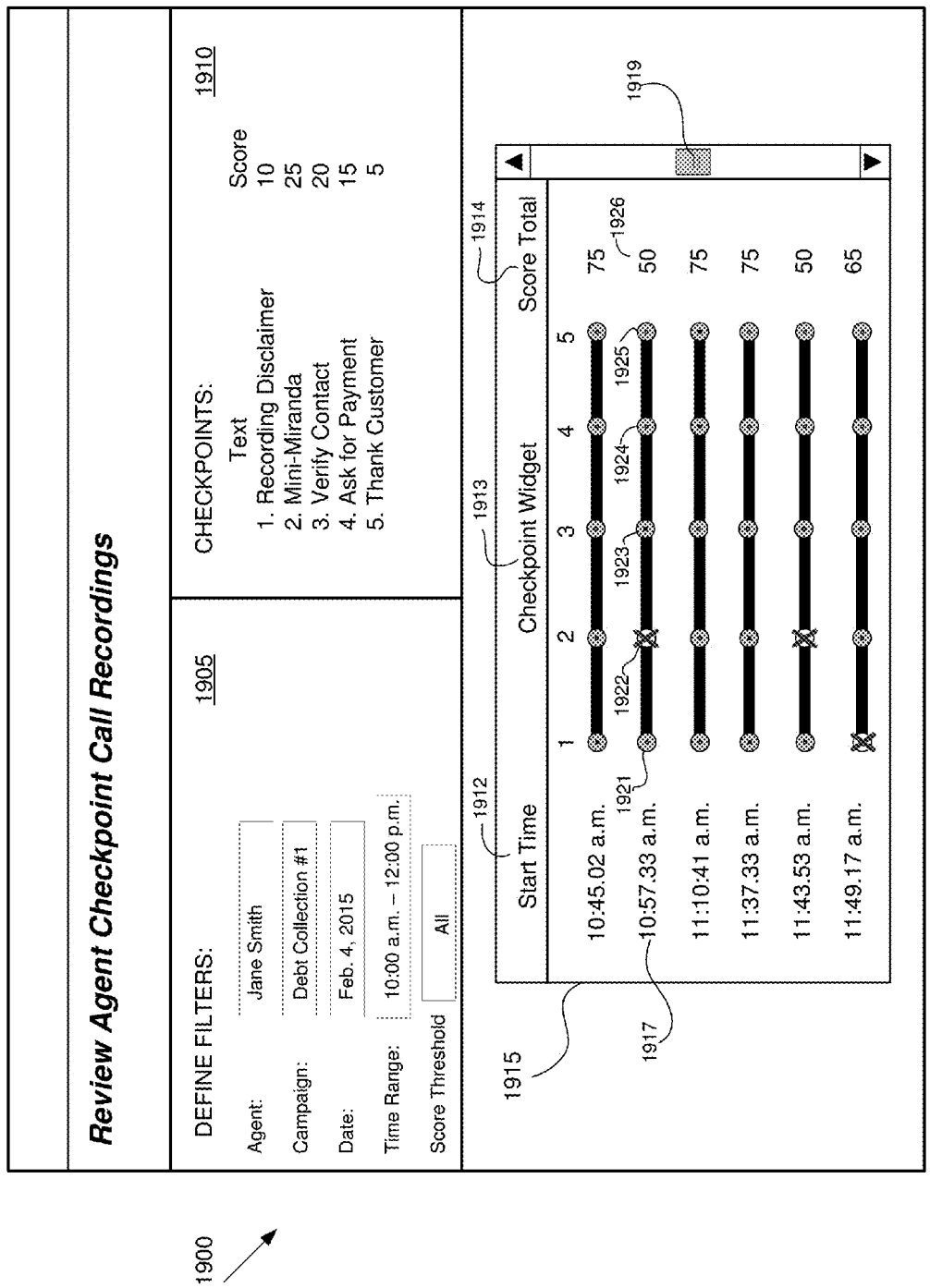
FIGS. 19A-19B illustrate embodiments of a graphical user interface showing a plurality of checkpoint widgets.

Turning now to FIG. 19A, a screen image 1900 is shown of one embodiment of a graphical user interface that can be defined for allowing review and selection of a checkpoint widget for an agent. The same interface can then be used for selecting a checkpoint for reviewing the audio recording of that call.

The screen image 1900 includes a first portion 1905 which allows the user to specify filter information to identify a subset of the call recordings to select for review. In various embodiments, the review may involve selecting calls based on various criteria. This may involve reviewing calls associated with a particular agent, campaign, date, time, or score. Further, various combinations of these criteria are possible. Thus, a supervisor may desire to review all calls from a given agent or only those which encountered a low score. This may be accomplished by indicating a "wildcard" that indicates all values are acceptable for a particular filter element. For example, by entering a score threshold of "20" and a wildcard for all other filter elements, then all calls from all agents, for all campaigns, for all dates, for all times will be retrieved.

Typically, the supervisor may desire to narrow down the search by using multiple filter elements. In the example shown in FIG. 19A, the filters will retrieve all calls from Jane Smith that were for the "Debt Collection #1" campaign on Feb. 4, 2015, from 10:00 a.m. to 12:00 p.m., regardless of score.

Another portion of the screen image comprises a results window 1915 that displays results of the selected calls that meet the associated filter requirements. The results window 1915 includes a column header 1912 for the start time of a call, a second column header 1913 which indicates the checkpoint widget for each call, and finally a third column 1914 which indicates the score total. Finally, a scroll control icon 1919 allows the user to scroll up or down to review the results.

The results window 1915 allows a number of call specific results to be displayed. The results are typically ordered by time, as can be seen by examining the start times for each call. The checkpoint widget shown for each call displays a status summary of the checkpoints during each call.

The checkpoints are numbered in this embodiment at the top with the numbers 1-5. These numbers correspond to the checkpoint labels shown in the checkpoint legend 1910 on the screen image. These are also numbered from 1-5 and the text reflects the nature of the checkpoint. For example, the first checkpoint is associated with "Recording Disclaimer", which reflects whether the agent has provided the disclaimer that the call may be recorded. The score, which is shown as 10, indicates the number of points allocated to this event being detected. Thus, the checkpoint legend 1910 allows the user to quickly review the nature of the checkpoints shown in the results screen. This arrangement avoids duplicating the checkpoint text in the results window 1915, allowing more results to be shown.

Turning to the second call shown in the results window, the second call began at the time indicated 1917, which is 10:57 a.m., and 33 seconds. The first checkpoint 1921 is shown as having occurred, whereas the second checkpoint 1922 is shown with an "X" as not having been detected. The third checkpoint 1923, the fourth checkpoint 1924, and the fifth checkpoint 1925 have all occurred. Because the second checkpoint did not occur, which was worth 25 points, the total number of points received is 50 (as opposed to the maximum amount which is 75). Similarly, the last call shown reflects the first checkpoint did not occur, which was worth 10 points, hence the total score received was 65 points.

The user can quickly review calls from an agent, and easily find out which calls had a perfect score, i.e., all checkpoints occurred and thus all points were awarded. These calls could be used, for example, to illustrate exemplary call handling. On the other hand, calls where the score is low could be used to illustrate poor call handling. These calls could be further examined with the agent to discuss what is deficient, and why. A sum total of the score for an agent's shift, or some other time period, can be maintained and used in performance evaluation.

Reviewing Agent Call Recordings Associated with Checkpoints

Typically, a supervisor reviewing calls with a low score total (e.g., reviewing checkpoint widgets with missing checkpoint occurrences), will want to review the actual audio of the call. This can be accomplished by the user selecting the appropriate widget, which identifies a particular call, and then selecting a particular point on the widget that identifies a particular portion of the audio of the call.

Figure 19B:
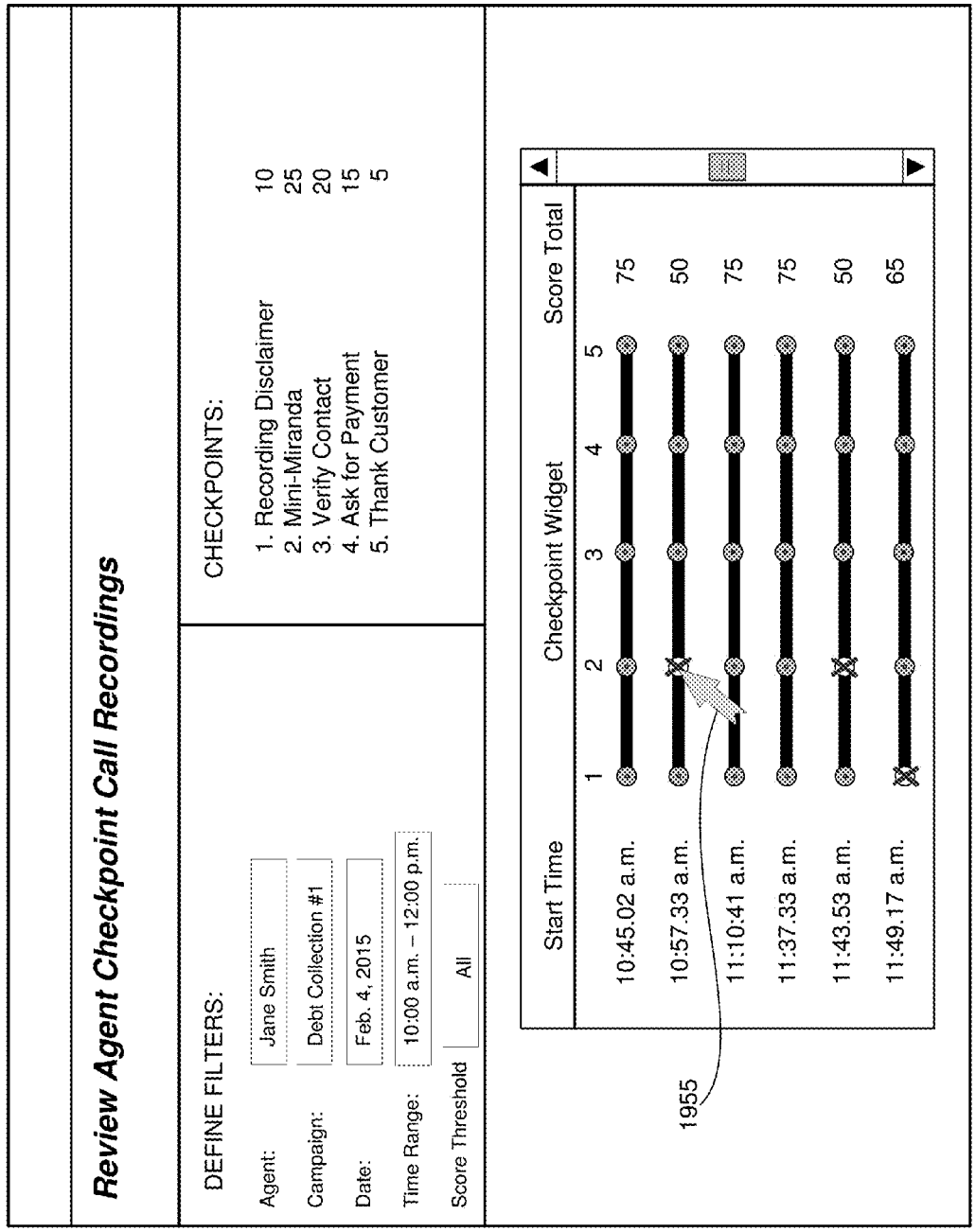

FIG. 19B illustrates one embodiment of a user selecting the second checkpoint of the second call widget. This selection is for the purpose of reviewing the audio of the call at this point in the call. This can be accomplished by the user moving a cursor using a mouse or other pointing device and selecting the checkpoint by clicking the mouse button. Those skilled in the art will recognize a variety of other pointing devices may be used to select the checkpoint, such as trackballs, pointers, touch screen displays, cursor controls etc.

Figure 20:
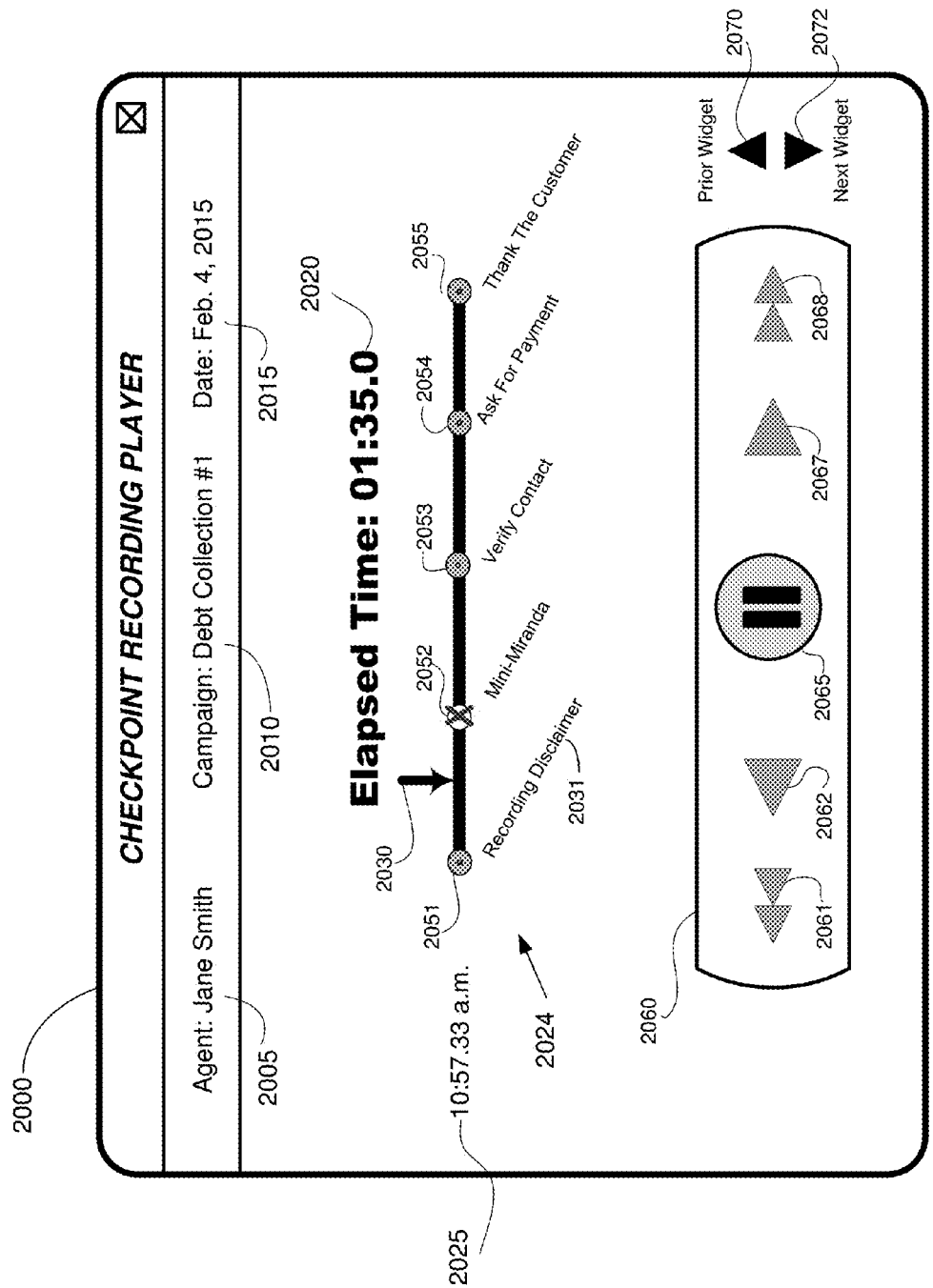
FIG. 20 illustrates an embodiment of a graphical user interface showing a checkpoint recording player.

Once the checkpoint is selected, another window may appear, which is a player window. One embodiment of a player window is shown in FIG. 20. This may be overlaid on the screen image 1900 of FIG. 19A, but is shown by itself for clarity in FIG. 20. Turning to FIG. 20, the player window 2000 is shown. The window provides some or all of the filter information on a portion of the player window. Specifically, the selected agent name 2005 is shown, along with the applicable campaign 2010, and the date 2015. The relevant time of the selected call 2025 is shown along with the widget itself 2024.

In this embodiment, the checkpoints are shown with their respect text. Thus, the first checkpoint 2051 is accompanies by the respective text 2031 "Recording Disclaimer." This avoids the user from having to refer to the checkpoint legend on the screen image, which may not be presently visible.

A current location marker 2030 is shown relative to the widget. This location marker indicates the current location of where the audio currently being played, or about to be played. The elapsed time indicator 2020 reflects in a numerical format the relative position of the location marker. In this embodiment, the location marker is located at 1 minute and 35 seconds from the beginning of this call. In some embodiments, the user can position the location marker directly using a cursor or mouse. In other embodiments, separate controls, as discussed below, are used.

A controller box 2060 contains a plurality of control icons for controlling the playback of the audio. This includes a start/stop control 2065. This toggles the playing or stopping of the audio. The backup control 2062 backs up the location marker (e.g., typically moving it to the left). In some embodiments this may back up the audio to the next previous checkpoint or in other embodiments a fixed about of time (e.g., 5 seconds). Similarly, the forward control 2067 moves the location marker to the next checkpoint or advances it a fixed amount of time. The fast-backup control 2061 and the fast-forward control 2068 will advance the location marker to the very beginning or the very end of the checkpoint. In other embodiments, these will go to the first or last checkpoint. Finally, the widget controls 2070, 2072 will advance the location marker to the prior or next widget relative to the widgets shown in FIG. 19A.

Determining the Audio Starting Point for Playback

Returning back to FIG. 19B, the user may select a point along the widget for reviewing the audio of the call. This determines the starting point (e.g., where the location marker is initially positioned) when the player window appears as shown in FIG. 20. There are various embodiments for how the initial starting point of the location marker may be selected.

In one approach, the user can select and move the arrow 1955 to any point along the widget. This may be over a checkpoint or between checkpoints. A corresponding time will be calculated and used to position the location marker. For example, if the arrow 1955 is positioned approximately halfway between the $3^{rd}$ and $4^{th}$ checkpoint, then an estimated time halfway between the $3^{rd}$ and $4^{th}$ checkpoints may be determined. Recall that the time between checkpoints may not always be proportional. Thus, the time between the $2^{nd}$ and $3^{rd}$ checkpoint may be 10 seconds, whereas the time between the $3^{rd}$ and $4^{th}$ may be 50 seconds. Using the event table, this time can be estimated.

In another approach, the user is only allowed to select a checkpoint as the initial starting point of the location marker. For checkpoints that have occurred, there is a corresponding entry in the event table as to when they were detected. Thus, if the third event was detected at, e.g., 45.1 seconds into the call based on the event table, then the location marker could be initially positioned at 45.1 seconds into the call. This is easy to determine when the event table has detected each checkpoint.

However, returning again to FIG. 19B, the user has selected the second checkpoint using arrow 1955, which is marked with an "X" denoting that is was not detected. Thus, there would not be a corresponding entry of a time in the event table for this widget. In such cases, one approach is to split the time difference between the adjacent checkpoints which did occur. In this example, the first and third checkpoints were detected, and so there would be time entries in the event table. This would allow an estimate to be used for initially positioning the location marker on the player window.

Further, in various embodiments, an offset may be incorporated when determining the initial position of the location marker. For example, if a user selects a checkpoint that was detected, there would then be a corresponding time for that event in the event table. That time may reflect the time when the event message was sent or received, which would necessarily occur after the speech occurred and was detected. Thus, positioning the location marker at that time would start playing the audio just at the end of the detection of the speech event. In order to provide the user with context, the location marker may be backed-up in time by, e.g., 5 or 10 seconds, so that the audio will begin just before the speech condition was detected.

Figure 21:
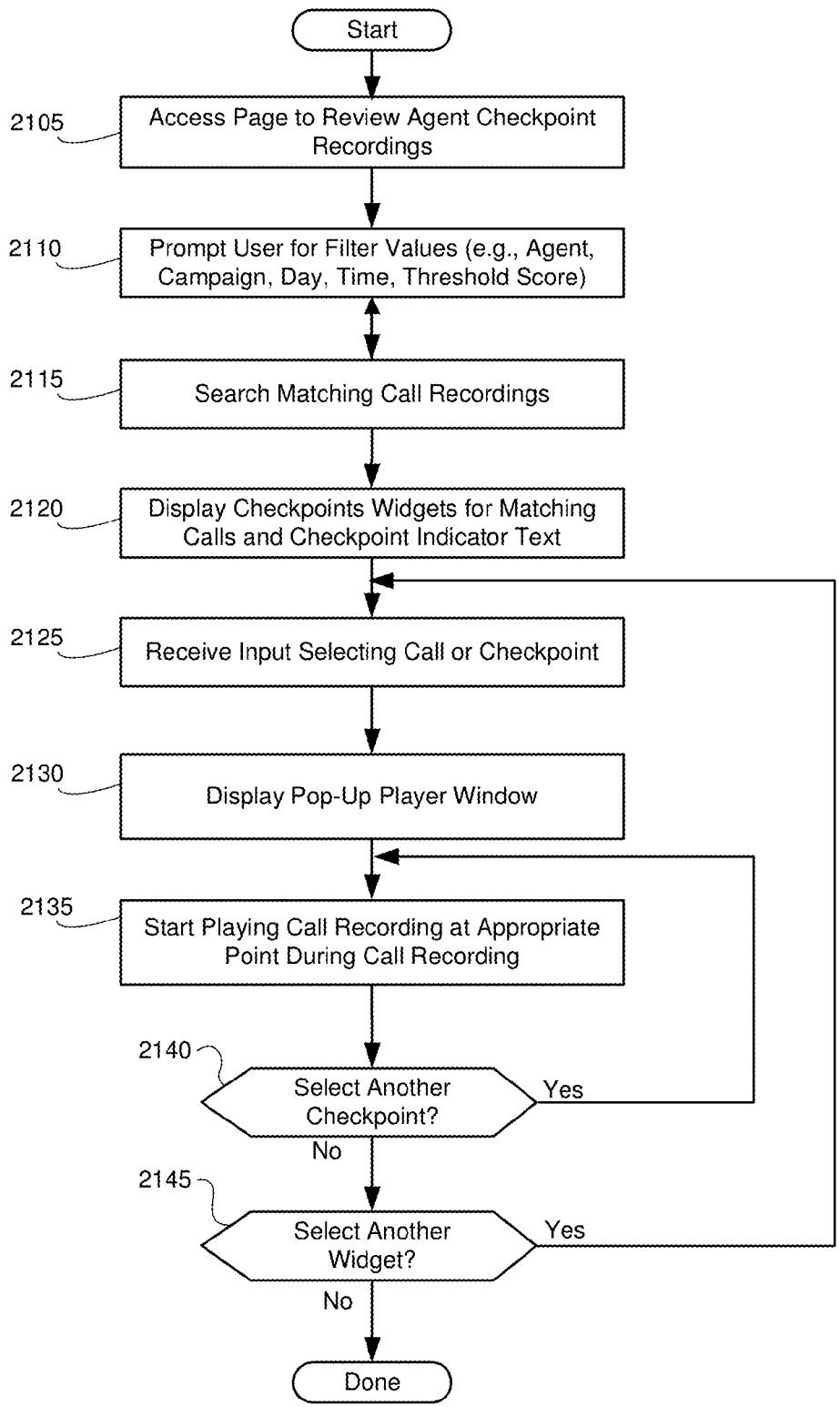
FIG. 21 illustrates an embodiment of a process flow for interacting with a user selecting a checkpoint widget.

Reviewing Agent Call Recordings Process Flow—FIG. 21

The process flow for reviewing an audio recording is shown in FIG. 21. The process flow begins with the user selecting the appropriate screen for reviewing agent checkpoint recordings in operation 2105. This may be accessed by various menus by the user, who may be the supervisor. The user may access this via a management or administration portal on the call handler, RTSA system, or other system executing the CARM. Access to this function may be limited based on the login credentials of the user. For example, agents may be precluded from accessing this page, or if they are allowed to, they may be limited to only reviewing their own calls. Once this page is accessed, the screen image similar to that shown in FIG. 19A is shown.

The next step involves the user providing the appropriate filter information that is used to select the calls for review in operation 2110. Although the filter information may include the agent's name, campaign, day, time, and threshold score, other embodiments may allow or required a greater or fewer number of filter elements. Various constructs for indicating ranges, thresholds, values, wildcards, or other selection criteria can be used. Further, other embodiments may allow selection of certain types of examples of checkpoints or violations. Those skilled in the art will recognize in light of this disclosure that a large number of variations are possible for filtering the number of possible calls that are to be reviewed.

When the user has completed indicating their filter values, a search of the relevant call records can be made in operation 2115. This may involve using a variety of database retrieval means for identifying the relevant call recordings and associated meta-data. Once this information is provided to the system, the results window 1915 can be generated and displayed to the user. Typically, the resulting widgets are displayed in descending chronological order beginning with the first qualifying recording.

In order to generate the results window, the CARM may first identify the relevant call records, and then use the meta-data from each eligible call record to construct the corresponding widget. The time when the call occurred is used to display the starting time 1912 for each record. The existence of a detected event at each time is used to determine whether the corresponding checkpoint occurred or not. Finally, the score total associated with the call is also displayed. Thus, the checkpoint widgets in the result window can be relatively easily displayed once the corresponding meta-data is obtained. Typically, calls from a common campaign are retrieved, and typically a campaign has a common widget definition. That is, all calls from a common campaign typically have the same number of checkpoints and of the same type. However, if calls from different checkpoints are obtained, then the widgets may be different (e.g., they may have different checkpoint texts and a different number of checkpoints in each corresponding call). Thus, it is usually simpler to show the results for a set of calls having the same type of widget defined for those calls.

Once the results window are generated, the user may then provide an input selecting a particular widget in operation 2125. Specifically, the user may select a particular point along the widget timeline, or a particular checkpoint. This is used to define the initial location of the location marker when the player window is presented in operation 2130.

Once the player window is presented, the user may provide an input to start playing the audio. The input allows the appropriate point in the call to be identified so that the audio at that point is then played to the user. The playing of the audio may occur through speakers in the user's computer, headphones attached to the computer, or any other means for providing audio from a digital file using a computer.

The user may choose to replay the audio, or select another point in the same call to hear audio in order to obtain a better context of the call. Thus, the agent may use the controls to back up to a prior checkpoint or advance to the next checkpoint in operation 2140. If so, the process loops back to operation 2135. If not, the user may choose to select audio from another call. This could be accomplished by using the widget controls in the play window to advance or back up to the next or previous call. Or, the user could close the player window and select another widget. This reflects the user selecting another call, and if so, the process loops back to operation 2125. Otherwise, the user has completed their review of the agent's calls.

Figure 22:
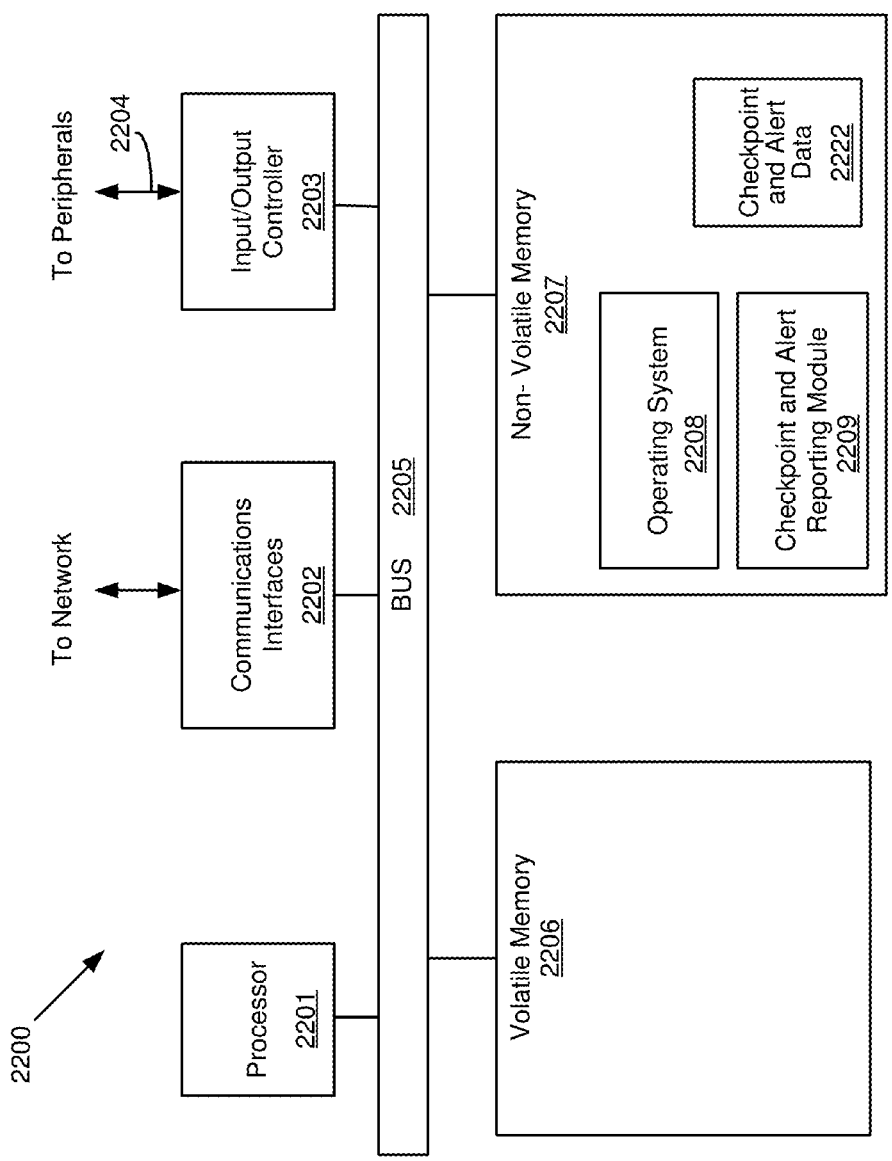
FIG. 22 illustrates one embodiment of a processing system for practicing the concepts and technologies disclosed herein.

Exemplary Component Architecture—FIG. 22

FIG. 22 is an exemplary schematic diagram of a computer processing system that may be used in an embodiment for any one of the components used in the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. Specifically, the schematic diagram of FIG. 22 may represent a system executing the checkpoint and alert module, the workstation, the call handler, or the RTSA system. There are various potential embodiments, and the system shown in FIG. 22 may be modified to accommodate any one of the above components. Further, in various embodiments, a common processing platform may be used to run software for providing various functions in an integrated manner.

As shown in FIG. 22, the processing system 2200 may include one or more processors 2201 that may communicate with other elements within the processing system 2200 via a bus 2205 or some other form of communication facility. The processor 2201 may be implemented as one or more complex programmable logic devices ("CPLD"), microprocessors, Von Neumann based microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. Each of these must be programmed accordingly to perform the functions disclosed herein.

In one embodiment, the processing system 2200 may also include one or more communications interfaces 2202 for communicating data via the local network with various external devices, including those shown in FIGS. 1-2. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

An input/output controller 2203 may also communicate with one or more input devices or peripherals using an interface 2204, such as, but not limited to: a keyboard, a mouse, a touch screen/display input, microphone, pointing device, etc. The input/output controller 2203 may also communicate with output devices or peripherals, such as displays, printers, speakers, headsets, banner displays, other components in the contact center, etc. These may be used, in part, to receive data, such as alert and checkpoint widget related data retrieved from an external database.

The processor 2201 may be configured to execute instructions stored in volatile memory 2206, non-volatile memory 2207, or other forms of computer readable storage media accessible to the processor 2201. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2207 may store program code and data, which also may be loaded into the volatile memory 2206 at execution time. Specifically, the non-volatile memory 2207 may store code associated with an checkpoint and alert reporting module 2209 that may perform the above mentioned process flows and/or operating system code 2208 containing instructions for performing the process and/or functions associated with the technologies disclosed herein. The checkpoint and alert reporting module 2209 may also access various checkpoint and alert data 2217 disclosed above (including agent alert data, event tables, meta-data, etc.) and process the related information described above. The volatile memory 2206 and/or non-volatile memory 2207 may be used to store other information including, but not limited to: alerts, alert mapping tables, floor plan maps, agent icons, agent pictures, records, audio records, meta-data, event tables, applications, programs, scripts, source code, object code, byte code, compiled code, interpreted code, machine code, executable instructions, or the like. These may be executed or processed by, for example, processor 2201. These may form a part of, or may interact with, the CARM 2209. In some embodiments, the CARM 2209 may be integrated or located in another component. Although the embodiments herein have described the CARM as a single module, in other embodiments these may be multiple modules, e.g., a checkpoint reporting module and an alert reporting module. Further, these modules do not necessarily have to execute in the same component. Similar, the checkpoint and alert data 2217 may be segregated and stored as separate data files or structures (e.g., checkpoint data separate from alert data) on separate components.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory nor propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation, except for the terms defined in the glossary herein.

The invention claimed is:

1. A system for displaying a plurality of checkpoint widgets on a workstation used by a supervisor in a contact center, wherein each checkpoint widget indicates one or more checkpoint status indicators of a respective voice call, where each checkpoint status indicator is associated with a respective checkpoint during the respective voice call processed by a call handler involving an agent in the contact center, the system comprising:
a real-time speech analytics ("RTSA") system configured to report a corresponding event message for each keyword detected during the respective voice call involving the agent;
a checkpoint and alert reporting module comprising a processor configured to:
receive a specific event message from the RTSA system, correlate the specific event message to a particular checkpoint,
store timing information in association with the particular checkpoint; and
a workstation comprising a computer display and an audio interface, wherein the workstation is configured to display the plurality of checkpoint widgets associated with the agent, wherein at least one checkpoint widget visually distinguishes a particular checkpoint status indicator to reflect absence of speech to be detected for a corresponding checkpoint of the at least one checkpoint widget,
wherein the processor of the checkpoint and alert reporting module is further configured to:
receive a first request from the workstation for the plurality of checkpoint widgets associated with the agent, the first request further comprising filter information identifying the agent and a time period of calls handled by the agent, wherein the filter information is used to identify the plurality of checkpoint widgets;
cause the plurality of checkpoint widgets to be displayed on the workstation, wherein one of the checkpoint widgets comprises the particular checkpoint;
receive a second request from the workstation, the second request indicating the particular checkpoint; and
cause a portion of audio of a particular call associated with the particular checkpoint to be streamed to the audio interface of the workstation.

2. The system of claim 1, wherein each checkpoint widget visually depicts:
a time-line representing passage of time during the respective voice call; and
a plurality of checkpoint status indicators overlaid on the time-line, wherein at least one of the plurality of status indicators reflects detection of speech at the corresponding checkpoint.

3. The system of claim 2, wherein the portion of audio of the particular call associated with the particular checkpoint to be streamed to the audio interface of the workstation begins at a time that is after a prior checkpoint of the particular call.

4. The system of claim 1, wherein the workstation is further configured to display a score total associated with each of the checkpoint widgets.

5. The system of claim 1, wherein the call handler comprises the alert and checkpoint reporting module, and wherein the call handler establishes a first call leg to the RTSA system, a second call leg to the workstation, and a third call leg to a remote party.

6. The system of claim 1, wherein a plurality of checkpoint status indicator text is displayed with the plurality of checkpoint widgets.

7. The system of claim 1, wherein streaming the audio to the interface of the workstation comprises retrieving audio of the call into a memory, from which the audio is streamed to the audio interface.

8. The system of claim 7, further comprising:
a file store comprising the memory, wherein the memory stores audio of calls involving the agent, including the audio from the particular call.

9. A non-transitory computer readable medium storing instructions that when executed by a processor in call handler system cause the processor to:
receive an event message from a real-time speech analytics system (RTSA system) associated with a voice call between an agent in a contact center agent and a remote party, the event message reporting detection of a keyword spoken by the agent;
determine that the event message correlates with a particular checkpoint associated with the voice call;
receive a first request from a workstation for a plurality of checkpoint widgets associated with the agent, the first request further comprising filter information identifying the agent and a time period of calls handled by the agent, wherein the filter information is used to identify the plurality of checkpoint widgets;
cause the plurality of checkpoint widgets to be displayed on the workstation, wherein one of the plurality of checkpoint widgets comprises the particular checkpoint, and wherein the one of the plurality of checkpoint widgets visually reflects an absence of speech to be detected for another checkpoint of the one of the plurality of checkpoint widgets;
receive a second request from the workstation, the second request indicating the particular checkpoint; and
cause a portion of audio of the voice call associated with the particular checkpoint to be streamed to an audio interface of the workstation.

10. The non-transitory computer readable medium of claim 9, wherein the filter information identifying the time period of calls handled by the agent indicates a date, a beginning time on that date, and an ending time on that date.

11. The non-transitory computer readable medium of claim 9, further comprising instructions that when executed cause the processor to:
cause the plurality of checkpoint widgets to be displayed on the workstation with a corresponding score for each of the plurality of checkpoint widgets.

12. The non-transitory computer readable medium of claim 11, further comprising instructions that when executed cause the processor to:
   in response to receiving the second request indicating the particular checkpoint, present a user with a window on a computer display, the window displaying controls of an audio player configured to allow the user to control the audio of the voice call.

13. The non-transitory computer readable medium of claim 9, further comprising instructions that when executed cause the processor to:
   receive a corresponding text from a user associated with each checkpoint prior to the call handler processing the call;
   store an association between the corresponding text and a particular event message; and
   display the corresponding text for each checkpoint on the checkpoint widget during the call when the event message corresponds to the particular event message.

14. The non-transitory computer readable medium of claim 9, further comprising instructions that when executed cause the processor to:
   cause the workstation to display the checkpoint widget in an initial display state to the agent on a computer display at a beginning of the voice call.

15. A method for streaming a stored portion of audio of a voice call involving an agent in a contact center comprising:
   establishing the voice call involving a plurality of call legs, with a first call leg between a remote party and a call handler, a second call leg between the call handler and a real-time speech analytics system ("RTSA system"), and a third call leg between the call handler and a telephone device used by the agent;
   monitoring the speech of the agent on the second call leg by the RTSA system;
   generating an event message from the RTSA system to the call handler in response to detecting a previously indicated keyword on the voice call;
   receiving the event message at the call handler;
   determining that the event message reflects detection of a keyword associated with a particular checkpoint of the voice call;
   storing timing information of the audio of the call based on the event message;
   receiving a first request from a workstation for a plurality of checkpoint widgets associated with the agent, the first request further comprising filter information identifying the agent and a time period of calls handled by the agent, wherein the filter information is used to identify the plurality of checkpoint widgets;
   causing the plurality of checkpoint widgets to be displayed on the workstation, wherein one of the checkpoint widgets comprises the particular checkpoint, and wherein at least another one of the checkpoint widgets visually reflects an absence of speech to be detected for another checkpoint corresponding to the at least another one of the checkpoint widgets;
   receiving a second request from the workstation, the second request indicating the particular checkpoint; and
   causing the portion of the stored audio of the voice call associated with the particular checkpoint to be streamed to an interface of the workstation.

16. The method of claim 15, wherein causing the plurality of checkpoint widgets to be displayed on the workstation further causes a corresponding score to be displayed with each checkpoint widget.

17. The method of claim 15, wherein the time period of calls handled by the agent comprises a date, beginning time, and ending time.

18. The method of claim 15, wherein the timing information of the audio of the voice call comprises an offset time from a beginning of the voice call.

19. The method of claim 18, wherein the offset is based on a predefined backup time offset from the particular checkpoint.

* * * * *